Figure 1:
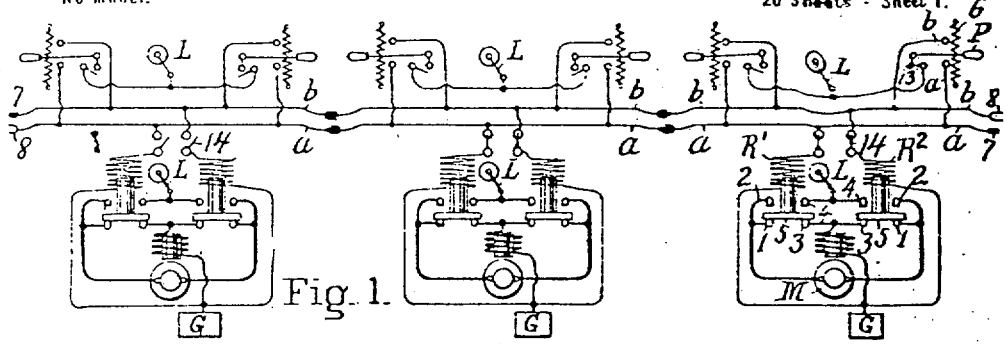

No. 660,065. Patented Oct. 16, 1900.
F. J. SPRAGUE.
TRACTION SYSTEM.
(Application filed Apr. 30, 1898.)

(No Model.) 20 Sheets—Sheet 1.

Witnesses:
Samuel W. Balch
Francis H. Shepard

Inventor,
Frank J. Sprague
by Thomas Ewing Jr.
Attorney

No. 660,065. Patented Oct. 16, 1900.
F. J. SPRAGUE.
TRACTION SYSTEM.
(Application filed Apr. 30, 1896.)

(No Model.) 20 Sheets—Sheet 2.

Witnesses:
Samuel W. Balch
Francis H. Shepard

Inventor,
Frank J. Sprague
by Thomas Ewing, Jr.,
Attorney.

Witnesses:
Samuel W. Balch
Francis H. Shepard

Inventor,
Frank J. Sprague
by Thomas Ewing Jr.,
Attorney.

No. 660,065.  
F. J. SPRAGUE.  
TRACTION SYSTEM.  
(Application filed Apr. 30, 1896.)

Patented Oct. 16, 1900.

(No Model.)  
20 Sheets—Sheet 4.

Witnesses:  
Samuel W. Balch  
Francis H. Shepard

Inventor,  
Frank J. Sprague  
By Thomas Ewing, Jr.,  
Attorney

No. 660,065.  
F. J. SPRAGUE.  
TRACTION SYSTEM.  
(Application filed Apr. 30, 1896.)  
Patented Oct. 16, 1900.

(No Model.)

20 Sheets—Sheet 7.

Witnesses:  
Samuel W. Balch  
Francis H. Shepard

Inventor  
Frank J. Sprague  
by Thomas Ewing, Jr.,  
Attorney

No. 660,065.

F. J. SPRAGUE.
TRACTION SYSTEM.
(Application filed Apr. 30, 1898.)

(No Model.)

Patented Oct. 16, 1900.

Witnesses:
Samuel W. Balch
Francis N. Shepard

Inventor,
Frank J. Sprague
by Thomas Ewing, Jr.,
Attorney.

No. 660,065.  
F. J. SPRAGUE.  
TRACTION SYSTEM.  
(Application filed Apr. 30, 1898.)  
Patented Oct. 16, 1900.

(No Model.)

20 Sheets—Sheet 11.

Witnesses:  
Samuel W. Balch  
Francis H. Shepard

Inventor  
Frank J. Sprague  
by Thomas Ewing Jr.  
Attorney

No. 660,065. Patented Oct. 16, 1900.
F. J. SPRAGUE.
TRACTION SYSTEM.
(Application filed Apr. 30, 1898.)
(No Model.) 20 Sheets—Sheet 12.
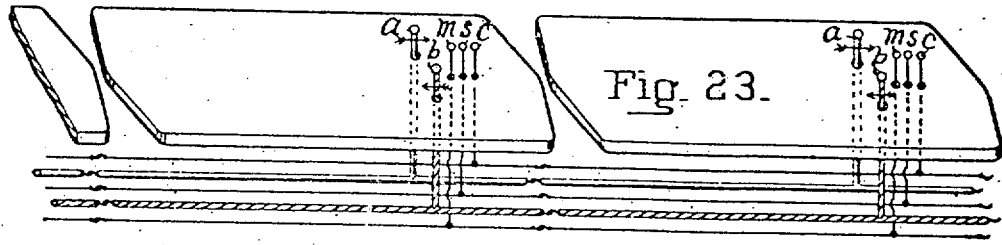
Fig. 23.
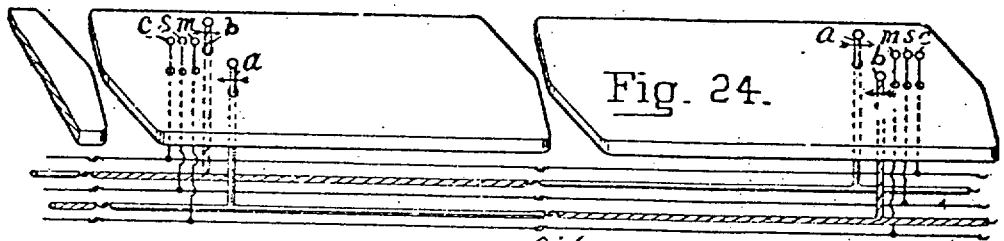
Fig. 24.
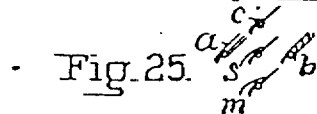
Fig. 25.
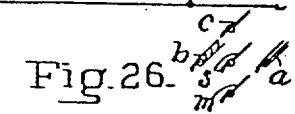
Fig. 26.
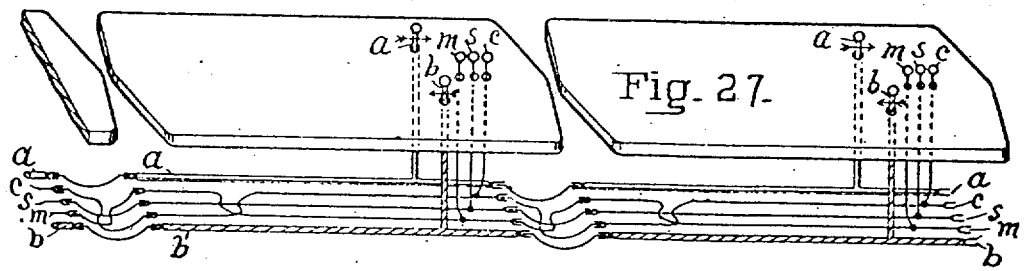
Fig. 27.
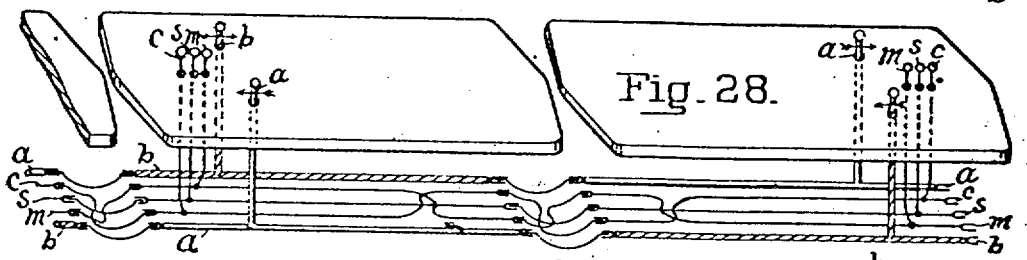
Fig. 28.
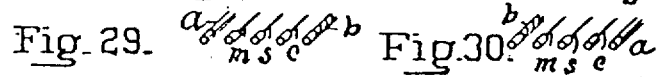
Fig. 29. Fig. 30.
Witnesses:
Samuel W. Balch
Francis H. Shepard
Inventor,
Frank J. Sprague
by Thomas Ewing Jr.,
Attorney.

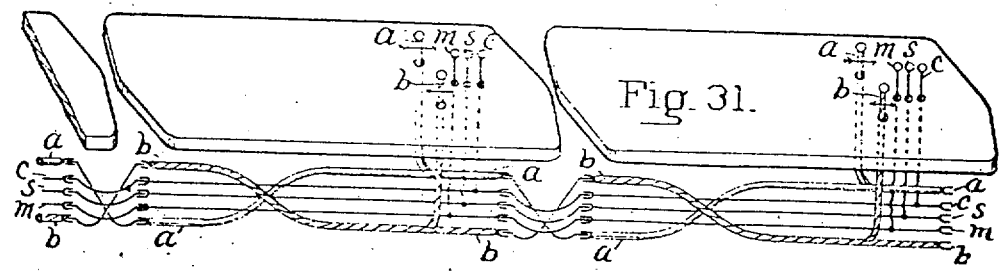
Fig. 31.
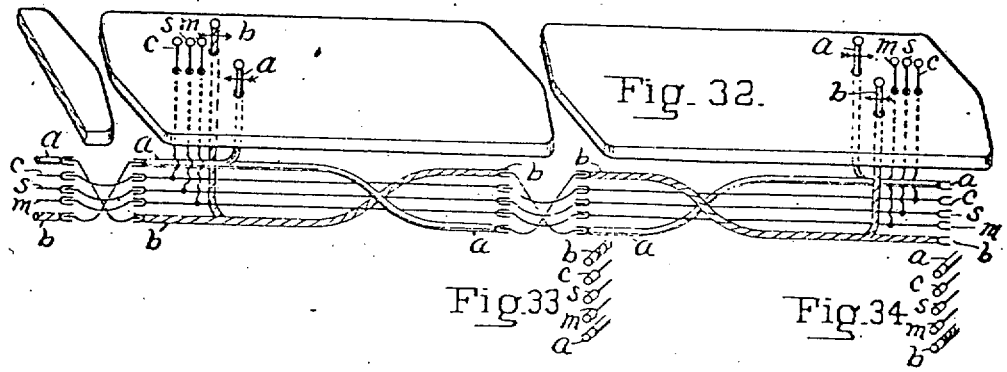
Fig. 32.
Fig. 33.  Fig. 34.
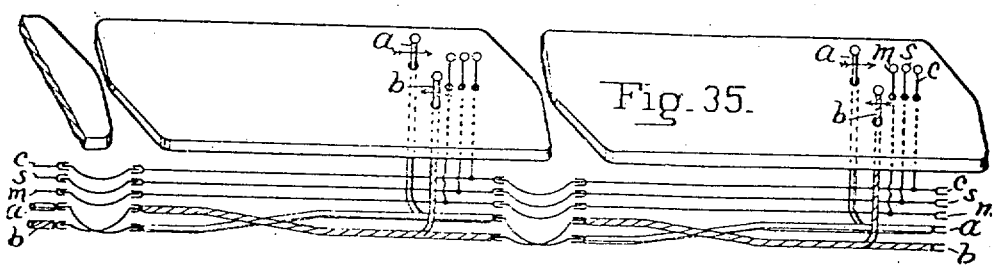
Fig. 35.
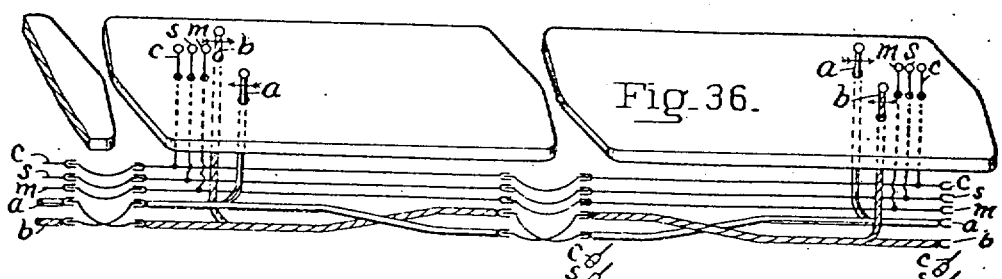
Fig. 36.
Fig. 37.  Fig. 38.

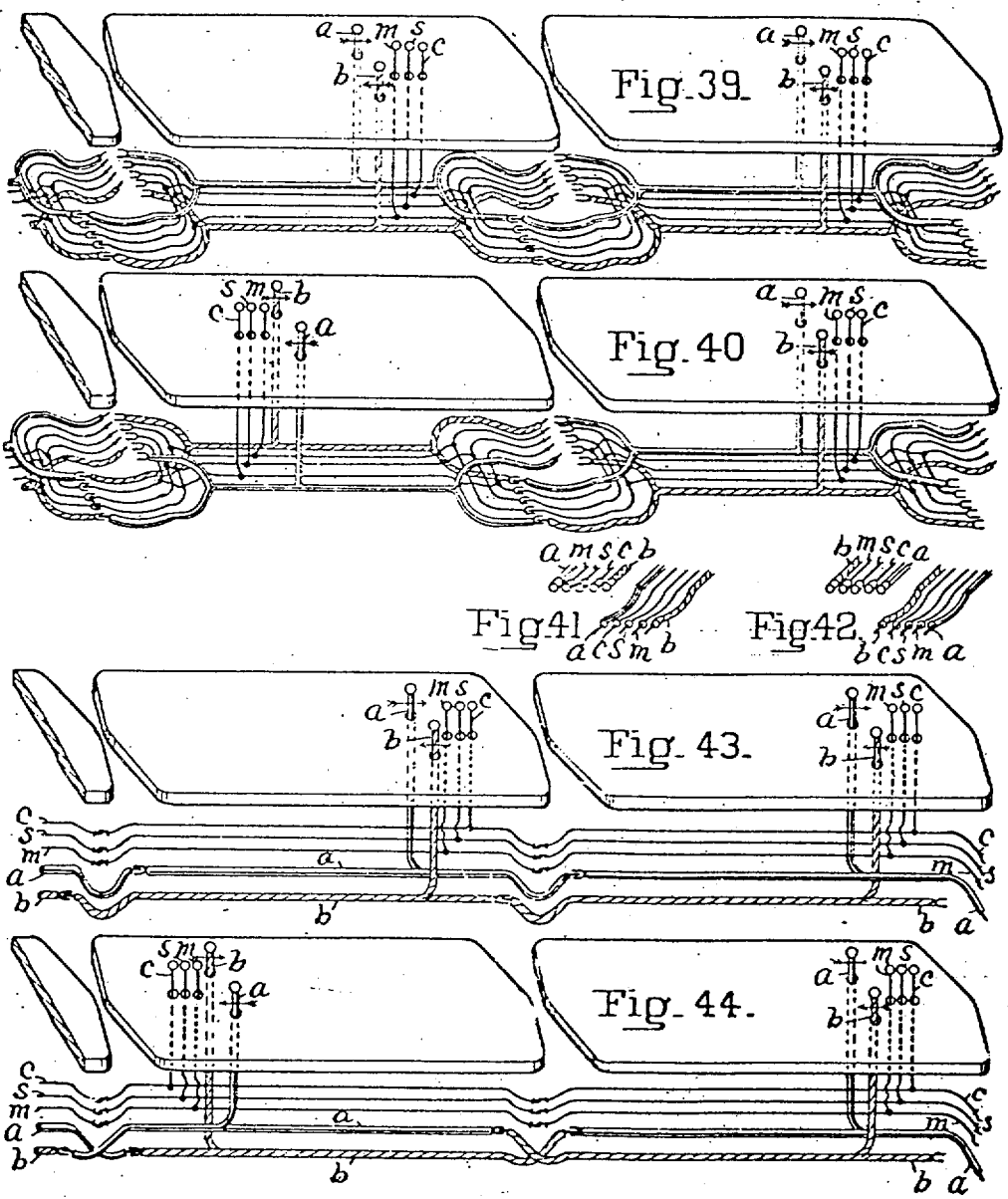

No. 660,065. Patented Oct. 16, 1900.
F. J. SPRAGUE.
TRACTION SYSTEM.
(Application filed Apr. 30, 1896.)
(No Model.) 20 Sheets—Sheet 15.
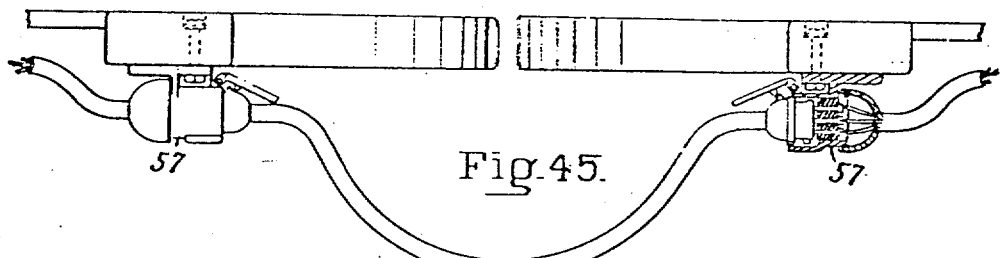
Fig. 45.
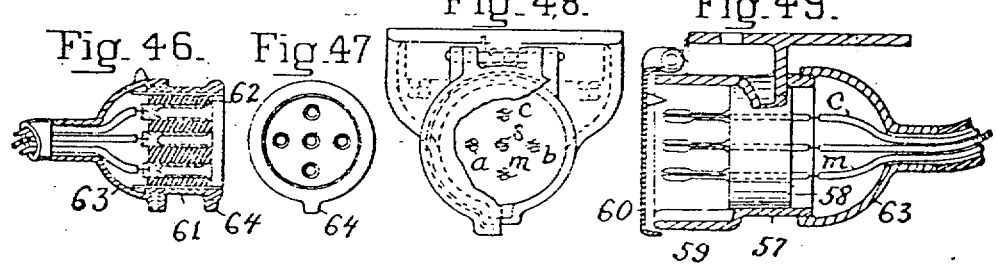
Fig. 46. Fig. 47. Fig. 48. Fig. 49.
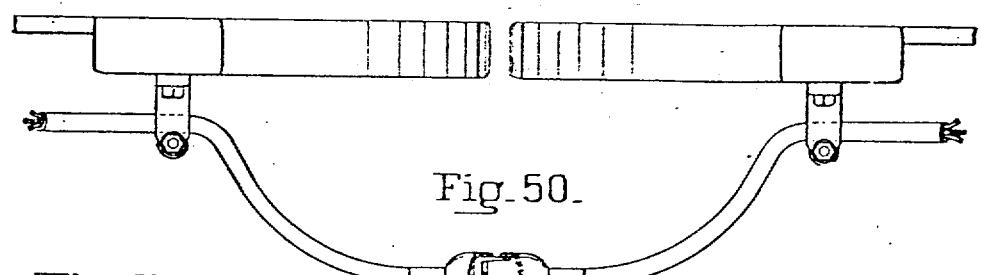
Fig. 50.
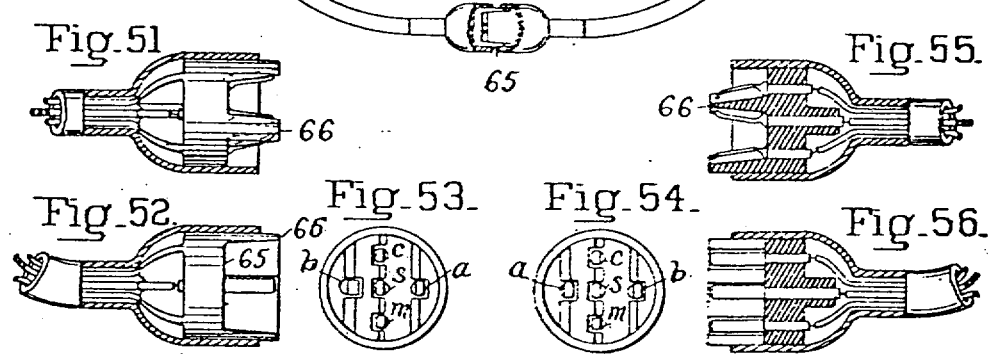
Fig. 51. Fig. 55.
Fig. 52. Fig. 53. Fig. 54. Fig. 56.
Witnesses:
Samuel W. Balch
Francis H. Shepard
Inventor,
Frank J. Sprague
by Thomas Eurey, Jr.,
Attorney

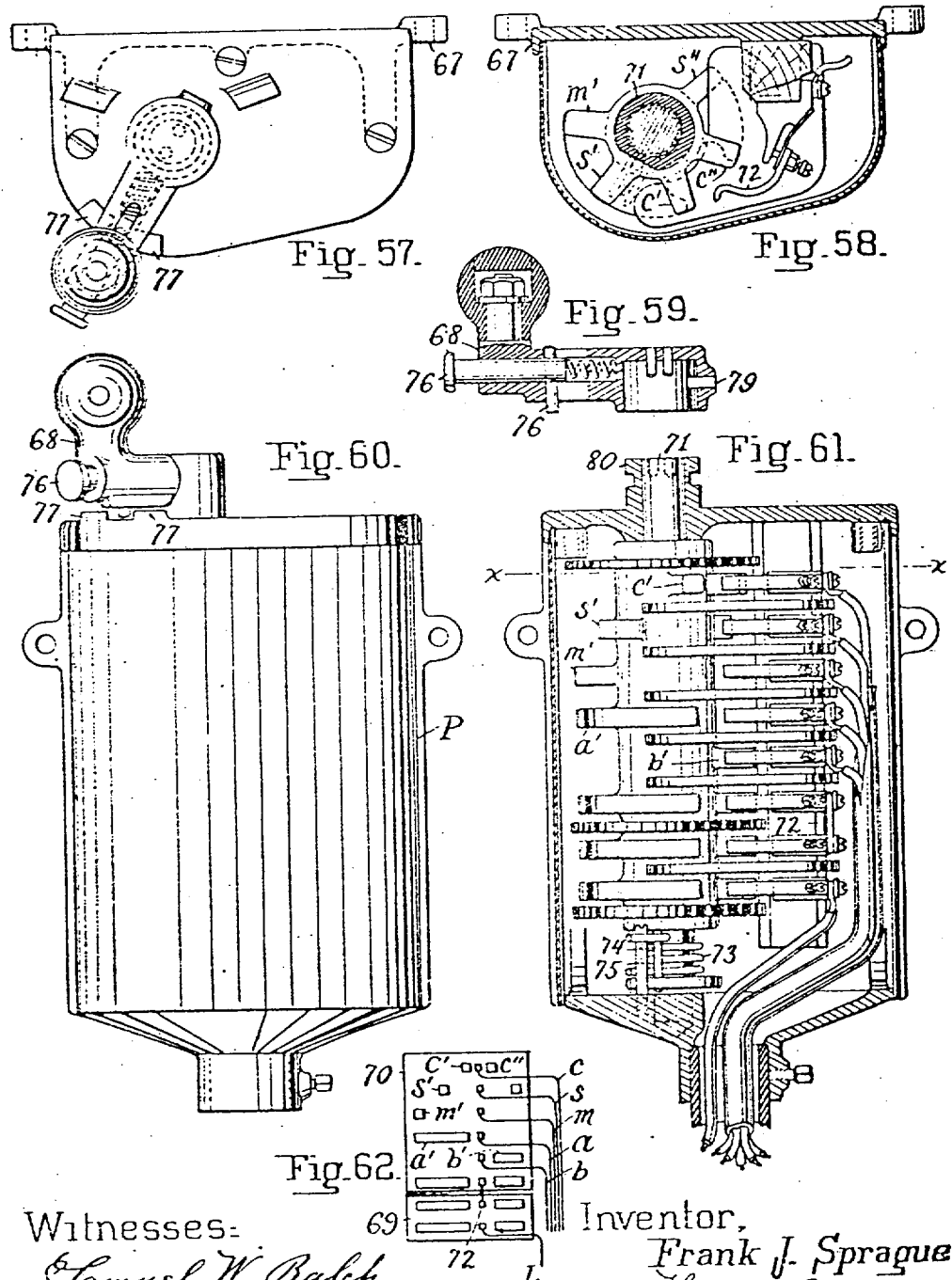

No. 660,065. Patented Oct. 16, 1900.
F. J. SPRAGUE.
TRACTION SYSTEM.
(Application filed Apr. 30, 1898.)

(No Model.) 20 Sheets—Sheet 17.

Witnesses:
Samuel W. Balch
Francis H. Shepard

Inventor,
Frank J. Sprague
by Thomas Ewing Jr.,
Attorney.

No. 660,065. Patented Oct. 16, 1900.
F. J. SPRAGUE.
TRACTION SYSTEM.
(Application filed Apr. 30, 1898.)
(No Model.) 20 Sheets—Sheet 18.
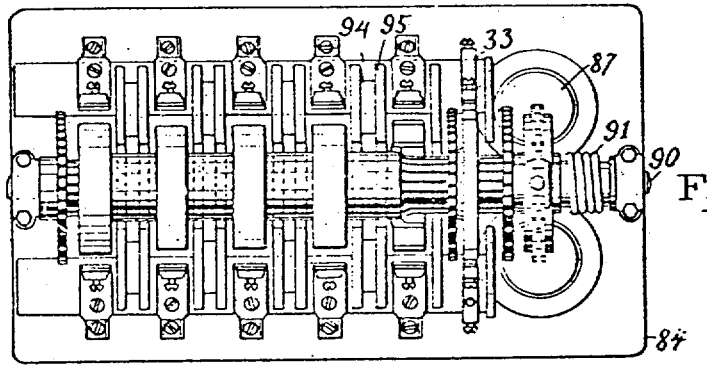
Fig. 65.
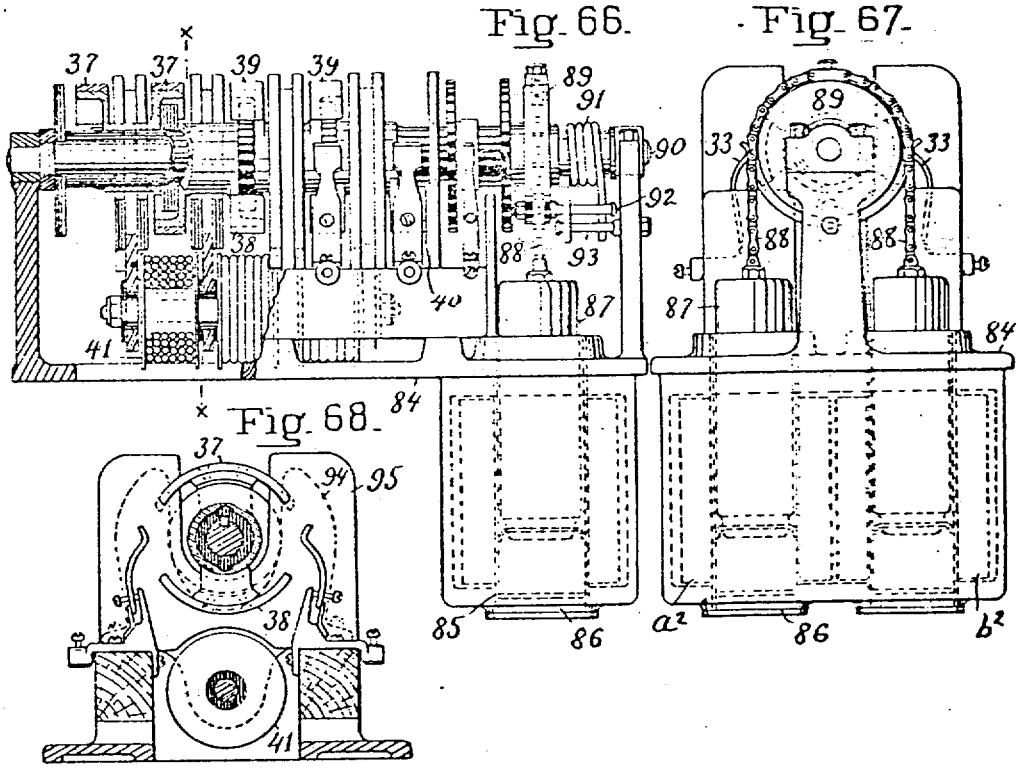
Witnesses:
Samuel W. Balch
Francis H. S. Lefard
Inventor,
Frank J. Sprague
by Thomas Ewing Jr.
Attorney.

No. 660,065. Patented Oct. 16, 1900.
F. J. SPRAGUE.
TRACTION SYSTEM.
(Application filed Apr. 30, 1898.)
(No Model.) 20 Sheets—Sheet 19.

Witnesses:
Samuel W. Balch
Francis H. Shepard

Inventor,
Frank J. Sprague
by Thomas Ewing Jr.,
Attorney.

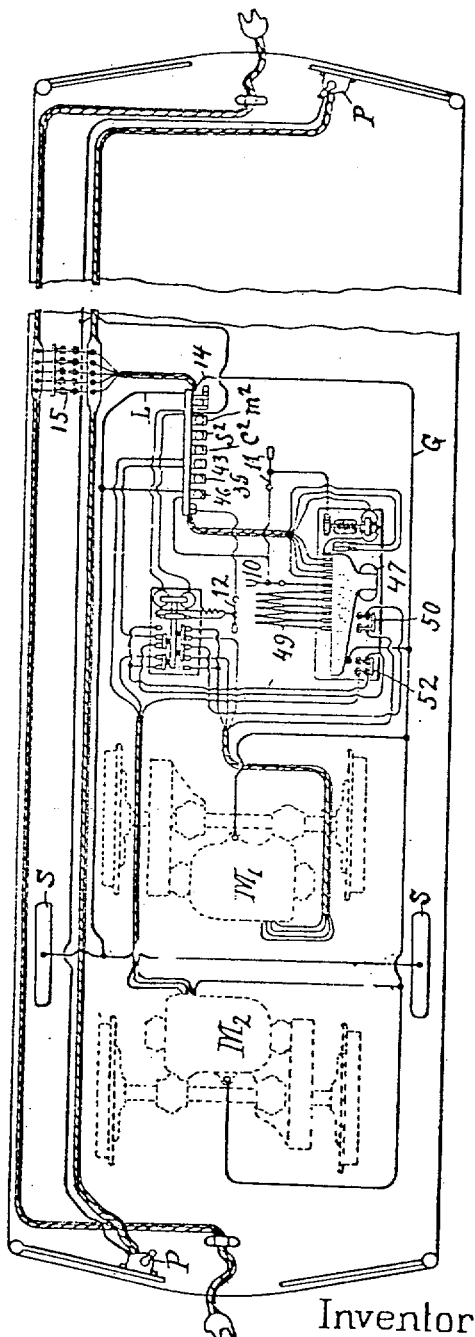

UNITED STATES PATENT OFFICE.

FRANK J. SPRAGUE, OF NEW YORK, N. Y., ASSIGNOR TO THE SPRAGUE ELECTRIC COMPANY, OF NEW JERSEY.

TRACTION SYSTEM.

SPECIFICATION forming part of Letters Patent No. 660,065, dated October 16, 1900.

Application filed April 30, 1898. Serial No. 679,239. (No model.)

*To all whom it may concern:*

Be it known that I, FRANK J. SPRAGUE, a citizen of the United States of America, and a resident of New York, borough of Manhattan, county and State of New York, have invented certain new and useful Improvements in Traction Systems, of which the following is a specification.

The system intended to be described in the specification is what I call a "multiple-unit system of railway operation." It may be briefly described as a semi-automatic system of control, whether electrical or otherwise, which will permit of the aggregation and control of two or more motor equipments, whether on one or more transportation units. Each unit may be a single car or two or more cars normally coupled together, with sufficient motive power for the unit and proper controlling devices for the motive power, and a secondary control system for operating the controlling devices through a governing-line, and one or more master controller's or operator's switches conveniently located. Each unit is provided with proper train connections, so that a plurality of units may be connected without regard to sequence, and preferably without regard to end relation, and the motors on all of the units be practically simultaneously operated from one or more single points on the train, the control of course providing for the proper coöperation of the motors. With this statement of what is meant by a "unit" the system will be fully described and defined in the claims as though each unit were a car. This is done for the sake of definiteness of description and illustration, but not with the intention of limiting myself so as to exclude the broader idea of a unit above set forth.

The object is to make each fully-equipped car or unit complete and individualized, so that it can be operated from either platform and be run in either direction, either by itself or with partially-equipped cars, and to provide the cars with train connections of such character as to make them interchangeable, so that they can be grouped in any number and order, preferably irrespective of which are the abutting ends, and that a train so formed can be operated from any selected platform or platforms, and that in the operation of the car or cars from any point like hand movement shall correspond to like relative movement of the car or train.

With this object in view the invention may be described as a car or train with interchangeable cars, one or more of them being equipped with driving mechanisms, and means on any desired number of cars with appropriate train connections whereby the driving mechanism or mechanisms can be operated from any desired car. In practice the motors or sets of motors are independent of each other and provided each with a suitable controller, these controllers being governed through the train connections from any desired car.

The system actually employed is electrical, and viewed in this specific aspect the invention consists in providing one or more cars with one or more electric motors or sets of motors and a controller or controllers therefor—such as reversers, current-varying rheostats, and series-multiple switches, singly or combined—for controlling the speed, direction of revolution, and grouping of the motors, and a suitable operator's or master switch or controller, preferably on one or more platforms, for governing the controllers, and thereby the motors, and suitable connectiors whereby a train of cars may be made up and all the controllers simultaneously operated from any operator's switch.

The term "controller," referring now to the "main," not the "master," controller or switch, is intended to cover for the purpose of this description all or any apparatus which directly affects the main circuit of the motors, and is used to effect changes in the direction of their movement and to vary the current input, the motor speed, or the motor grouping. It will generally comprise a reverser, a current-varying switch, such as a cylinder or solenoid or their equivalent in connection with a rheostat, and, when two or more motors are used, a series-multiple switch in various combinations. These several circuit-varying devices may be variously located, or be on a common support, or be mechanically connected.

In the simpler forms there can be a reverser and a rheostat, which can be operated either separately or together. In addition there can be a separately-operated motor-grouping switch, or any two or all three of these various switches may be physically or electrically grouped or connected together in any desired combination. The several switches will be operated by an independent secondary circuit or governing train-line through the medium of a master-switch, and the number of train-wires necessary will depend upon the method of grouping. Thus in some of the drawings there are shown a reverser and a rheostat combined, in others these two operated by the same means, and in still others a motor-grouping switch and rheostat are combined. It will also be seen hereinafter that in some of the drawings all the main controlling apparatus is shown as operated directly by a train-line from the master-switch; in some none of it need be operated thereby, but all can be operated by a circuit that is local to the car, secondarily controlled from a relay-circuit, and, again, in some part is operated by a circuit that is connected through the train-line and operator's switch and part by a circuit that is local to the car. The circuits that are local to the cars are of course controlled by the train-line and operator's switches.

The interrupted, step-by-step, or periodic movements which may be referred to affect one or more of the current-varying devices.

It is of course desirable that the controlling apparatus of the several motors or several sets of motors should be operated simultaneously and to an equal extent, or practically so. To effect this, relay or branch circuits are provided on each equipped car which are electrically connected with an independent governing-circuit, one or more of which relays either actuates one or more of the various parts of the controller directly or actuates or controls pilot mechanism, which in turn actuates or controls a part or the whole of the controller. There are also provided other branch circuits likewise connected with the governing-circuit, which branch circuits are connected to operator's switches or secondary or master switches or controllers.

In one specific system, herein shown in detail, the means for controlling the motor is in large measure an adaptation of the methods and apparatus introduced by me in electric-elevator practice, in which the controller for the driving-motor is governed from the operator's switch through a pilot-motor. In adapting my elevator practice among other changes and additions I have made such additions as are necessitated by the condition that the cars must be susceptible of connection to make up and must be interchangeable in trains. This involves not merely suitable train connections, but the conception of an entire train system in which one or more cars are each provided with a suitable car system comprising means for operating each fully-equipped car as a single car, and in which there are also provided train connections whereby a train can be made up by connecting the cars in any desired order and end-to-end relation and the equipments on any or all of the cars can be operated from one or more of the cars, and in which means are also provided for completely isolating any local car system without disturbing the train connections or interfering with the operation of the balance of the train system as a whole from the platform-switch on any other car and without disturbing the connections of the car system itself, or in which the platform-switches on any car can be cut off without disturbing the train-line connections as a whole, or the operation of all the motors, including those on the car whose platform-switch is cut off, from a platform-switch on any other car, or for isolating the car system on any car exclusive of the platform-switches on that car without interfering with the train connections and the operation of the balance of the train system as a whole from a platform-switch on any car, including the car whose system is isolated. It is not to be understood that the system here proposed is applicable only to a single car or combination of cars all of which are completely equipped; but it is equally applicable to a combination of cars some of which are equipped with motors and others of which are not, made up in a train which it is desired either for switching purposes or for general operation on a railroad to control from different selected points. The occasion for such a combination of course arises where because of first cost it may be desired to limit the amount of such equipment installed and yet retain the kind of control here set forth, and in such a case, as an illustration, alternate cars may be equipped, or the first and last car, or the first, last, and middle car, and so on, the equipped and the unequipped cars all preferably having train-lines, or conditions may arise, especially with long trains, where possibly there may be no reversal of cars or even no change of sequence, but where it is desirable to have motors distributed on different cars and controlled from one or more points on the train, or where all may be consolidated on one car in the train, but controlled from one or more points on the train. In such a case no single car, perhaps, will be completely equipped, for some may have motors and controllers, but no master-controller, and others master-controllers, but no motors or controllers; but there must be provided as a connecting-link between such cars a governing train-line. The various parts on different cars constitute altogether an operative train equipment, and so much of the train taken altogether constitutes a complete unit. It is evident also that the system is equally applicable to the control of two or more complete motor equipments and controllers on a single car, as may be desirable sometimes when four motors are used, either permanently or temporarily installed.

Trains can be made up of any number, from two cars up to the largest permissible train, one or more of the cars being equipped with a motor or motors constituting a single-motor equipment or a plurality of distinct equipments, a controller or controllers therefor, and means for moving each controller, the car or cars thus fully equipped and one or more partially-equipped cars being each provided with independent governing train-lines, with means for connecting the train-lines of the several cars together, there being one or more operator's switches connected with the completed train-line, preferably an operator's switch at each platform of each fully-equipped car, and, if desired, at each platform of each of the cars.

Figure 2:
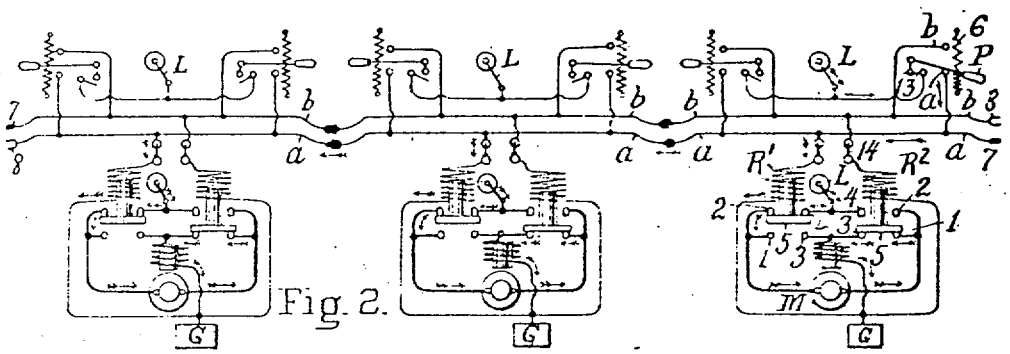
Figure 3:
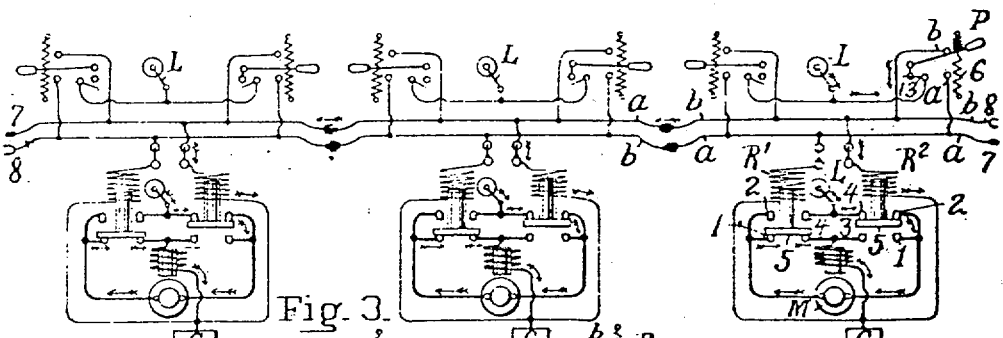
Figure 4:
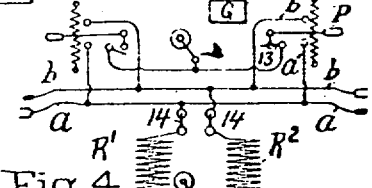
Figure 5:
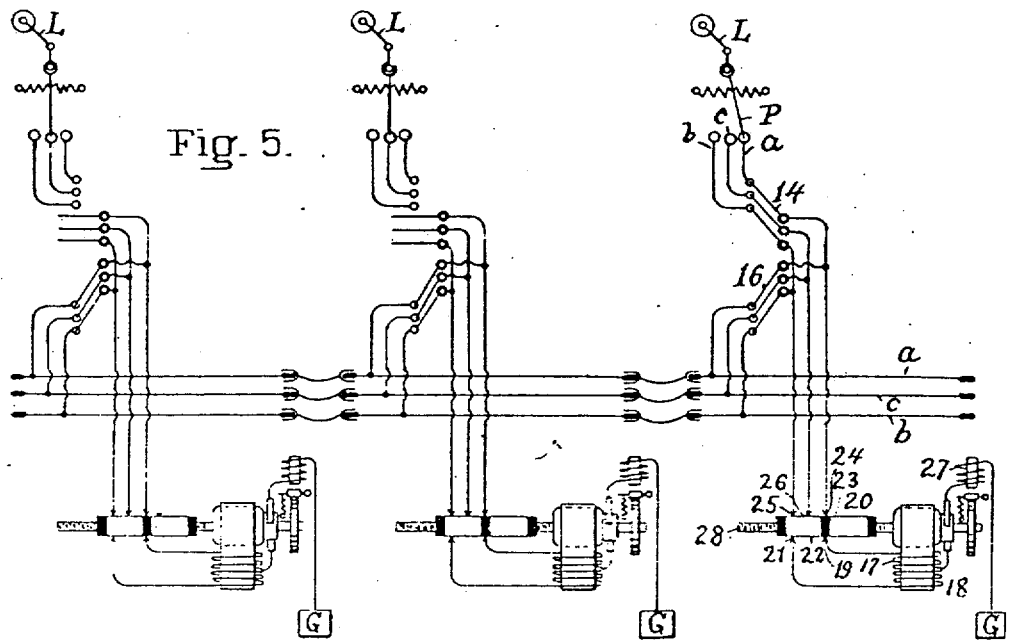
Figure 6:
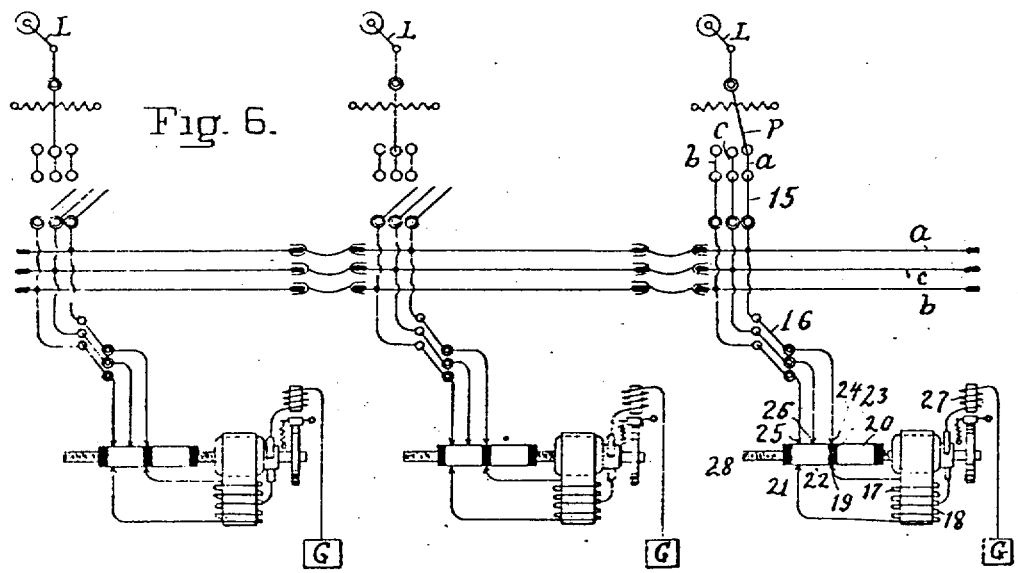
Figure 7:
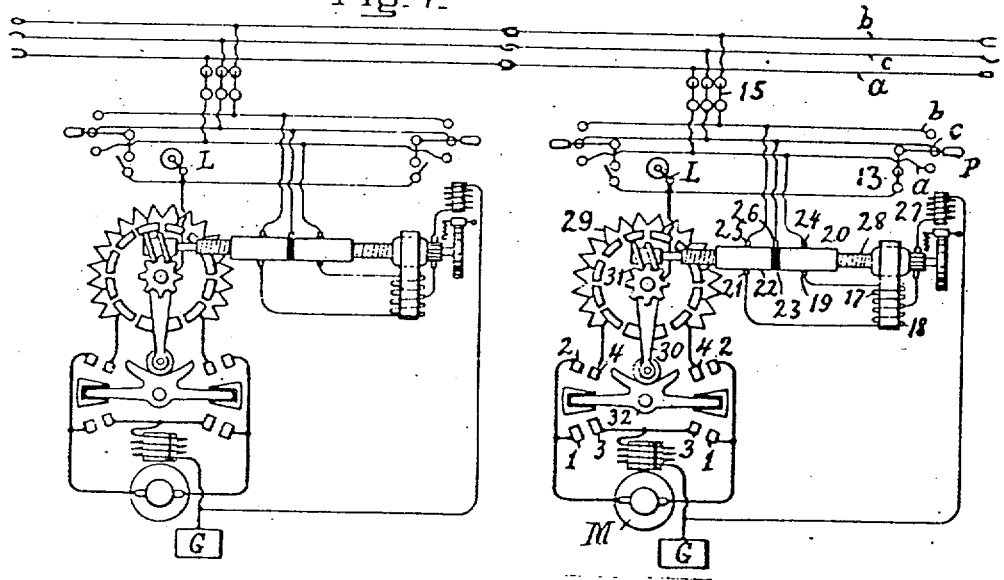
Figure 8:
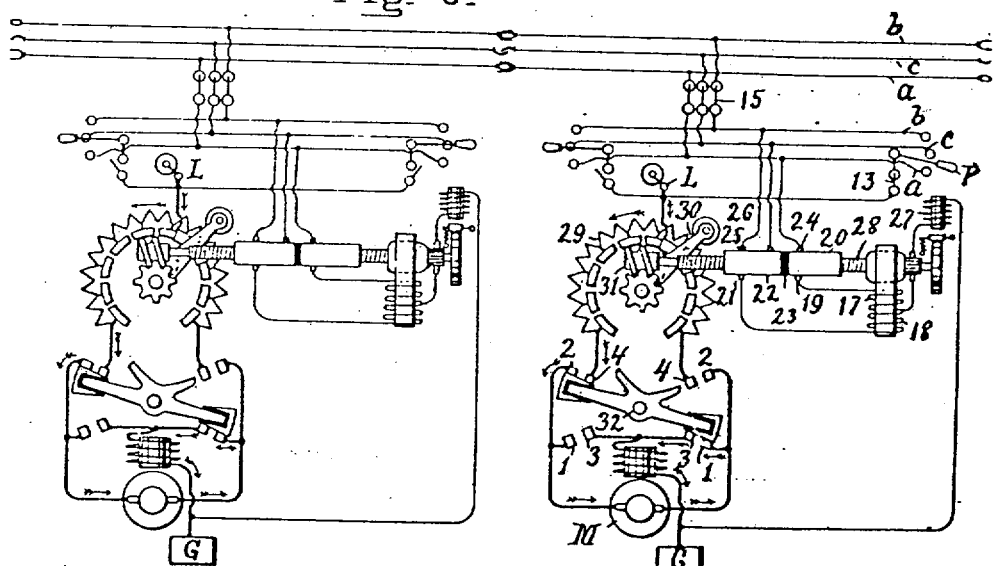
Figure 9:
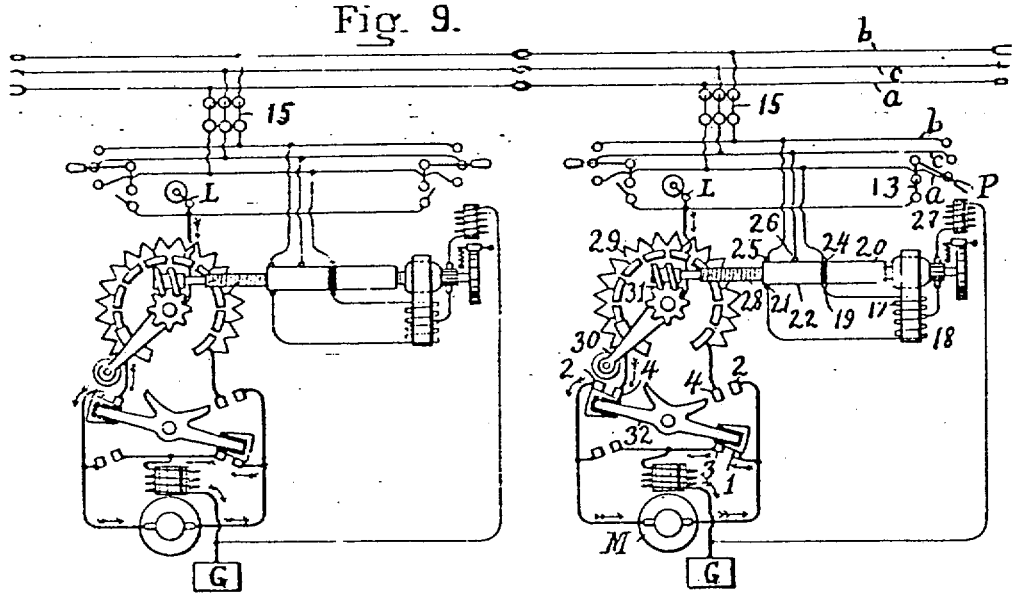
Figure 10:
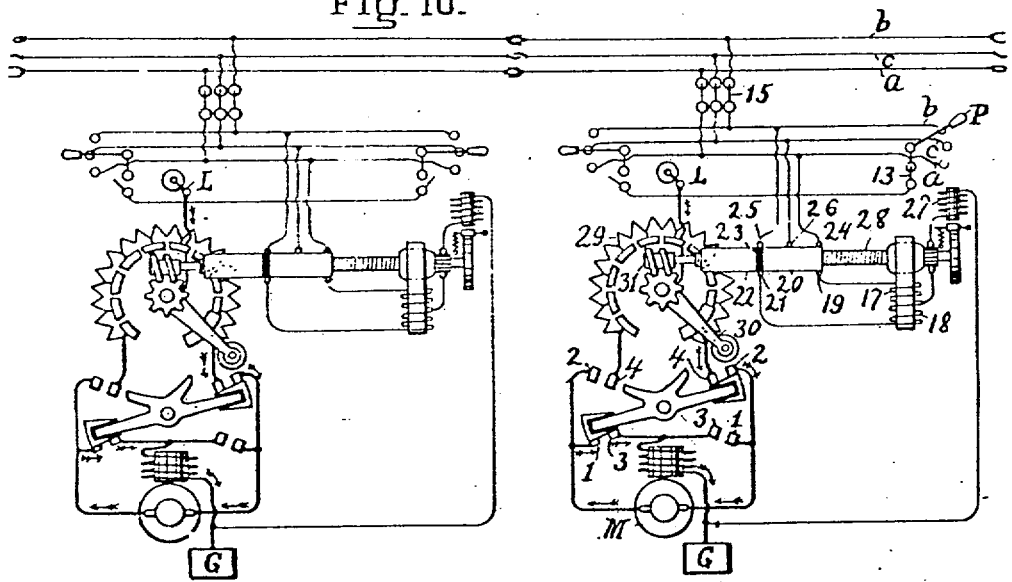
Figure 13:
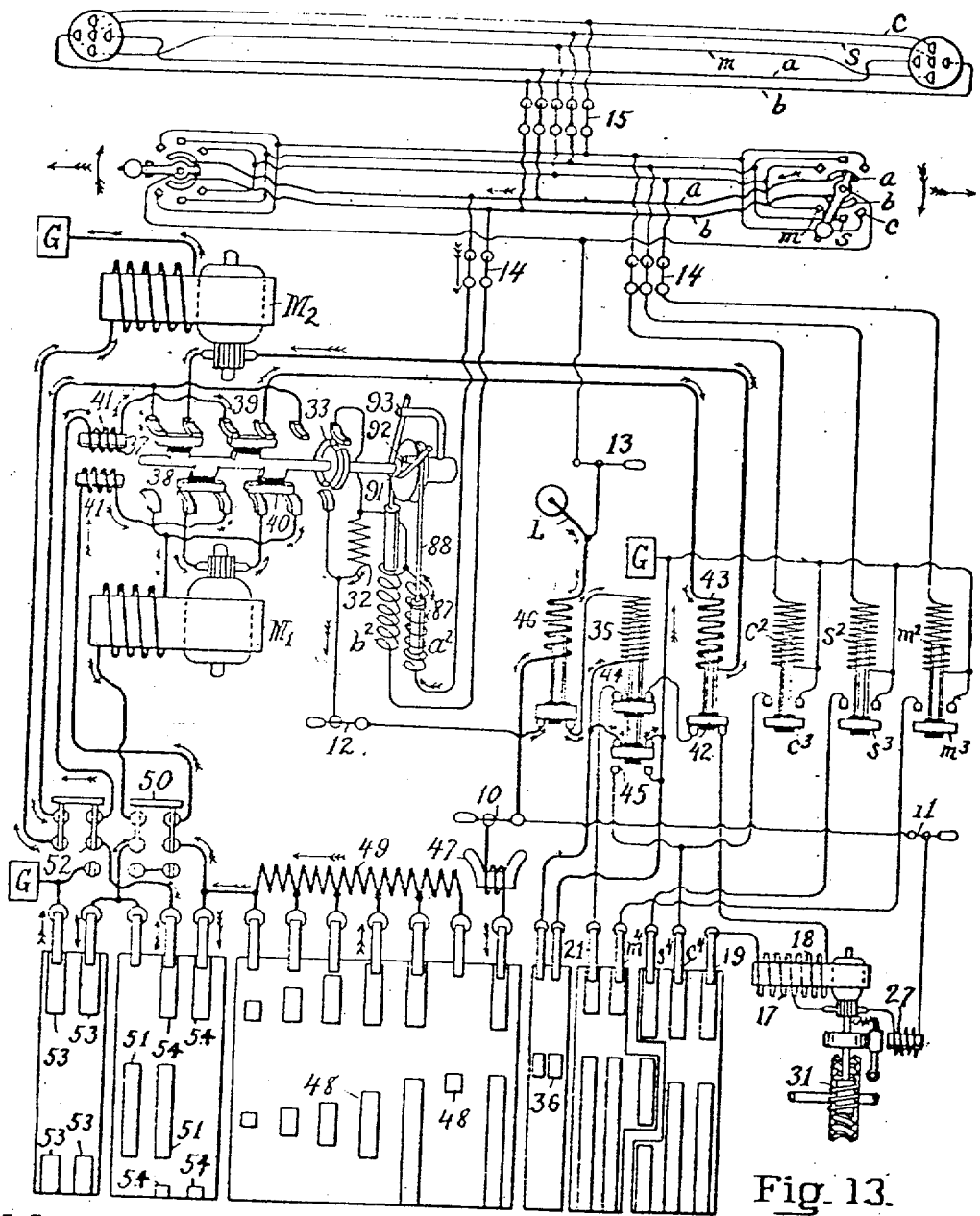
Figure 14:
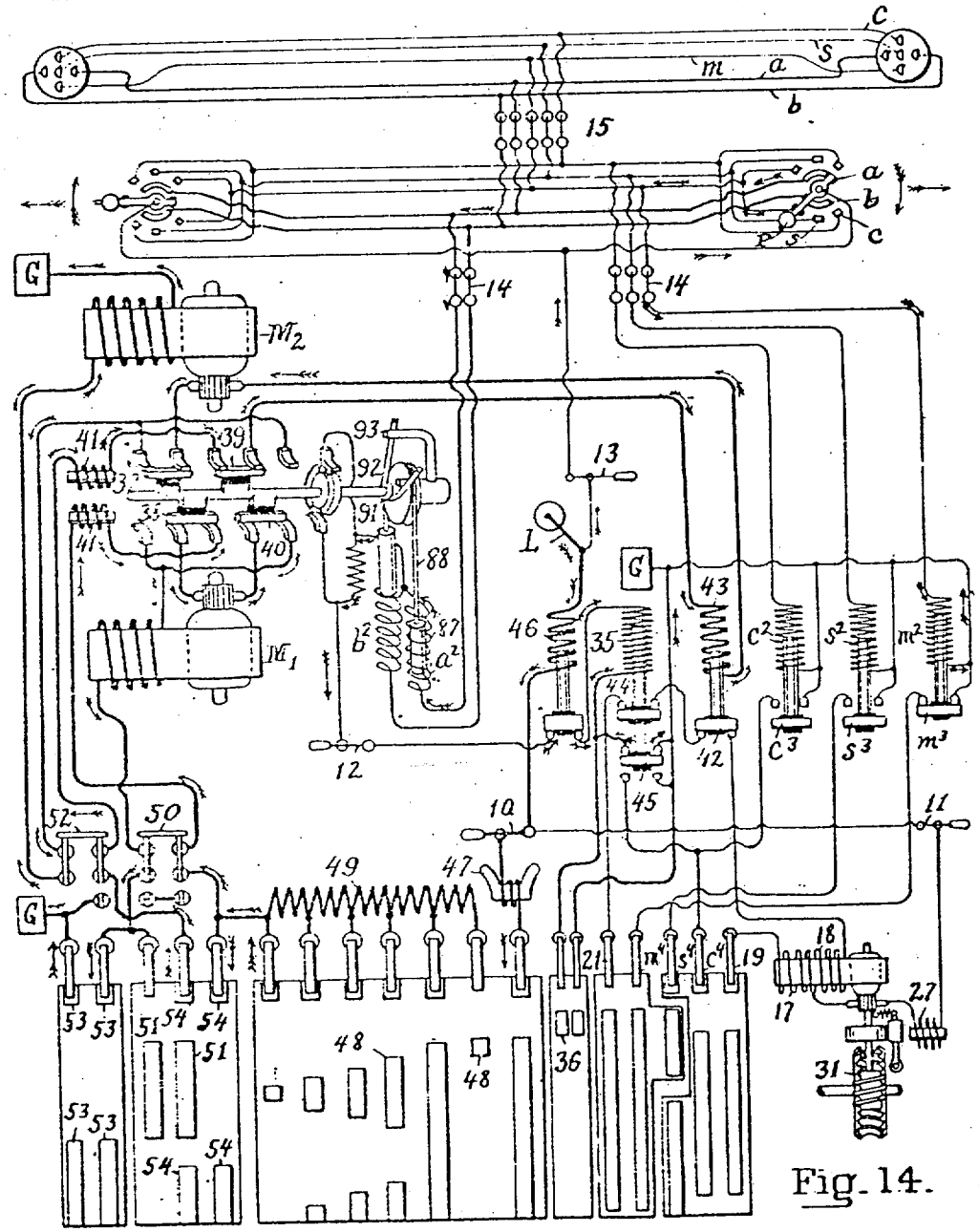
Figure 15:
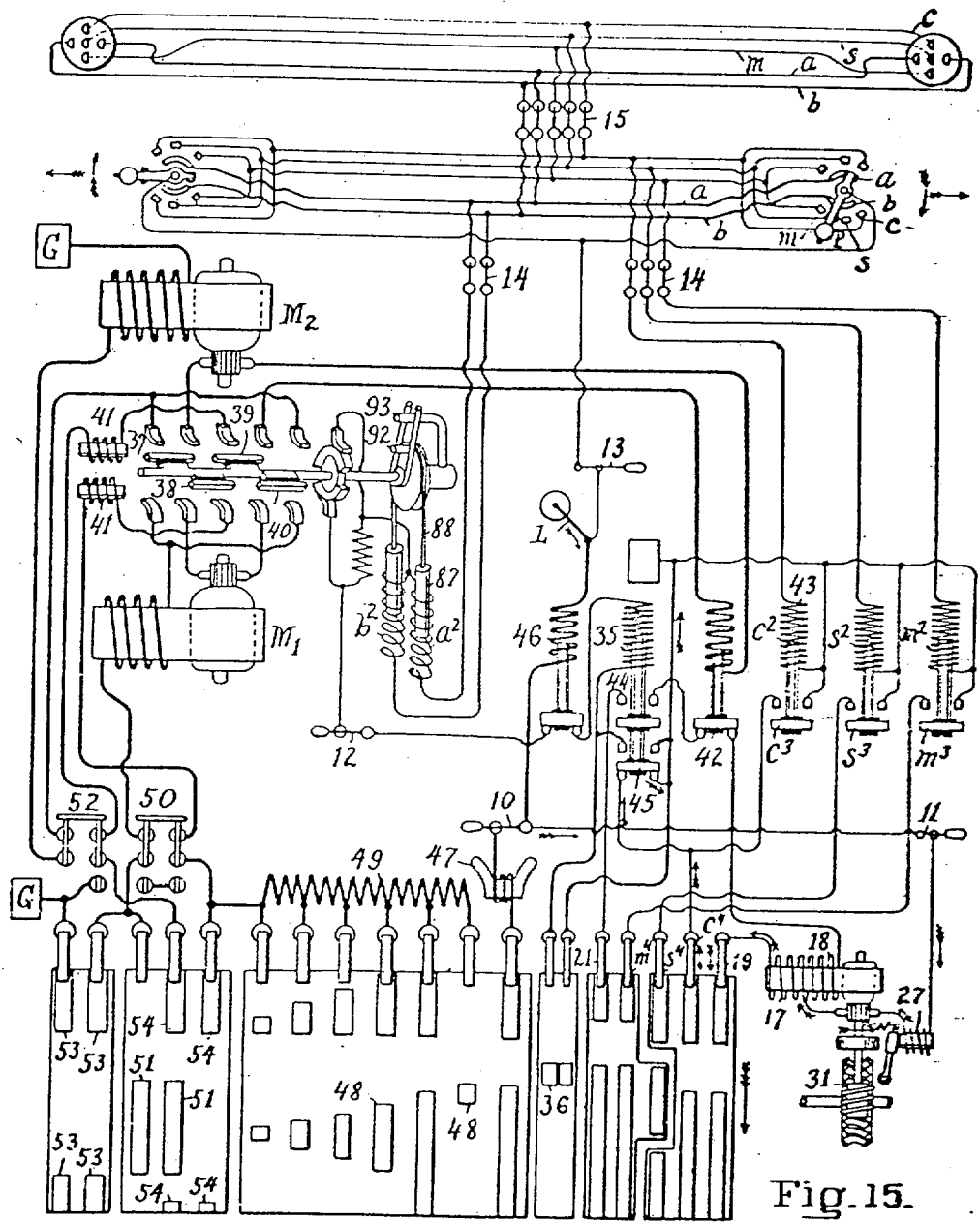
Figure 63:
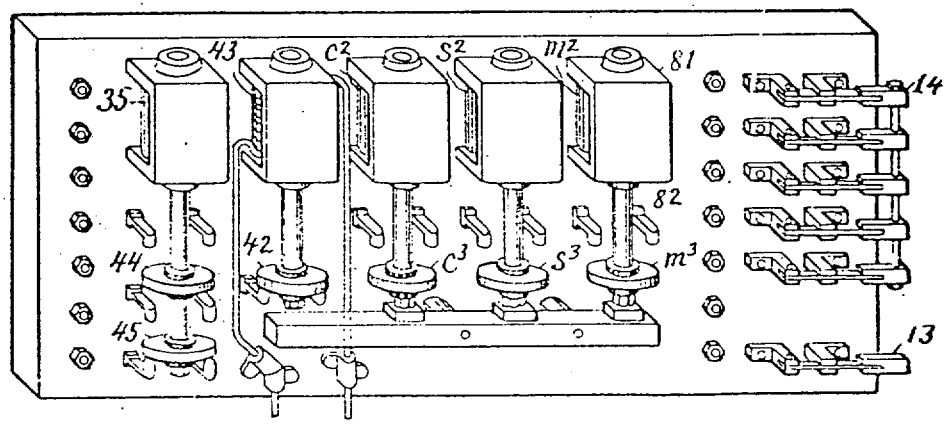
Figure 64:
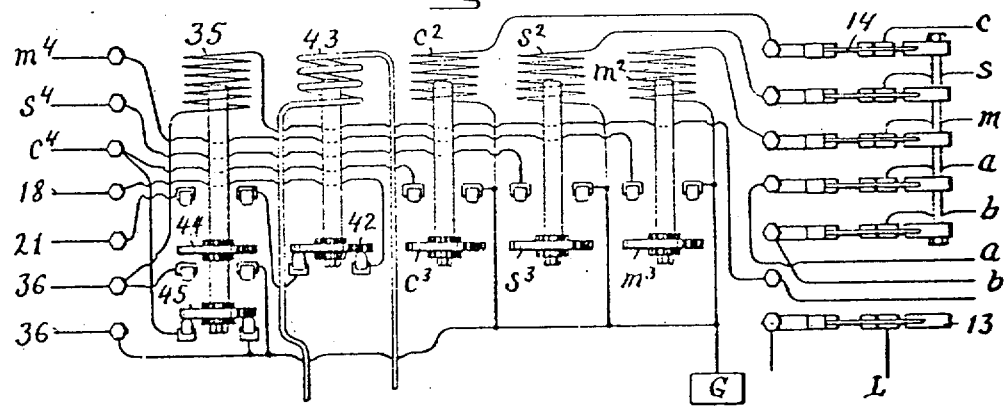
Figure 69:
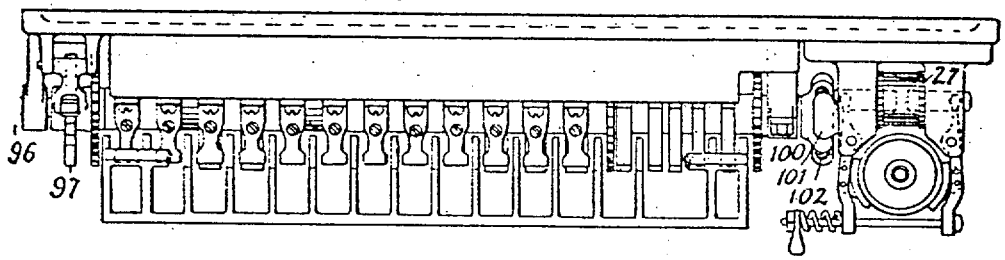
Figure 70:
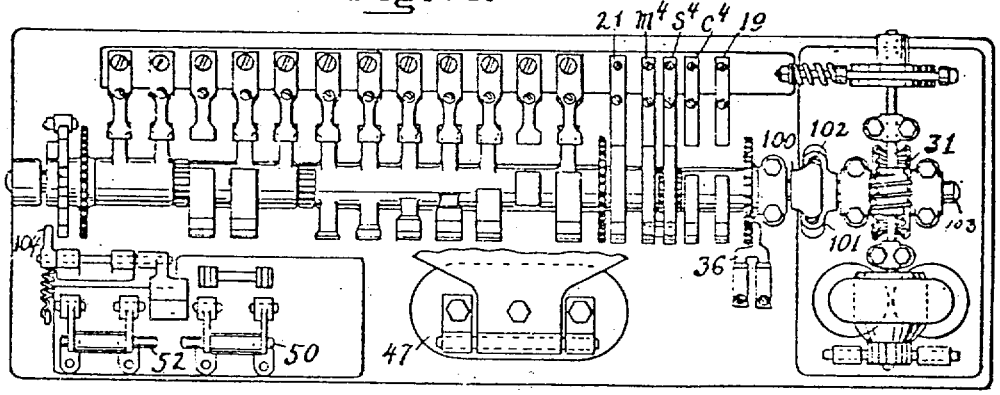
Figure 71:
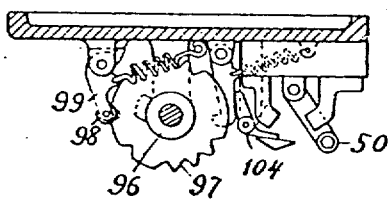
Figure 72:
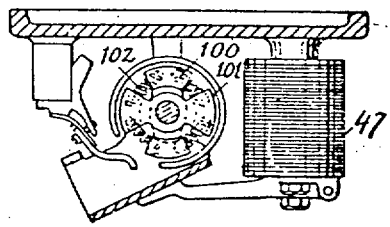

In the accompanying drawings, which form a part of this specification, Figure 1 illustrates diagrammatically a system of control in the open-circuit condition. Fig. 2 illustrates the same system in condition for movement ahead. Fig. 3 illustrates the same system in condition for movement backward. Fig. 4 illustrates the system in open-circuit condition, but modified by the introduction of a rheostat. Figs. 5 and 6 are diagrams of pilot-motor-controlling systems. Figs. 7, 8, 9, and 10 are positional diagrams representing open, ahead at intermediate speed, ahead at full speed, and backward at full speed conditions of a system somewhat modified, but in the main that of Fig. 4, combined with the pilot-motor control. Figs. 11, 12, 13, and 14 are diagrams of a series-multiple system with pilot-motor control, the pilot-motor circuits being relayed. The diagrams are positional, showing, respectively, open, series, lap multiple, and full multiple conditions of the connections for the pilot-motor and other operative circuits. Fig. 15 illustrates the condition assumed by the system of Figs. 11 to 14 upon failure and restoration of the line potential at lap multiple position. Figs. 16 to 44 are diagrams illustrating the different arrangements of train-wires with a view to securing proper connections irrespective of the end relations of the cars when coupled to form trains. Figs. 45 to 56 are details of car-couplings. Figs. 57 to 62 are views of a platform-switch or parts thereof. Fig. 63 is a perspective of the relay-board. Fig. 64 is a diagram of the electrical connections and switches of the relay-board. Figs. 65 to 68 are views of the reverser. Figs. 69 to 72 are views of the main switch and pilot-motor and details of the mechanical connections thereof. Fig. 73 is a plan view showing an equipped car.

System of Control.

In its general features the train system can be described as made up of the car systems and the train-line. The car systems comprise the motors, the main-circuit controllers, and means for operating the controllers.

The driving-motors are preferably connected directly to the source of supply at each car through a local or car-motor circuit. They may be provided with any known means of immediately controlling them. Thus they may have simple plunger magnets or relays which can reverse the armature-circuits and at the same time establish supply-circuit connections, or in addition to this reversing mechanism there may be an independent relay to close the circuit to the supply, or, to give control of speed as well as of direction of rotation, single or multiple magnets may be provided which operate rheostats or rheostat-sections, either by single or stepped movements, to establish the proper connections. Instead of simple magnets for operating the rheostat other forms of relays or relaying devices, mechanical or electrical, with pilot mechanisms electrically or otherwise operated and electrically controlled, may be provided, which will admit of the resistance being varied at will, and finally controllers may be provided for varying not only the resistance in circuit with and the direction in which the motors are connected to the source of supply, but also the connection of two or more motors relatively to each other. The term "controller" will be hereinafter used as designating any or all of the above (or equivalent) devices for regulating, reversing, or grouping the motors. These various instrumentalities for connecting up and regulating the motors are to be operated primarily, of course, from the platform. This is accomplished by another element of the combination—namely, an initial controlling or governing or master circuit and switch, through which are energized magnets or pilot mechanisms or other instrumentalities on each equipped car, whereby the operation of the driving-motors is initiated and governed. This switch will be called the "operator's" switch, or, from its preferred location, the "platform-switch," or, from its function, the "master-switch" or "master-controller," there usually being for convenience one on each platform of each equipped car, the two being connected by a cable. Of course there may be provided only a single operator's switch on a car, and this may be operated mechanically or by suitable means from devices placed on the platforms thereof, or connections may be provided at one or more points at which a master-switch can be connected. This controlling-circuit may be called a "relay-circuit." The terms "relay" and "relay-circuit" are used broadly to indicate a secondary operating-circuit through which a primary or main circuit is controlled. If connected to the same source, it should be independent of and in parallel relation with the driving-motor circuits. It might obviously be supplied from a separate source. Thus there are essentially in the system the main-motor circuits, contacts which control them, devices which control the contacts, and a controlling circuit or circuits for these devices.

This is a general description of a complete electrical equipment on a car, with of course any additions for governing the speed or movement of relays, pilot mechanisms, or motors, or the like automatically or at will and for connecting and disconnecting the platform-switches and the train-line from each other or from the local operative circuits.

If two or more individually-equipped cars are to be coupled into a train, there becomes necessary an additional element—namely, train connections or a train line and couplers. This train-line connects all the platform-switches and all the relay-circuits together. In its simplest form it may be a part of the operator's-switch line—i. e., there may be a simple cable of two or more wires running from one end of the car to the other, branching to the operator's switch or switches and to the couplings. Usually, however, the platform-switch cable and through-train line are run independently with means for connecting and disconnecting in various combinations these and the circuits in which are placed the relays or other instrumentalities for operating the controllers. This is a more convenient arrangement in testing, inspecting, and in operating cars together in a train, where it is sometimes necessary to transmit controlling-currents from or through a car without energizing the equipment on that car. The expression "train-line" is sometimes used where only one train-wire is referred to and is sometimes used where the train-line is made up of a number of distinct train-wires. It will be clear, however, from the context whether there must be one or several or whether it is a matter of indifference how many there may be. The expression "train connections" is sometimes used instead of "train-line" where the couplings are a prominent feature, and sometimes the expression "train-wires" is used for "train-line" where the presence of individual wires is emphasized.

It will be seen that there are two distinct sets of circuits. One set comprises the driving-motor circuits, each local to its car and connected with a source of supply by the collecting shoe or shoes. These circuits include the driving-motors and their controlling-contacts and are connected to a source of supply independently of the operator's switches and the relay-circuit, except for the contacts controlled by the relay-circuit. It is important that each motor equipment shall be thus connected through its individual main-circuit system as nearly as possible directly across the line when the resistance of the controller is all cut out—that is, with the least length of useless conductor in circuit. With motors of large capacity this becomes particularly important to equalize the work on the motors in different parts of the train, because on account of the very low resistance of a large-sized motor, amounting on one-hundred-horse-power motors, say, to only about an eighth of an ohm, if long leads enter into the circuit normally there will, when such motors are in parallel circuit with motors having only short leads, be a considerable difference in the current which the motors will take, and hence inequality in the duty performed. The other set is the controlling or governing circuit and is made up of the train-line to which all the operator's switches and the relays are connected, preferably in multiple. This is a train-circuit extending through all the cars when a plurality of cars are connected together. It is energized from a source of supply at the particular operator's switch which is in use, and if the supply-circuit for the train-line includes a grounded connection it is preferable that the grounded connection be made at the relay ends and not at the platform-switch ends of the train-line, thus leaving the train-line normally dead and avoiding the liability of accidentally energizing the train-line and relays by grounding. In most of the systems shown there is preferably a master or governing or operator's switch on each platform of each car. This is the ordinary practice; but as they are light they might be placed elsewhere in the car and be operated by devices on the platform and mechanically connected with them. If the switches are on the platforms, it is evident that two or more push-buttons can take the place of contacts actuated by a single handle, or the speed and direction determining contacts may be actuated by two different sets of handles or push-buttons; but such variation is obviously a matter of convenience, and the system will be discussed on the supposition that there is an operator's or master switch on each platform. These platform-switches are alike and are similarly positioned with relation to the platforms on which they are located. They are each provided with contacts for energizing the train-wires at will. When one of the operator's or master switches is closed at the forward or "ahead" contact, as that term is herein used, the car will move along the track with that platform in front on which the switch that is being operated is located. When a switch is closed at the "back" contact, as that term is herein used, the car will move with the platform in the rear on which is located the switch that is operated. These terms are selected with reference to an operator standing on either platform with his hand on that master-switch and looking at the track, and the terms "forward" and "back" are relative to the facing direction of the operator, although the actual track movement of the car produced by closing the forward contact or the back contact of the switch on one platform is opposite to that produced by closing the similarly-named contacts of the switch on the other platform of the same car. The two platform-switches of every car are connected with each other, the forward or ahead contact of one being connected with the back contact of the other. It results from the observance of the conditions above named that like movement of the operator's hand at either switch will effect opposite reverser connections in the two switches and will result in like movement of the car relative to the operator stationed upon the platform, as above indicated, although the car movement on the track is reversed.

In order that the cars may be properly coupled together, the portion of the train-line that is embraced on each car must be provided with train connections, which are couplings properly arranged, as hereinafter fully explained, so that the cars can be coupled without regard to number or sequence, and preferably also without regard to end relation and that like hand movement at the platform-switch at either end of any car will produce like movement of the car and train relative to the operator standing upon the platform, as above explained with reference to a single car; but if a car is turned end for end in a train, thus changing the end relation of that car with the contiguous car or cars, the rotation of the driving motor or motors thereon must be reversed if the direction of movement of the car which is turned end for end is to be the same as that of the rest of the train. With certain arrangements of direction-controlling circuits they will not work right for either reversal or change of sequence of cars. For others they will work right for change of sequence, but not for reversal. With another system—the preferable one—they will work all right for reversal of cars and necessarily also with any change of sequence. These comments refer to the direction-controlling wires alone. Speed-controlling wires when separate are governed by a different law.

To get correct operation, the proper provision must be made in the arrangements for coupling the cars, because while on some roads cars can be kept headed in one direction on others cars run around a loop or go in and out of yards at different switches and in other ways may become reversed on the main track, whereby different end relations and groupings of the cars result. On almost all roads the sequence and grouping of cars must be constantly changing. The proper coupling of the cars is secured by properly pairing the couplings which form the ends of the train-wires, either in location or formation, as will be explained later on. It results from thus properly coupling the cars where there is an operator's switch on each platform that irrespective of sequence or of end relation of the cars or their number there are two distinct directional train-wires, to each of which are connected the forward contact of one switch, the back contact of the next, the forward contact of the third switch, the back contact of the fourth, and so on alternately throughout the train; but the order of alternation of these contacts is reversed in the two train-wires, one beginning with a forward contact and the other with a back contact at each end of the train. If the conditions herein set forth are observed, like movement of the operator's hand at the switch on any platform on the entire train will produce like directional movement relative to the facing direction of the operator. For example, if the operator's switch is provided with a handle and that handle be moved, say, to the right, the train will move with that platform forward on which the switch that he is operating stands.

Not only should there be a system as indicated, for properly pairing direction-controlling circuits which are reversed as the cars are reversed, but the wire or wires determining any particular degree of movement or set of controllers for speed or for grouping the motors must be so arranged as to insure proper pairing of like wires, which in this case must avoid reversal, as will be explained more at length later.

It will be convenient to group here definitions of the different circuits, which will hereinafter be more fully discussed.

1. *Car-motor circuit.*—This includes the main motor or motors, the contacts with the supply-circuit, and the reverser, rheostat, grouping, or other modifying contacts which operate in the circuit of the main motors.

2. *Local operative or controlling circuit.*—This includes the relay or magnet coils, pilot-motors, or whatever directly moves or controls the main motor-controllers or actuates main controlling-contacts when the system is entirely electric or controls the pilot mechanism if some other power than electricity is used to move the main controllers.

3. *Platform-switch line.*—This on a single car becomes a part of the local operative circuit and on a train energizes all the local operative or controlling circuits through the intermediary of the particular platform-switch in use and the electrical train or governing lines on it and the other cars.

4. *Train or governing line.*—This is the continuing cable running from one car to another, which at one or more points is connected, on the one hand, to the platform-switch line and, on the other hand, to the local operative circuits. It is made up of the permanently-placed train-line on the several cars and the couplers or jumpers connecting them together. It may evidently be common to cars which are equipped with and to cars which are not equipped with motors. It is the independent means of transmitting an initial and governing impulse from any one of a number of points.

In most of the train systems illustrated the opening of the platform-switch which is being used causes the main circuits of the driving-motors to open instantly. This, as shown, is effected at the reversers, which are gravity of spring retracted and are held closed by the action of their relays, and it is very important that either there or elsewhere means should be provided for cutting off the current from the main motors the instant a controlling-circuit is opened at the operator's switch.

As will be described more specifically later, the operator's switches, as well as the reversers, are preferably provided with springs, against which they must be held in operative position. If the operator lets go of the switch intentionally or by reason of an accident happening to him or in case of an emergency, as in the event of the sticking of any of the current-varying controlling apparatus, or if for any cause he desires to throw the master-controller promptly yet safely to the reverse position, not only is the main circuit immediately opened at any magnet operated or controlled contacts, but if the main controller is pilot-motor driven there is established a local circuit on each car simultaneously or subsequently to restore the controllers on the cars to off position. It is of course evident that a part only of the operator's switch may be spring-retracted and only some specific part of the relay-circuit opened. As illustrated, the operator's switch is spring-retracted to coast position, in which position it will cause the controllers to be restored to off position and open the main motor-circuit, but will not cause the reversers to open circuit. The end of the handle can be beveled, so that if allowed to come back quickly it will pass the stop and entirely open the operator's switch, or the coasting stop-lug can be left off entirely. Such points are details to be settled by convenience. If a direction-controlling wire should burn off or break in the governing cable or coupling or the train should part, the current in the main motors will be automatically cut off at any magnet-operated contact and connections locally established, whereby all power-operated controllers so affected will be restored to open position, and preferably the current cannot be again put to them until they have been restored to or toward this open position. Of course if instead of a power-operated controller the various steps of the rheostat or the grouping-contacts are determined by magnets, as in the simpler forms, then opening of the circuit on the controlling-cables will open the contacts at the various relays.

It will be seen from the foregoing that a broad underlying idea is the operation and control or the control by electrical means from master-switches of any and all controllers of any kind, reversers, and grouping or other like switches, independently or collectively, at the same or different times, however combined or grouped and wherever placed and whether there be a single car or a train with one or more fully or parti-'' v equipped cars, which may be preferably connected in any desired order and end relation, and that the various equipments may be operated either locally or at one or more distant points.

Reference will be had to several systems of control, beginning with the simplest.

(a) In the system illustrated in Figs. 1 to 3 for simplicity only one motor M is shown on each car. The controller mechanism is merely a reverser. The armature of the motor is connected with the reverser, which, as shown, consists of two coils $R'$ $R^2$ and contacts controlled thereby. Each brush of the motor-armature is connected to two contact-points 1 and 2. The field is connected at one side to the ground at G and at the other side to two contact-points 3, which lie in juxtaposition with points 1. The source of supply L is connected with two contacts 4, which lie in juxtaposition with points 2. Each reverser-coil is provided with a plunger, which carries a connecting-plate 5, whereby the pairs of points 1 and 3 or 2 and 4 are connected, according as the plunger is down or raised. Therefore if one of the coils of the reverser is energized and the other not one brush of the armature is connected to the source of supply and the other to the field-coil and through the field-coil to the ground. The coils of the reverser are grounded at G and are connected one to one train-wire $a$ and the other to the other, $b$. The two halves of the reverser are distinct from each other. There is a platform-switch shown for each platform. The handle P of the platform-switch in use is connected to the source of supply L, and by moving it in one direction or the other it can be brought in contact with one or the other of two contact-points, one connected with the train-wire $a$ and the other with the train-wire $b$. There are also provided springs 6 for bringing the handle when released to the open position of the switch. The train connections consist of the train-wires $a$ and $b$ and suitable couplings therefor, each train-wire terminating in a plug 7 at one end and a socket 8 at the other end, there being a plug of one wire and the socket of the other at each end of the car. The different motors are connected to the source of supply in multiple, and the connections of the motors to the source of supply are around the train-line and the platform-switches and are independent thereof, except as these switches control the contacts at the reverser. The coils $R'$ and $R^2$ are relay-coils, and the contacts 1 3 5 and 2 4 5 are relay-contacts. This system is shown in Fig. 1 in the open-circuit position, when none of the motors are connected to the source of supply, in Fig. 2 in the position for driving the train ahead, the platform-switch at the front end of the right-hand car being shown as closed on train-wire $a$, the relay-contacts 2 4 5 on each car being shown as closed by coil $R'$, and the other parts of the system in the same positions which they occupy in Fig. 1, and in Fig. 3 in the position of the parts for backing the train, the platform-switch on the front end of the right-hand car being closed to wire $b$, the relay-contacts 2 3 5 being shown as closed by coil $R^2$, and the other parts of the system being shown in the same position which they occupy in Fig. 1. In Fig. 4 the controller is shown as consisting of a rheostat 9, inserted in connection with the reverser, the parts being in the open-circuit position. Switches 10, 11, 12, and 13 in this and other systems will be described later.

(b) Another simple system embodying the broad features of my invention consists in providing suitable secondary apparatus or pilot mechanism, such as pilot-motors or solenoids, to secure pilot control for the driving-motors. For simplicity in the first illustrations given, Figs. 5 and 6, the driving-motors and the switches of the driving-motors are omitted, the pilot-motors, the pilot-motor-limit-circuit interrupter or switches, the platform-switches, and train-line alone being shown. This particular form approximates to some of my special elevator practice, wherein a number of elevators are each provided with a car-switch and are all connected to a switchboard at some other point, as in the basement of a building, from which any one of the elevators can be operated. In the system of Figs. 5 and 6 each platform-switch is provided with three contacts—viz., a head connected to wire $a$, stop or coast connected to wire $c$, and back connected to wire $b$—and corresponding points of all the platform-switches are connected to the train-line, which includes a third train-wire $c$. In Fig. 5 each platform-switch is connected to its pilot-motor through a switch 14. In Fig. 6 each platform switch is connected to the train-line through a switch 15. In Fig. 5 the wires connecting the pilot-motor and platform-switch on any car are connected to the train-line through another switch 16. In the arrangement shown in Fig. 5 any number of the pilot-motors can be operated from any platform-switch, and any pilot-motor-limit-circuit interrupter or any platform-switch can, if desired, be cut off without impairing the train system. In the arrangement shown in Fig. 6 the switch 16 is between the pilot-motor and the platform-switch as well as between the pilot-motor and the train-line, and the pilot-motor on any car can be cut off without cutting off the platform-switch of the car. When any one of the platform-switches is closed, all of the pilot-motors are connected to the source of supply through the pilot-motor-limit-circuit interrupter operated by the pilot-motors themselves. The pilot-motors are provided with two field-coils 17 and 18, oppositely wound, or may be provided with a single field and two armature-coils oppositely wound. A terminal of one of these fields is connected to a brush 19, which bears on an elongated contact-plate 20 on the pilot-motor switch, and a terminal of the other field is connected to a brush 21, which bears upon another elongated contact-plate 22 on the pilot-motor switch. These two elongated plates 20 and 22 are separated by a strip of insulation 23 and mounted on a reciprocating block, which is mounted on the screw-shaft of the pilot-motor. As will appear hereinafter, the elongated contacts and their separating-strips of insulation are limit-contacts to cause the pilot-motors, if allowed to run long enough, to stop automatically and independently. On the other side of the elongated plates are mounted three brushes 24 25 26. One of these, 24, which normally bears upon one of the elongated plates, (see Fig. 7,) is connected to the forward contact of the platform-switch, another, 25, which normally bears upon the other elongated plate, is connected to the back contact of the platform-switch, and the third, 26, which is intermediate and normally bears upon the insulating-strip 23 between the elongated contact-plates, is connected to the coast-contact of the platform-switch. If the platform-switch is closed at any contact, the pilot-motor rotates in one direction or the other, but always in such direction as to bring the intermediate insulation under the contact through which the circuit is closed, the pilot-motor running until the circuit is automatically broken, if the platform-switch is kept closed so long. The pilot-motor may be reversed by closing either of the other two contacts. If after the switch has been moved to the one side or the other from coast position, as by closure of the forward contact, the coast-contact be closed, the pilot-motor will run until the intermediate insulation is brought under the coast-contact on the pilot-motor-circuit interrupter, and if the back contact is closed the pilot-motor will run till the pilot-motor-circuit interrupter is entirely reversed and automatically stopped at the opposite extreme if the platform-switch is kept closed so long. Thus it appears that each controller is operated or controlled by the coöperation of the platform-switch and the pilot-motor-circuit interrupter, which is in effect an automatic stop or circuit-interrupter and in conjunction with the pilot-motor is an automatic stop for the controller. A magnetic brake 27, acting on the pilot-motor shaft 28, stops the pilot-motor and the main switch as soon as the circuit is opened.

There is illustrated in Figs. 7, 8, 9, and 10 a simple arrangement for operating a driving-motor by means of a controller, which, as illustrated in these figures, consists of a combined reverser and rheostat for the driving-motor operated by means of a pilot-motor, the parts being shown in several positions—viz., the open, lap or slow speed ahead, full-speed ahead, and full-speed back positions. Referring first to the open position, Fig. 7, it will be seen that a rheostat 29 is connected between the source of supply and the driving-motor in connection with a reverser, substantially as in Fig. 4. The arm 30 of the rheostat is connected electrically to the source of supply and is mechanically connected to the pilot-motor shaft by worm-gearing 31. As the pilot-motor is run in one direction or the other the arm of the rheostat will be rotated in one direction or the other. The arm of the rheostat actuates a reverser-arm 32, opening the reverser when the arm of the rheostat is at zero position and closing the reverser on one side or the other when the arm of the rheostat moves to the right or left from the zero position. If the arms of the rheostats are moved to the right from the position shown in Fig. 7 to the position shown in Fig. 8 and the platform-switch be then opened, the driving-motors will be connected to the line in multiple through the arms of the rheostat and through so much of the resistance of the rheostats as may be left in the circuit. If the platform-switch is kept closed long enough to permit the full movement of the pilot-motor-circuit interrupter and the rheostat-arms permitted by the limit-contacts or automatic stops of the pilot-motor-circuit interrupter, the entire resistance of the rheostats will be cut out and the system will be brought into the position of full speed ahead. (Illustrated in Fig. 9.) If the rheostat-arms be moved from the position of rest in the opposite direction by closure of the reverse or back contact of a platform-switch, the rheostat-arms will close the reversers on the opposite contacts to those already described and will move around until a part or, if the platform-switch be closed so long, all of the resistance of the rheostats is cut out, and the system will be in the position of full speed backward. (Illustrated in Fig. 10.) If allowed to run long enough, the pilot-motors, independently of the operator's switch and automatically, stop, each when the controller reaches any one of certain definite positions—viz., the open position or either of the full-speed positions. It will be observed that in all of the forms shown in Figs. 7 to 10, wherein the pilot-motor actuates the reverser, the pilot-motor circuits are distinct from the driving-motor circuits, as in Figs. 1 to 4. The pilot-motor circuits, and in the preferable form the reverser-circuits also, when the reversers are not operated by the pilot-motor, are relay-circuits. The circuits of the main motors are opened at will only by the operation of the pilot-motor, Figs. 7 to 10; but, as is illustrated in all the other systems, they can be opened on all cars simultaneously at the reversers whenever the current is cut off from the reverser relay-circuits, whether by opening the operator's switches or breaking the relay-circuits or by the failure of the current from any cause.

When pilot-motors are used in the manner indicated, it is necessary to provide means for preventing them from being connected up differently at the same time, owing to differences in their speed. This can be done by synchronizing devices for the pilot-motors, if desired; but it is simpler and better to relay the pilot-motor circuits, as will be explained in connection with Figs. 11 to 15.

(c) In the system shown in Figs. 11 to 15 the reverser and current-varying controller are separate. In case of emergency the current can be instantly cut off at the reverser by operating the platform-switch without waiting for the return of the current-varying controller to open position. The general arrangement shown in these figures for controlling the driving-motors M' and M² on the different cars is what is known as the "series-multiple" arrangement, a convenient but not essential method. This is effected through a current-varying controller consisting of a series-multiple switch and a rheostat, shown here as combined and separate from the reverser. The master-switch in this case operates to reverse the motors, to vary their speed by changing their grouping, and also to vary their speed by effecting rheostatic changes external to the motors. As here shown, this is all accomplished by a single handle, and it can also be accomplished by a single movement of that handle. It is obvious that the master-switch can have two or more moving parts to effect the same results. The current-varying controller and a pilot-motor-circuit interrupter are mounted upon a common support or spindle, which is operated by a pilot-motor. These parts constitute a current-varying switch for the main motors. The series-multiple switch is supplied with contacts for throwing the two motors in series, then cutting one of them out, and finally throwing the two together in multiple. Each fully-equipped car is equipped with a reverser, a pilot-motor, a current-varying switch for each pair of driving-motors, and two platform-switches. As in the system above described, in which there is a reverser operated by the pilot-motor, the platform-switches are provided with contacts, each of which corresponds to a certain position of the main switch. They are also provided with reverser-contacts. It is not necessary that the contacts which operate the various switches should be consolidated in a single switch, though it is desirable. Corresponding points of all the platform-switches on each of the cars are connected through the train-line, so that a given effect will be produced or the system be brought into a given condition on all the cars by closure of any one of the platform-switches upon the proper point for the proper length of time, each pilot-motor automatically and independently stopping and causing the main switch to stop in certain definite positions. In order to prevent disturbance of operation through lack of synchronism in the various pilot-motor-circuit interrupters on the different cars, the pilot-motor switches are operated from the platform-switches and the train-line through relays which control contacts in circuits connected to the pilot-motors and the pilot-motor-circuit interrupters and which are independent of the train-line except as the relay-contacts are controlled by means of the platform-switches and the train-line. These relays therefore determine definite positions of the speed-varying controller or contacts and prevent cross connections of the pilot-motor circuits upon the different cars. Besides these relays there are safeties, which will be fully described.

To secure control of direction and control of speed as well as an automatic opening of the main circuit there are provided in each motor-circuit two switches in series having different characteristics. One is a single-throw circuit-opening device—viz., a reverser. This is preferably spring-retracted and opens the circuit immediately on failure of the line-potential whether by cutting off the current by opening the operator's switch, by breaking of the train-line, or by accidental failure of supply. The other is a graded switch—i. e., it can assume several definite successive positions. It also is a circuit-opener, but is operated by the current to open or close the circuit or regulate the current. Being inert and power-driven it stops whenever the power is cut off and remains stationary until the power is again applied to progress it farther in the same direction or move it in the opposite direction. Both of these devices are set or controlled electrically. The reverser is operated by coils connected directly to the train-line, and the speed-controller is operated by local circuits relayed from the train-line. It is evident that wherever there are two or more switches thus interpolated in a main circuit for the general purposes indicated above any one or two of the switches can be made dead—that is, remaining where they are set by the current until another application of current is made—and the remainder held in position by the current and opening automatically when the current fails without departing from the object sought in establishing two kinds of switches in series with each other. In the system shown there is also provided means for resetting or restoring the graded switch to initial position by closing a resetting-circuit, of which there is one for each controller local to the same car. The governing train-line for operating these two circuit-controlling devices—viz., the circuit closer or reverser and the motor-grouping switch or rheostat or the two combined—is provided with an initial or master circuit closer in the operator's switch and two auxiliary circuit-closers—viz., a cut-out circuit-closer which is opened by movement of the controller and a contact in parallel or shunt relation to the cut-out contact—these two being each in series with the master-circuit closer. The shunt-contact can be closed when the cut-out contact is closed and is held closed so long as the governing-circuit is energized. The governing-circuit can therefore be considered as having two branches—first, an actuating branch through the cut-out circuit-closer, which is normally closed—i. e., when the controller is at initial position and is opened when it is moved therefrom—and, second, a maintaining branch through the other circuit-closer, which opens on failure of the line. Concurrently with the opening of the maintaining branch the resetting-circuit is closed to restore the controller to initial position.

*Control of direction.*—The platform-switch is provided with a handle which is connected to the source of supply and has two directional contacts $a$ $b$. These are strips so placed that when the handle P is moved from open position the switch is always closed at one or the other of these contacts. Wires forming a reverser-circuit lead from these contacts through two solenoids $a^3$ $b^2$, forming a part of the reverser, and beyond the solenoids the two wires are united and are carried to a resistance 32 or, after the reverser operates, to contacts 33, through an overload safety-contact 34, through a solenoid 35 of an automatic safety-reverser relay, and through a cut-out switch 36 on the main switch-block to ground G. So long as the platform-switch is closed on one side the reverser is held in position to connect the armatures of the driving-motors up to the source of supply in one direction, and so long as it is closed on the other side the reverser is held in position to connect the armatures of the driving-motors with the source of supply in the other direction, the fields not being reversed. As soon as the platform-switch is opened the reverser opens the main-motor circuit without regard to the position of the main switch and independently thereof. Thus there is one set of train-wires for closing and maintaining the direction-controlling circuits and another set for speed regulation, and the operator's switch is so constructed that one of the wires of the first set can be closed and held closed, while any wire of the other set is opened and closed at will. The driving-motors are series motors, and the reversal of their armatures without reversing their fields reverses the direction of rotation of the armatures, and hence the direction of movement of the train, as in all the other figures. The reverser is provided with four contact-plates 37, 38, 39, and 40, two of which connect with one of the driving-motors and the other two with the other of the driving-motors when the reverser is closed. It will be seen from the construction of the reverser, to be described in detail below, that the gap of the magnet is diminished as the reverser is thrown over. Therefore less current is needed in the coils to hold the reverser closed than to throw it over. Resistance 32 is brought into circuit to cut down the current just before the reverser reaches the limit of its throw. This resistance secures quick action of the reverser and diminished inconvenience and risk of sticking on opening the circuit, saves current, renders it practicable to use larger current to throw the reverser, so as to secure quick closure of the circuit even when the potential on the line is below the normal value, and protects the reverser-coils which remain in the circuit from being burned out by the ordinary current or current due to abnormally-high potential on the line. Of course either coil may be used to help open the circuit. The connections of the driving-motor armatures will be described later, with the switches therefor.

Comparing the system of reversing in the particular apparatus here described with the forms which precede it, it will be noted that in all cases there is essentially a train-line-reversing circuit which determines direction of movement and which may or may not have an additional function or be supplemented by train-lines or conductors having other functions.

In the system shown in Figs. 1 to 3 the train-line circuit simply establishes direction-controlling contacts, but does not vary the speed. In the system shown in Fig. 4 the direction-controlling contacts are established by the train-line, and in addition the same train-line by means of solenoids graduates the admission of current into the main motors through independent rheostats. In the system shown in Figs. 7 to 10 the reversing train-lines, through the medium of a pilot-motor, first operate dead-throw reversers and circuit-openers and then vary the speed at will by means of a rheostat. In the system shown in Figs. 11 to 15 the reversing train-line establishes independently the position of the main reversing-contacts, and the variation of speed is determined independently. This last is the preferable method, for it makes distinctive the apparatus and circuits for determining direction of movement and variation in speed of movement, whether the variation be established by a grouping of the motors or varying the amount of resistance in circuit with them or a combination of both methods. There is therefore in this latter method the fundamental idea of a train-controlling system having a plurality of motor equipments in which the direction-controlling contacts are controlled or actuated by an independent train-line from one or more points, and in addition and independently thereof means are provided for varying the speed of the motors. It is also to be noted that the local circuits of the apparatus for determining the direction of movement and speed of movement are electrically interconnected.

*Control of speed.*—It will be seen that in the platform-switch there are three pairs of contacts for regulating or controlling speed, the two contacts of each pair being connected together and disposed in corresponding positions on the two sides of the switch. On closing the switch at either side thereof on one of the first pair of speed-controlling contacts, which will be called hereinafter the "coast-contacts" $c$, no effect is produced except to energize the coast-relays $c^2$ when the system is in the normal or initial position, the wire which leads from each of the coast-relay contacts $c^3$ being open at the pilot-motor-circuit interrupter. If the platform-switch handle is carried farther around and brought into contact with one of the second or intermediate pair of speed-controlling contacts, which will be called hereinafter the "series" contacts $s$, the corresponding series speed-relay $s^2$ on each of the cars is energized, the series relay-contacts $s^3$ are closed, and the pilot-motors are each connected with the line in the circuit through a contact 42, controlled by a throttle-solenoid 43, through a safety-contact 44, closed by an automatic safety reverser-solenoid 35, through the pilot-motor-circuit interrupter, and through the relay-contacts $s^2$ to ground. The brake-magnet of the pilot-motor is energized, the brake is lifted therefrom, and the motor begins to revolve. In a similar manner closure of the platform-switch at a third speed-controlling contact, which will be called the "multiple" contact $m$, energizes the corresponding set of multiple speed-relays $m^2$, closes their contacts $m^3$, and causes the operation of the pilot-motor and main switch. It should be noted in passing that the connection through field 18 and terminal 21 is through two sets of contacts 42 and 44, the former of which is shown closed and the latter open in Fig. 11, and it is evident that the circuit can only be made alive when contacts 44 are closed, which can only be when current passes through coil 35, the latter being connected in the main reverser-circuit. If contacts 44 are broken for any reason, such as cessation of current in the coil 35, it becomes impossible again to close the circuit of the field 18 of the pilot-motor for advance movement until circuit is again closed at contact 44, as will be hereinafter explained; but with this limitation it will be seen from the foregoing general statement that on closure of a platform-switch the reversers and pilot-motors, and hence the speed-varying controllers, can be operated through a system of direction and speed determining relays to bring the system into the various conditions desired, and now it will be shown what these conditions are and how they are brought about.

Figure 11:
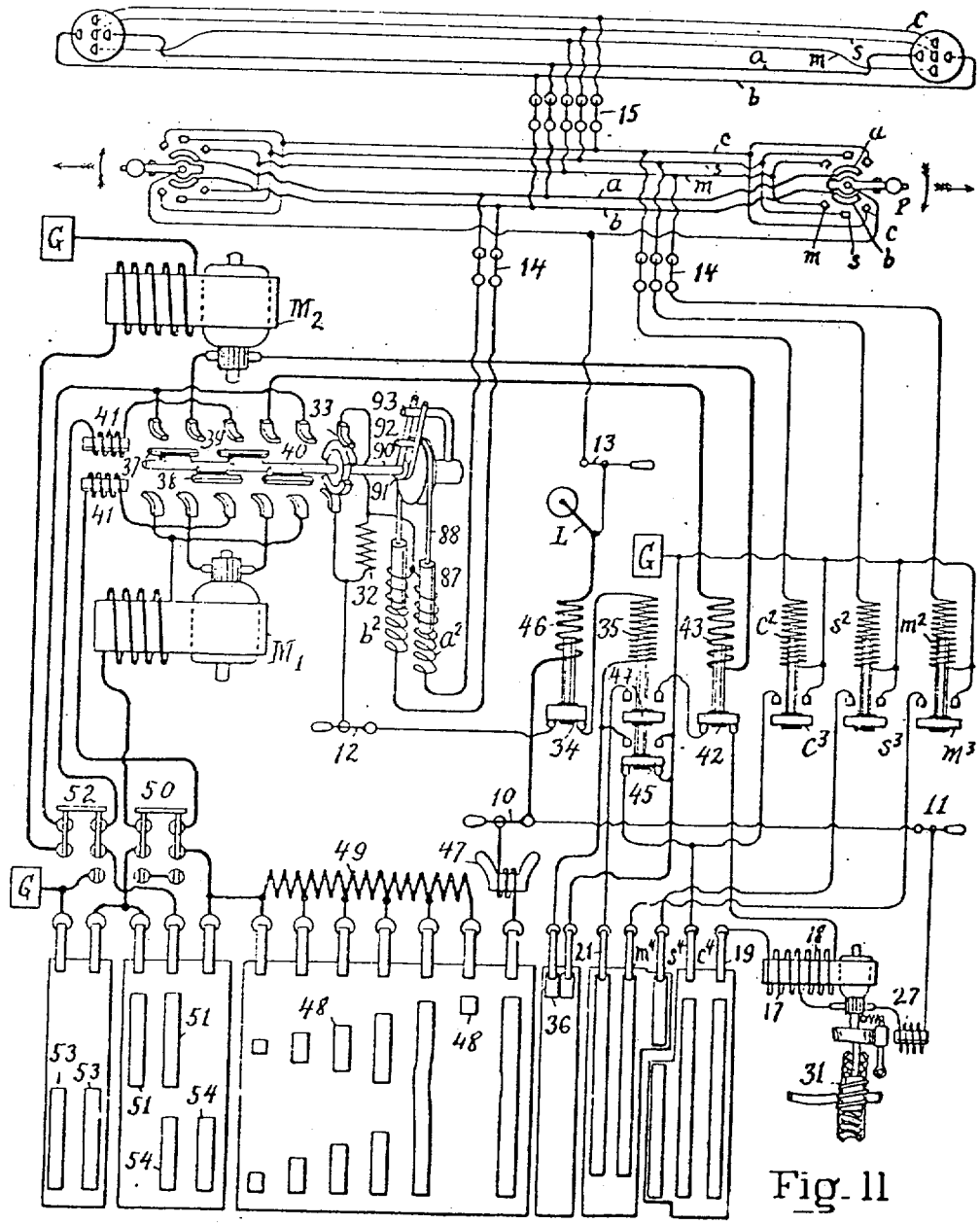
Figure 12:
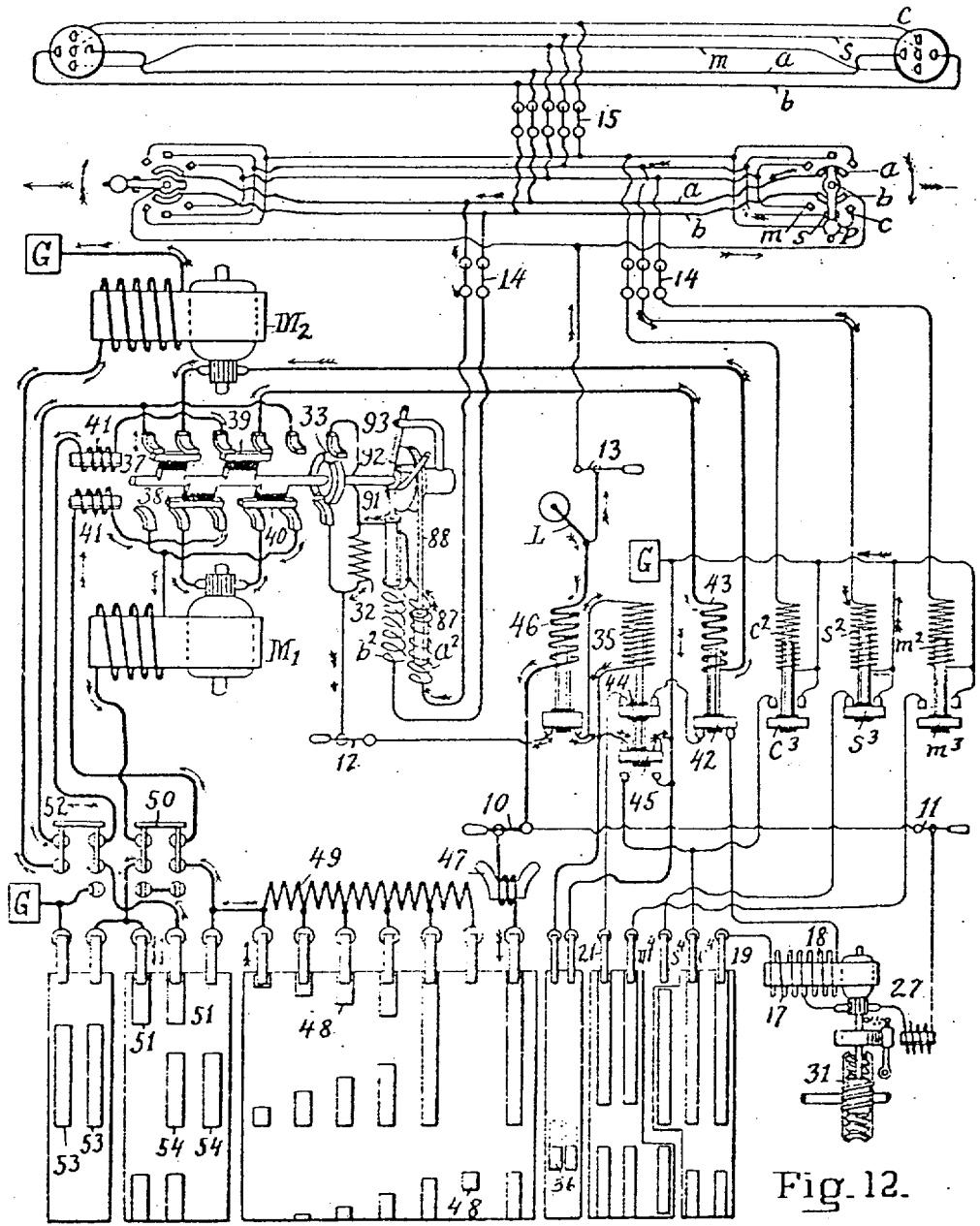

*The main switch.*—The pilot-motor-limit-circuit interrupter, the driving-motor switch, and the cut-out switch form what will be called the "main" switch. It is sometimes convenient, though not at all necessary, thus to unite these on one cylinder and to operate them from a single motor. It is divided into sections which are insulated from each other. These sections are provided with suitable contact strips or points and contact-fingers, all of the contact strips or points on any one section being connected electrically, so that if any two contact-fingers are in contact with any two contact strips or points of one and the same switch-section the two contact-fingers will be connected electrically. The contacts of the main switch have a different appearance in different figures of the drawings, but all of the contacts are shown in Fig. 11, which illustrates the switch in normal or open position. Fig. 12 illustrates the motors connected in series. Fig. 13 illustrates them in an intermediate or lap position with the motors connected in multiple, but with part of the rheostat resistance in circuit, and Fig. 14 illustrates the motors connected in multiple with all of the rheostat resistance cut out. The series and the multiple arrangements of the two motors are fixed running arrangements, either of which may be maintained under certain conditions for any length of time in operating the train. The presence of more or less of the resistance of the rheostat in circuit with the motors in either of these arrangements introduces only difference of degree and not in kind respecting the arrangements and is not desirable except for the purpose of temporarily grading the current. Therefore the motors will be spoken of broadly as connected in series or in multiple, and the contacts which effect these different positions when maintained for a sufficient length of time will be spoken of as the "series" contacts or the "multiple" contacts in further explanations. In this form it may be noted that the speed or current varying controller has a greater number of speed-determining contacts than has the operator's switch.

All of the contacts of the three sections of the controller are open in the open position of the switch, the cut-out switch 36 is closed, and the pilot-motor-circuit interrupter is closed at the series contact $s^4$ and the multiple contact $m^4$ and open at the coast-contact $c^4$. When a platform-switch is closed on the series contact, the series relay-contact $s^3$ is closed and the automatic solenoid 35 closes the pilot-motor circuit at contact 44 and by lifting contact-plate 45 breaks a ground of switch-contact $c^4$ and closes a short circuit around cut-out switch 36.

It may be pointed out here that after the bridging contact 36 on the main switch has left the position in which it closes one of the paths to coil 35, the other path in parallel circuit thereto being closed by raising the plunger actuated by coil 35, if this latter path is broken by coil 35 being deënergized, as by failure of main-line-current supply or opening of reversers from the platform-switch, it is impossible again to close the contacts actuated by 35 or to get current through the reverser, and thereby make advance movement of the pilot, until after the pilot energized through field 17 and contact 45 has restored the main switch to the first contact or coast—that is, to a safe position. It follows that no matter where the main switch may be the operator is free to reverse the master-switch instantly, and the pilot-motor governed by the automatic contacts and safeties will restore the main switch to a safe position before the reverser will again close the main-motor circuit and before the pilot can again advance the main switch, and these movements will automatically take place as soon as they are free to do so.

The function of the pilot-motor is, as described, to move the main switch in obedience to the impulses determined by the master-controller or operator's switch.

In the first series position of the main switch the driving-motors are connected to the source of supply in series through the following circuit: from the source of supply through an overload-coil 46, through a magnetic blow-out 47, through the rheostat-contacts 48, through the resistance 49 of the rheostat, through one side of a switch 50, by which motor M' can be cut out, through a magnetic blow-out 41, through one side of the reverser and driving-motor M', through the other side of the switch 50, through the series contacts 51, through a switch 52, by which motor M² can be cut out, and through the reverser and the other driving-motor M² and the throttle-solenoid 43 to ground, the throttle being connected between the armature of the driving-motor M² and one of the contacts of the reverser. As the main switch is moved from the above position one contact after another along the rheostat is closed, thereby gradually cutting out the resistance of the rheostat until it is all cut out, as shown in Fig. 12. At this point contact $s^4$ of the pilot-motor-limit-circuit interrupter is opened and the pilot-motor and the main switch stop automatically unless the platform-switch has been operated. If the platform-switch is closed at the multiple contact, the pilot-motor and main switch move on, and the resistance 49 will then be again cut in through the opening of one rheostat-contact 48 after another until all but the high-resistance section of the resistance is cut in again. At this point the series contacts 51 will be opened and contacts 53 be closed, which will cut out the driving-motor M², the circuit being from the source of supply through part of the resistance of the rheostat, through the reverser and driving-motor M', and through the grounded contacts 53, of the controller. As the main switch moves on farther the circuit of driving motor M' is maintained and the circuit is closed from the source of supply through the resistance 49, through the contacts 54, through the reverser and motor M² to ground, as is shown in Fig. 13, and then as the main switch continues to move the resistance 49 is cut out, as is shown in Fig. 14.

Figs. 12, 13, and 14 illustrate the operation of the system when the train is being driven ahead. The same illustrations will apply if the train is being driven back, except that the platform-switch and the reverser are reversed. The main switch may be returned to open position from any of the positions heretofore indicated by operating the platform-switch or by releasing the platform-switch handle and allowing it to move to open position. It will be seen that the pilot-motor-circuit interrupter is always closed either at the multiple contact $m^4$ or at the coast-contact $c^4$; but the coast-contact is open at the initial position of the circuit-interrupter and the multiple contact is open at the extreme opposite position of the switch, both contacts being maintained in intermediate positions. The series contact $s^4$ is connected to one of the field-contacts 21 of the pilot-motor-circuit interrupter during the first part of the movement of the switch and to the other field-contact 19 during the last part of the movement of the circuit-interrupter, being cut off from both at an intermediate point, as already explained. It will be seen from this statement that when the circuit-interrupter is closed it can be run to either extreme by closing the coast or the multiple contact of the platform-switch, or it can be run to the middle position corresponding to series connection of the driving-motors by closing the series contact of the platform-switch, and that it will automatically stop at any of these positions if the proper position of the platform-switch is maintained, and it can be run from either extreme to the other first by closing the series contact and after it has come to rest at the series position by closing the coast or multiple contact, according to the direction in which the switch is moving. If while the switch is closed and is being moved from the open position the current exceeds the predetermined limit of strength in the motor $M^2$, and therefore in the throttle-coil 43, (which coil, as here shown, is in series with only one motor when the motors are in parallel,) the throttle-contact 42 is automatically opened and stops the pilot-motor, thereby preventing the main switch from advancing too rapidly. As soon as the current falls to its proper limit the throttle-contact closes again and the main switch will be permitted to move on. The throttle on each car independently regulates the forward movement of the main switch, and thus renders it impossible to overload the driving-motors. Simultaneous movement and equal work on each car in any combination is insured. The throttle may be adjusted for various rates of acceleration and various strengths of current and can be operated by the whole or any part of the current. It automatically takes care of the rate of acceleration for different loads, stopping the pilot-motor whenever the current is too large, and thus insuring quick acceleration of light loads and slower acceleration of heavier loads. It does not affect the return movement of the main switch. The throttle can be operated by two coils, one in each motor-circuit, or there can be two throttles, one for each motor-circuit, controlling contacts in the pilot-motor or relay-circuit in series with each other. It is evident that the throttle can operate indirectly through the relays controlling the pilot. The throttle is of great importance and as here used is believed to be broadly novel.

In an application, Serial No. 21,341, filed June 23, 1900, by way of division hereof, I claim, broadly, the method of regulating and equalizing the operation of a number of motors or sets of motors in a system in which each motor or set of motors is supplied with a current-varying controller, the method consisting in independently varying or limiting the operation or movement of each individual controller by the current in the motor or motors controlled thereby, and also other methods subsidiary thereto, which are therefore not claimed herein. I claim herein, broadly, the apparatus comprising a train of cars, two or more of the cars being each provided with a driving motor or motors and a controller or controllers therefor, a common control for the controllers and hence for the motors, and means for equalizing the energy consumed by the different motors by varying the rate of travel of each individual controller. All the motors of the train, while accelerating, are by these means made to do the proper proportion of the work. It is of course preferable to have all of the motors run at the same speed; but this condition, however, does not necessarily always obtain. In fact, a number of conditions, some accidental and some intentional, may exist which make the use of throttles, and especially of independent throttles, advisable and often absolutely necessary to get proper operation, and their use affects conditions external to the motors and controllers. For all practical purposes effective operation can be had even where there are some differences in the time of making contacts on the various controllers, and because of these differences the increase of current on the different cars is not absolutely simultaneous, the result in this case being simply that the maximum flux of current required on the train is something less than the aggregate of the maximum on the cars. In this case there will be somewhat less disturbance of potential, less drop on the line, and less sudden changes in demand on the central station. Again, it is to be noted that car-wheels are allowed to vary ten per cent. in diameter because of the wear of the steel tires. This variation, however, would only take place on any well-organized road on different cars and not on the wheels of a single truck, the motors for driving which are controlled by a single controller. There may therefore be, for example, thirty-inch wheels on one car and thirty-three-inch wheels on another.

During the time of acceleration motors operate on a highly-saturated field and therefore have almost a shunt characteristic. If, therefore, the resistance and divisions thereof are arbitrarily made and are alike and are simultaneously operated on the different cars, it is quite possible to have at times variations of current during acceleration of fully thirty per cent. in the current on different cars. It is true that all systems finally cut out all resistance; but when they do so they promptly accelerate on the motor curve with a less-saturated field, when differences of resistance in the circuit makes less difference.

It should be perfectly possible on a railroad to make up a train which is equipped with motors of different sizes, makes, and types and having different characteristics and maximum capacities, with consequently different current inputs, or the cars may be equipped with controllers having unequal numbers of steps or with motors operating through different ratios of gearing or with driving-wheels of different diameters. Though a throttle individual to the equipment of each motor-equipped car is not always essential and though it is possible with my system by operating upon the relays—as, for example, through the train-line or the cable between operator's switches instead of operating directly upon the pilot-motor circuits—to control all of the controllers with a throttle the operation of which is dependent upon the condition of current in one of the motors, nevertheless the throttle individual to the equipment on each car is preferable, for not only will it arrest the advance movement of the controller on its particular car if for any incidental reason the current in the motor or motors on that car alone rises above the predetermined limit, but also it makes it possible to couple together cars differently equipped, as above indicated. Broadly speaking, the function of the throttle is to get automatically the same practical result in operating a number of controllers as can be effected by a careful motorman, noting the current input on a single equipment with an ampere-meter and arresting the movement of the main controller by opening the master-controller whenever the current rises to a predetermined limit. In general, with the throttle as I prefer to use it, so long as the current does not reach the predetermined limit set for safe operation the movement of the controller is independent of the throttle. Since for any specific conditions the characteristics of a motor can be plotted in terms of current and speed, it may be said that the action of the throttle is influenced by the speed of the motor, and the higher the average speed with any given equipment in regular operation the less the throttle is in use. This automatic response of the throttles to the actual needs of the motors not only affords greater freedom in manipulating the controllers, but insures greater safety and facility of train operation.

It is obviously not essential that the operator should be able to bring the main switch to the full multiple position without stopping at the full series position or at any other intermediate position; but it is desirable that he should be able to do so, and it can be done with the construction of pilot-motor switch shown. If the strip on which finger $m^4$ bears were cut off, so that as the main switch moves from zero or initial position contact would not be made at finger $m^4$ until just before it was broken at finger $s^4$, it would be necessary for the operator to bring the main switch from open to full series position by closing at contact $s$ before he could bring it to multiple position by closing at contacts $m$. Similarly if the strip with which finger $c^4$ contacts were cut off at the other end it would be necessary for the operator in returning the main switch from full multiple to initial position to close first at contact $s$ and bring it to full series position and then close at contact $c$; but to arrange the pilot-motor switch as shown in this particular permits the more rapid and certain return of the main switch in case of an emergency, leaving the operator nothing to do but to open his switch as quickly as possible or release it and let the handle return automatically, and during the forward movement of the main switch it admits of touch-and-go contact, too-rapid advance of the main switch being prevented by the throttle; but it has another and still more important advantage—viz., that with it the operator can bring all of the controllers to full limit positions, for after closing at series position if the operator closes at the multiple or coast contact of his switch for a sufficient length of time all of the controllers will come to multiple or coast position whether they had all first fully reached the series position or not. Thus there is provided means for bringing the set of controllers to a definite intermediate position—namely, full series position—and means for bringing them into another definite position—namely, full multiple or coast position—and this whether all or only a part or none of the motor-controllers have been brought into the intermediate or series position at the time when the second-named means is set in operation. In fact, it may be stated generally that on the closure of any speed-determining contact of an operator's switch for a sufficient length of time all of the speed-determining controllers will be brought into the corresponding position irrespective of any differences that may exist in the positions of the several controllers, whereas, on the other hand, if the pilot-motor switch were arranged as otherwise suggested and the operator's switch were opened at the series contact and closed at the multiple contact before all of the controllers have come to full series position those which had not reached full series position would stop. This would result in controllers on different cars being in relatively different positions and would seriously interfere with the effective working of the system; but though the arrangement shown is preferable the two arrangements are fundamentally the same. In each the main switch may be advanced a certain definite interval or distance by the pilot motor or mechanism making a predetermined number of revolutions or a definite movement and then the pilot-motor and the main switch be stopped automatically by the opening of the pilot-motor circuit. The main switch may move through a single interval or cycle, as to or from the full series position or full multiple position, or it may move through a plurality of intervals successively as to the full series position and then to the full multiple position, or vice versa. The number of intervals which should be thus arranged for is determined by the following considerations:

The ordinary way of operating motors in railway-work is that herein shown—namely, to use a series field and to vary the current by varying the resistance in circuit with the motor and when two motors are used together to connect them first in series and then in parallel. As a rule, motors should not be run with idle resistances in circuit except in making small movements, as in switching, the resistances being primarily for the purpose of temporarily grading the current. With a series-parallel switch and a rheostat it is desirable to fix definite positions, which may be termed "allowable positions" in railway practice. Of these there are three principal positions—open-circuit or coast position, full series position with all resistance cut out, and full multiple position with all resistance cut out. These are positions on which the controller can be left with impunity and they are positions in which there is no waste of energy in the rheostat. To each of these positions the controllers can all be brought by setting an operator's switch on one of the contacts and leaving it there a sufficient time. To be able to do this involves, of course, connecting the contacts in the operator's switch with train-wires, which through relay or branch circuits directly or indirectly initially control the pilot mechanisms, and providing sets of contacts opened by the movement of the main switch at different points of its rotation or by something moved synchronously with it. It is evident that any number of contacts may be put in the operator's switches and corresponding train-wires provided whereby the controller, however operated or controlled, can be brought to any desired position or state. It is also evident that as many individual mechanisms, such as magnets or solenoids, can be used as is desired to effect different steps in the control; but in practice in order to avoid enlarging the train-cable or complicating the system and in order to provide against excessive use of undesirable positions it is preferable to provide contacts and stops for the three fundamental positions above named and no others.

Other positions, such as series with all or part of the resistance in circuit or multiple with part of the resistance in circuit, can in the system shown be attained by proper manipulation of the operators's switch—i. e., by closing on the proper contacts for a proper length of time, to be learned by experience, and then opening the switch at the speed-controlling contact without opening the direction-controlling contact of the switch. By opening and closing the contacts a number of times momentarily the main switches can all be advanced step by step under the control of the operator's switch or by longer contacts several steps at a time. The first series position, with all resistance in circuit, may be used in short slow movements, as in switching. The first multiple position with considerable resistance in circuit, should be avoided except for the short transition period.

It will be clear from the foregoing that the main switch can be advanced definite amounts—i. e., by definite stages, say from initial or coast to full series position and from full series to full multiple position and back through the same stages. This is effected in the purely-electrical system by the establishment through the operator's switch or a relay and the pilot-motor switch and pilot-motor of a circuit which is automatically interrupted by the pilot-motor switch independently of the operator's switch, the interruption occurring after the pilot-motor has made a predetermined number of revolutions or the main switch has made a partial revolution through a predetermined arc, and, further, by providing an additional similar circuit which can be made when the first circuit is opened by closing the operator's switch on another contact. This insures certainty of the main switch going to a definite position and generally avoids loose or bad or hot contacts. If the positions determined by the train-wires are few, it does not adequately insure entire freedom from hot touches, and to avoid enlarging the number of train-wires there is introduced, as will hereinafter be seen, a mechanical step-by-step movement of the main switch under the influence of the constantly-driven pilot-motor, to which the main switch is geared by a loosely-interlocked yielding spring-coupling and a positioning notched wheel and pawl. Thus there may be a plurality of motor equipments on a single car or a plurality of cars provided with motors, in combination with one or more master-controllers or operator's switches, the arrangement being such that a movement of the operator's switch in either on or off direction through any number of steps, as from open position to the series or multiple contact or from multiple contact to the series or coast contact or open position, causes a corresponding movement of all of the speed-controllers, however operated, and it will also be seen that the operator's switch has direction-contacts on opposite sides of open position, so that in reversing the switch it must be opened. This will instantly open the main circuits on each car and in addition cause the speed-controller to be restored to initial position. The controllers will then travel under the regulation of the throttle to that speed-contact which corresponds to the speed-contact at which the operator's switch has been closed. Thus there may be absolutely free movement of the operator's switch, it operating, in effect, like a set of push-buttons.

In addition to the foregoing means, which are all under control of the operator's switch, the throttle actuated by the motor-circuit to open the advance circuit of the pilot itself automatically transforms the advance of the main switch into a stepped or variously-interrupted or periodic movement from initial to series or multiple position. This periodic character of the advance movement of the main switch is not determined by the contacts of the operator's switch or the pilot-motor switch, but by those of the main switch itself. For each time a new contact is made on the main switch in advancing from the first series to full series position or from first multiple to full multiple position resistance is cut off. This causes momentary increase of the current, which in the operation of the system will, if large enough, cause the throttle to open, thus arresting temporarily the advance of the main switch. In practice there are usually several interruptions of the advance of the main switch by the throttle between coast and full multiple position. As already stated, the return movement of the main switch is not affected by the throttle, although a step-by-step movement can be had.

To sum up, it will be seen from the above description that step-by-step and variably-interrupted or periodic movements of the controllers are effected by both mechanical and electrical means and for various purposes, such as to make small movements of the controller, to insure running on certain allowable positions, to prevent overloading of the main or driving motor, to insure practical synchronism of movement of all of the controllers, to effect practical equality of work of the various equipments, to determine the rate of acceleration of the train, and to make perfect contact on the controller-fingers.

Interruption of movement of the controlling apparatus may be effected automatically or at will at the operator's or master switch, or on the pilot-motor-limit-circuit interrupter, or on the main switch, or any relay-circuit, of which there may be several kinds. The movements of the pilot mechanism can be interrupted by make-and-break touch at the operator's or master switch by interruption of the pilot-circuit by means of a relay operated by overload-current, by opening contacts on an intermediate relay, or by breaking contacts through movement of the main switch or the pilot mechanism itself.

Definite steps of the pilot mechanism can be effected by several train-wires with circuit-interrupters by closing and opening the local pilot-circuits automatically at definite positions of the main switch or pilot-shaft, and each step can be effected by a separately-actuated magnet. The movement of the main switch is controlled, interrupted, and carried through definite steps by the same or similar instrumentalities as those which interrupt the movement of the pilot mechanism and, in addition, by purely mechanical means—namely, a star-wheel and loose spring connection between the pilot-motor shaft and the controller-shaft.

It will be seen that the system of train control here described comprises a number of motor-cars each provided with a controller for its motor or motors, the controllers being in parallel between the source of supply and the ground, and means or devices for actuating each controller in a step-by-step manner, with a circuit or circuits including these step-by-step actuators and a master-controller or operator's switch in the circuit or circuits governing these actuators, there being one or more of these master-controllers located upon the train and controlling or regulating all of these actuating devices simultaneously. As will be seen, there is provided means (switch 11) for each actuator to cut out any controller without affecting the operation of the others.

The main switch being subject, as described, to movements retarded, either automatically or at will, during the period of applying the current to the motors—that is, during the time of acceleration—but being also used for the purpose of reducing or cutting off current in the motors, is built for a much faster possible movement than would be permissible if unchecked during its advance, for even in step-by-step movements prompt making of contacts is advisable to prevent hot contacts, and, on the other hand, a very prompt reduction or cutting off of current may be required whether returning from the full multiple to series position or from multiple or series position to the off position or for the backward movement from any intermediate position without regard to the operation of any other circuit-opener. Hence in practical operation there is a combination of two differently timed or executed movements, one for ahead or current application and the other for return or current reduction or cut off, and there are also two directional movements, ahead and back or toward release, and two kinds of movements, interrupted and continuous.

*Certain automatic devices.*—Returning now to the description of certain details of the system shown, if the current fails or the operator's switch is opened the safety-reverser 35 will be deënergized, as illustrated in Fig. 15. What may be called the "increased-speed" connections or "multiple" side of the pilot-motor connected with contact 21 is thereby opened at contact 44 and the decreased-speed connections or coast side of the pilot-motor connected with contact 19 is closed at contact 45 through a circuit from the source of supply through the pilot-motor, contact 19, contact $c^4$, and contact 45 to ground. No manipulation of the platform-switch can affect this circuit, nor can control of the controller be restored to the operator's switch until the main switch shall have returned far enough to close the cut-out switch 36, thus making it necessary practically to begin with the open or high-resistance-switch position before the current can be again put into the driving-motors. The return of the main switch is thereby in this case independent of the movement of the operator's switch. This also prevents reversal when it would be dangerous, because if, for example, the platform-switch should be suddenly reversed when closed on a series or multiple contact the reverser would be opened, producing the same effect as failure and restoration of the current from the source of supply. The main switch would return to open position. Control of this switch would then be restored to the platform-switch without respect to the position of its handle or how far it may have been moved from open position, and the main switch would then advance under control of the throttle. Should it be undesirable to require that the main switch return completely to open position, the contacts 36 of the cut-out switch can be lengthened somewhat, as indicated in dotted lines in Fig. 12, or otherwise disposed to effect the return to any determined position.

It will be seen that the reverser-coils of the reverser for the driving-motors are in series with the coil of the automatic safety-reverser for the pilot-motor and that all of these coils are in series with the cut-out switch on the main-switch block and are provided with a shunt around the cut-out switch, which is closed by the operation of the automatic reverser-coil while the current is on.

It will be seen that the reverser relay-coils or solenoids and also, where these appear, the speed relay-coils and the safety relay-coils, all of which in practice on high-potential circuits are provided with additional resistances, are in grounded branches from the wires which connect the platform-switches. This is the preferred arrangement, though in the broader claims I do not limit myself to it. The advantage of it is that it makes all of these wires and the train-line to which they are connected dead wires, except such as are actually connected to the source of supply through a platform-switch. If the connection of the platform-switch with which the train is being run is cut off from the source of supply, the train-line and the wires supplied therefrom are cut off and are dead wires. By connecting these to the same side of the supply to which the trucks and wheels are connected all danger and annoyance from unintended operation of relays through accidental groundings or from confusion of relay-circuits in case connection with the source of supply breaks on an intermediate car is avoided. Where the platform-switch establishes the ground connection accidental grounding may take control from that switch. Moreover, if the separate relay branches were connected to the source of supply and the platform-switches were grounded then whenever the trolley-shoe of any car jumped off the troller or supply rail for a moment the controller on that car would go back to initial position. There is no need of this, because there is no harm in letting the current on as soon as contact is remade at the shoe, provided the speed has been kept up. This trouble resulting from opening the relay branches owing to bad contact would of course not be, as a rule, experienced with a good rail, but it is difficult to avoid in sleet storms and under other abnormal conditions. It is troublesome because of resultant flashing on the shoes carried by the trucks which make the third-rail contact, because of possible confusion of the controller-circuits, and because the train is deprived of efficient operation on certain motors, and its speed thus diminished.

Before closing this discussion of the operation of the main switch from the master-controller or operator's switch, it is desirable to discuss somewhat more fully the relation of relays $c^2$ $c^3$ $s^3$ $s^8$ $m^2$ $m^3$ and of the reverser-relays to the system. These relays may be considered as a part of the general controller for the main motors in the more complicated system now being described. In the system of Fig. 4 the plungers of the relays constitute the moving member of the controller. The relays in the equipment now under discussion are individual to each equipment, and through them each equipment is controlled from the operator's switches, which constitute means for operating one or more of the relays of each equipment simultaneously, like relays of each equipment being operated together and various groups of like relays on all the cars being operated successively. They operate direction-controlling and speed-determining contacts, each relay determining a definite speed relation of the motor-circuits by the effect of closure of its contact upon the movement of the rheostat or of the motor-grouping switch. The speed-determining contacts may be called, for brevity, "speed-contacts," and the direction-controlling contacts "direction-contacts." These relays, in conjunction with the pilot-motors, are means for moving the controllers and rheostats and effecting definite conditions or positions of the rheostats, motor-grouping switches and reversers, and various modifications or variation in the conditions of the circuits; or, to state the matter somewhat differently, these relays, considered as a part of the controller for the main motors, constitute a plurality of individually or separately actuated contacts for effecting changes in relation or in degree in the motor-circuit with electromagnetic means—viz., solenoids or electromagnets for controlling the contacts. They effect change in the power and speed by grouping the main motors in the various series-parallel relations, changing them from series to parallel, and vice versa, and also change the resistance of the circuits of the motors. These are all actuated from operator's switches or master-controllers suitably connected for establishing similar circuit connections simultaneously on all of the cars which are provided with motors. The electromagnetic means which control the moving contacts hold them in engagement with stationary contacts, shown but not lettered; but the arrangement is such that as soon as the current ceases to pass through the coils of the solenoids or magnets $s^2$ $s^2$ $m^2$ the contacts will return to their open position. The means relied upon for this return is gravity, but other means can be provided; or, viewed as a part of the controller for the pilot-motors, these contacts constitute a plurality of separately-actuated contacts for regulating the motor-circuits and electromagnets for controlling the contacts, the arrangement being such that as soon as current ceases to pass through the coils the circuits will be interrupted at the contacts; but upon restoration of the circuits these contacts will be instantaneously restored to the position which they occupied before the interruption.

*Connecting switches.*—Switches can be added in the train-line or cables as desired, whereby parts of the train system can be cut off without impairing what is not cut off. The platform-switches of each car are connected to each other. The connections between the platform-switches are connected to the train-line through a set of switches 15 and are connected with the relay and reverser coils in the controller system of the car through another set of switches 14. Thus the car system, including or excluding the platform-switches, can be cut off from the train system. Thus there is provision for disconnecting or rendering inoperative the means actuating one or more of the controllers, leaving the others operative. There is also shown a switch 10 between the source of supply and the series-parallel switch and rheostat, another, 11, between the source of supply and the pilot-motor, and another, 12, in series with both coils of the reverser by which the main switch, pilot-motor, and reverser, constituting the complete controller on any car, can be cut off from the rest of the system. There is also a switch 13 between the platform-switches and the source of supply, whereby the source of supply can be cut off from the platform-switches on any car.

*Train-line and couplers.*—In a train made up of a number of cars the corresponding controlling-wires of the several cars must be coupled together, so that if current is turned into any train-wire at any platform-switch it will cause the mechanism on each car of the train to operate in the same sense as that on the other cars relatively to the speed and direction of travel of the train—that is, there must be reversible train connections for the controller mechanisms of the different cars. To effect this reversibility, the speed-controlling train-wires must be coupled together in the same way irrespective of the end relation of any car in the train, and the direction-controlling train-wires of any car must be reversed in the train system when the car is turned end for end in the train. Therefore the terminals of the train-wires at the abutting ends of the cars must be properly paired, the pairing being secured by properly positioning the terminals, so that the connections of the speed-controlling wires will not be exchanged, and the connections of the direction-controlling wires will be exchanged when the car is turned end for end, or the pairing of the direction-controlling wires may be secured by providing couplings of complementary shapes, the coupling at the terminal of either direction-controlling wire at either end of the train being like that of the other direction-controlling wire at the other end of the train. It will be seen also that the connection of the operator's switches with the train-line upon other cars than those upon which the switches are located is affected with respect to their reverser-contacts exactly as the reverser is affected. Thus if a car is turned end for end the connection of the reverser on this car with the train-line on the other cars of the train is exchanged, and so, also, is the connection of the reverser-contacts of the operator's switch or switches upon the car considered. To put it another way, treating the reverser and operator's switch or switches upon any car as a part of the car system, the reverser connections of the car system with the train-line on the other cars is exchanged when the car considered is turned end for end in the train; but turning a car end for end does not disturb in any way the connections of the reverser and the operator's switch or switches upon that car.

Fig. 16 represents three cars of a train, each provided with two direction-controlling wires $a$ $b$, the wires of the several cars being coupled together. The switches and control devices are omitted, but their relation to these parts may be as in the forms shown in Figs. 1 to 4, in which the only controlling-wires are the direction-controlling wires, or, as in the other forms, when these wires are used in conjunction with speed-controlling wires. The wires are differently shaded to distinguish them, and arrows are placed against branches from the wires which project upward through the floors of the cars to indicate the direction in which the car will be caused to travel by turning current into the wires. The end of each car at the right will be considered as the forward end and the end at the left as the rear end for convenience of description. It is intended that the cars shall be fully equipped for travel in either direction and that the cars may be turned or connected up indifferently. At each end the terminals of the two wires lie in the same horizontal plane, and the wires run from the terminals at one end to the terminals at the other end without crossing. When facing the forward end of the car, the terminal of wire $a$ will be seen at the right hand of the terminal of wire $b$ and when facing the rear end of the car the terminal of wire $a$ will be seen at the left hand of the terminal of wire $b$. It will therefore be seen that the terminals are exchanged in position at the two ends of the car. Each wire has a socket at one end and a plug at the other end, the socket of one wire and the plug of the other being placed at each end of the car, so that the terminals of the wires at the two ends of the car are complementary. The purpose of this will appear from a consideration of Fig. 17, in which the cars of the preceding figure are shown with the intermediate car turned end for end. While in this position current must be turned into wire $b$ on this car when current is turned into wire $a$ on each of the other cars. It will be seen that this is effected by the arrangement above described, since the terminals of wire $b$ of the car which is turned end for end pair with the terminals of wires $a$ $a$ of the adjacent cars.

Instead of coupling directly the terminals of abutting cars may be coupled through coupling-wires. Fig. 18 shows such a method of coupling, the terminals being duplicated at each side of each end, although a single coupler connected to the sector-bar at or near the center can be used. Duplication has, however, been found desirable in practice, since it is out of the way of the car-couplers and air-hose and the trainmen can make the connections without standing between the cars. The connections can be made at either side of the train, or, if desired, at both sides for greater security and convenience, or a master-controller with a flexible connection and coupling-head can be connected to one coupler. In this form the terminals of the two wires may be of complementary character, as before; but this is not necessary, and the terimals may be all alike. As shown, the terminals of the wires of each car are sockets and the terminals of the connecting-wires are plugs. In Fig. 19 the cars of the preceding figure are shown with an intermediate car reversed.

In Fig. 20 a method of coupling is shown in which the terminals are also duplicated at each side of each end; but the terminals at the right side of each end are of complementary character to the other terminal, and the wires to them are of such length that they can be coupled without using coupling-wires.

In Fig. 21 the cars of the preceding figure are shown with the intermediate car reversed.

Figure 22:
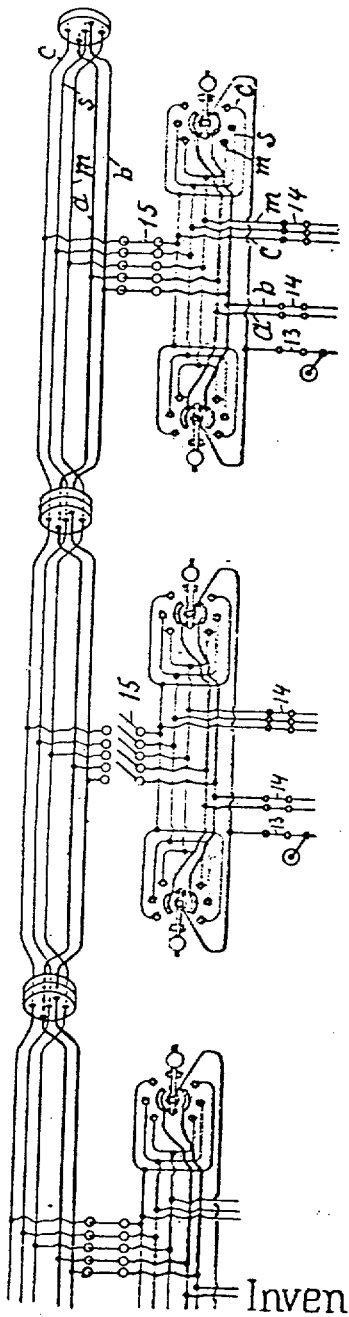

In Fig. 22 are shown the controlling-wires of three cars coupled together. In this figure three speed-controlling wires are shown in addition to the direction-controlling wires. These additional wires are the coast-wire $c$, the series wire $s$, and the multiple wire $m$. The terminals of the direction-controlling wires, as in the preceding forms, are disposed in the same horizontal plane at each end of each car. The terminals of the speed-controlling wires lie in the same vertical plane at each end of each car and terminate alike at each end of each car. This figure also illustrates the function of the switch 15, (see Fig. 11,) which connects the wires in the train-line with the car system. In the event of the system on any car becoming disabled this switch can be opened and the entire car system be cut off from the train without cutting off the cars behind the disabled car from common control with those in front of the disabled car. From this it will also be seen that cars which have only the train-line may without inconvenience be used in intermediate positions in a train, provided that the aggregate power of the motors of the equipped cars is sufficient for the movement of the unequipped cars. It will also be seen that the train can be operated from a platform-switch on a car on which the rest of the car system is cut off.

The speed-controlling and direction-controlling wires, with their terminals arranged as described in connection with Fig. 22, are also shown in Fig. 23 and in Fig. 24 with the intermediate car turned end for end. Fig. 25 shows the relative position of the terminals at the rear end, and Fig. 26 shows the relative position of the terminals at the forward end of a car. In these figures there are two sets of coupler-contacts distinguished by the planes in which they are disposed, one set for connecting the speed-controlling wires and the other for connecting the direction-controlling wires. In similar manner Figs. 27 to 30 show a modification in which the terminals of the speed-controlling wires, as well as the direction-controlling wires, are disposed in a horizontal plane at each end of each car, and the adjoining terminals of abutting cars are connected by coupling-wires. In similar manner Figs. 31 to 34 show a modification in which the terminals of all the controlling-wires are disposed in a vertical plane at each end of each car and the adjoining terminals of abutting cars are connected by coupling-wires. In similar manner Figs. 35 to 38 show a modification differing from the preceding only in that the terminals of the direction-controlling wires are placed together instead of being respectively above and below the speed-controlling wires. In similar manner Figs. 39 to 42 show a modification in which the terminals of all the wires are disposed in horizontal planes and are duplicated at each end of each car and coupled directly without the use of coupling-wires.

On comparison of the groups of terminals which are similarly located at the two ends of any car in all of the modifications thus far described it will be seen that the terminals $c$ $s$ $m$ of the speed-controlling wires are similarly positioned and that the terminals of the direction-controlling wires are exchanged in position, so that the connections of these wires will be exchanged in event of the car being turned end for end. The connections of the speed-controlling wires, however, are not altered on turning the car end for end. In using either of the forms above described in practice each group of terminals can be mechanically connected but insulated from each other by being set, for example, in holes in a block of wood or other insulating material, so that all in a group can be paired at one operation with the group with which they are to couple. To insure the proper pairing of the terminals, those which are to pair in all the forms so far described occupy facing positions at the abutting ends of the cars; but owing to the necessity in practice of having flexible connections between the cars it is not desirable to depend on position, and the proper pairing of the terminals is insured by giving them unlike character or relation to connected parts. This can be accomplished with the plugs and sockets already described or by the use of keys and keyways. If at each end of the car the wires terminate in flexible ends, the proper pairing may be insured by the character of each terminal independently of any positional arrangement, as shown in Figs. 43 and 44, in which the direction-controlling wires have independent terminals of complementary character at each end of each car. On comparison of the terminals at the two ends of any car in this modified form they will be seen to be exchanged in character, and in all the forms the similarly-positioned direction-controlling wire terminals at the two ends are exchanged either in position or character. The terminals of each of the speed-controlling wires may be distinctive in character. There are, as shown, two sets of coupler-contacts distinguished by shape—one set for connecting speed-controlling wires and the other for connecting direction-controlling wires.

The manner in which the terminals at the abutting ends of cars are connected through coupling-wires in practice is shown in Fig. 45 and the details of construction are shown in Figs. 46 to 49. A coupling in which the train-wires terminate is bolted to the under side of each platform. Such a coupling may be fastened on either side of each platform, or the couplings may be placed at any other suitable place, as on the hood of the car, the number and location being dictated by convenience. This coupling comprises a metallic shell or sleeve 57, to which an insulating-body is attached, which is preferably a wooden block driven firmly into the shell or sleeve. Terminals are symmetrically disposed with reference to the center or middle axis of this insulating-body. The plugs which constitute the terminals extend through and project from the face of the block. On one side of the sleeve is a keyway 59. The controlling-wires are connected to the rear ends of the plugs. A hinged cover 60 shields the ends of the plugs when the coupling is not in use. These couplings at the abutting ends of the cars are connected through a jumper. This consists of a flexible cable containing the connecting-wires and terminating at each end in suitable couplings. Each of these couplings comprises a sleeve 61, in which a block of wood or other insulating material 62 is firmly driven, and sockets, to which the coupling-wires are connected and which are contained in holes in the block 62. There is a shield 63 for the connections between the coupling-wires and the sockets, and a key 64 mates with the keyway in a coupling on the car, so that the two will go together in only one way. As will be seen, the jumper is a female coupling to fit a plug-coupling and is reversible in that either end may be fitted to either plug-coupling. It will also be seen in the arrangements shown in Figs. 18, 19, 27, 28, 31, 32, 35, and 36, where the connections of train-cables are made by reversible jumpers, that the number and disposition of the wires in the jumpers are the same as in the train-cables on the cars.

It will be noted that, as shown in the various figures, the secondary or controlling line has for one or both ends of the car two sets of connections, one set being made up of one or two branches terminating in couplings at the ends of the car and the other leading to an operator's switch, and that switches are provided for disconnecting the operator's switches individually without interrupting the balance of the train-line or any other operator's switch. There is no essential difference in the branches to the plug-couplings and the branches to the operator's switches. In fact, they are so far identical that if an operator's switch were properly shaped it could be fitted onto any plug-coupling not in use for coupling and the train be run in this way. Nor is it necessary that the branch to the operator's switch be a flexible connection with the train-line and plug-coupling, as it is plain that the plug-coupling and suitable connections for the operator's switch might be consolidated in a suitable block.

With the train-wires arranged, for example, as shown in Figs. 23 and 24, without using a jumper and without providing two sets of terminals at each end of each car, it is not practicable to use terminals of unlike character, as plugs and sockets, for the speed-controlling wires, because if a car were turned end for end in a train the plugs would be brought together at one end and sockets would be brought together at the other end, and the terminals could not be coupled at either end. This difficulty is avoided by using couplings in which terminals of like character can be paired, as shown in Fig. 50 and in detail in Figs. 51 to 56. The terminals are flat contact-springs, which are provided with stems that pass through blocks of insulating material, the controlling-wires being connected to the ends of the stems. The contact-springs lie in notches in the sides of tongues 66, which project from the faces of the blocks and are protected thereby. Because of the tongues the couplings will go together in only one way.

The details of mechanical construction illustrated in Figs. 45 to 56, both inclusive, are not claimed by me in this application, because they are claimed in my application filed as a division hereof, Serial No. 22,807, filed July 7, 1900.

*Platform-switches.*—The form of switch preferred in practice is shown in Figs. 57 to 61 and diagrammatically in Fig. 62. It differs mechanically from the switch shown in the diagrams Figs. 11 to 15, but may be substituted therefor, since it effects the closure of the circuits in the same order.

The switch consists of a series of brushes connected with the controlling wires $a\ b\ c\ s\ m$, mounted on a suitable frame 67, in which a contact-cylinder is journaled. This cylinder is provided with a handle 68 and contacts which close against the brushes. The cylinder has two sections 69 70, which are insulated from each other and from the shaft 71 by which they are rotated. The parts are shown in the open position. Rotation of the cylinder in either direction closes the lower section to the line L and also connects this section with the upper section through the connected brushes 72 and closes the contacts $a'$ or $b'$ and the contact $c'$ or $c''$ with the brushes of the controlling-wires $a$ or $b$ and wire $c$. Because of these connections the direction-controlling circuit is broken simultaneously at four points to prevent arcing when the switch is brought to open position. Movement of the handle to the right connects the source of supply with the direction-controlling wire $a$, which sets the reversers so that the motors can drive the cars ahead and also through the contacts $c'\ s'$ and $m'$ connects the source of supply in succession with the coast series and multiple train-wires. Movement of the handle to the left connects the source of supply with the direction-controlling wire $b$, which sets the reversers, so that the motors can drive the cars backward, and also connects the source of supply in succession through the contacts $c''$ and $s''$ with the coast and series wires. There is no contact for the multiple wire on this side, as it is not expedient to give the motorman power to back a train at full speed from the front platform. A spring 73 is coiled around the shaft, and its two ends lie on either side of two pins, one of which, 74, rotates with the shaft and the other of which, 75, is held by the frame of the switch. Motion of the cylinder either way from the open position winds up the spring, so that it will return the switch from the multiple or series position if the handle is released. As shown, the switch is returned by the spring only to the coast position, further movement being arrested by the contact of the latch 76 in the handle with one or the other of the catches 77. By pushing in the latch the handle can be returned to the open position and latched between the catches. The operator's switches or some part thereof are intended to be spring-returned in all cases, though the spring is not shown in some of the figures of the drawings. As already explained, if the end of the switch-arm be beveled the switch can be returned to open position if allowed to snap back or held at coast position if allowed to come back gently. A pin 79 in the hub of the handle engages under a collar 80 on a boss on the frame and locks on the handle except when it is at the open-switch position. When in this position, the pin is opposite a notch through the collar and the handle can be lifted off. Thus tampering with the switches by irresponsible persons, with consequent interference of circuits, is made difficult.

*Pilot-motor relays.*—The automatic safety-reverser, throttle, and pilot-motor-relay coils are mounted on a board, as shown in Figs. 63 and 64. An iron frame 81 covers the ends of each coil, and an iron plunger 82 passes through a hole in the lower end of the frame into the coil. Attached to the lower end of each plunger, but preferably insulated therefrom, is a carbon disk, through which the relay-contacts are closed. Two disks 44 45, insulated from each other, are attached to the plunger of the automatic solenoid 35, as this coil closes two sets of contacts. The overload-coil, which is not essential to the operation of the system, is not shown. A switch 14, consisting of a series of switches connected to each other by an insulated handle, is shown at the right. The controlling-wires from the platform-switches are led by one side of this switch to the pilot-motor-relay coils and also to the reverser-coils and the train-line to the other side, so that all other car systems can be detached from any particular platform-switch and it be used to control its own system without controlling the systems of the other cars. A single switch 13 is also provided for cutting off the platform-switches from the source of supply.

*The reverser.*—The actual construction of the reverser shown in the system of Figs. 11 to 15 is illustrated in detail in Figs. 65 to 68. The difference from the form shown in the diagrams Figs. 11 to 15 lies mainly in the proportions of the parts and in the magnetic blow-out. The reverser-coils $a^2\ b^2$, which are relay or branch circuits from the train-wires, are inclosed in the iron frame 84 of the reverser, which serves to conduct the magnetism between the poles of each coil. Holes are bored in the frame opposite the ends of the coils and brass lining-tubes 85 are inserted. The bottoms of the tubes are filled with plugs 86. Plungers 87 slide in the tubes and are attracted into them when the coils are energized. Chains 88 connect the plungers with a pulley 89 on the rocking shaft 90 of the reverser. A centering-spring 91 for holding the reverser normally in open position is coiled around the shaft and its two ends lie on either side of two pins, one of which, 92, is carried by the pulley and the other of which, 93, is fastened to the frame. Four pairs of reverser-contacts 37 38 39 40 are carried by four sleeves which are mounted on the shaft of the reverser, but insulated from each other and from the shaft. Each of the contacts extends over a quarter of the way around the cylinder, so that a rotation of the cylinder through one-eighth of a revolution from the middle position will be sufficient to close the contact, with the brushes on either side. The widths of the magnet-contacts 33 are about equal to the spaces between the reverser-contacts. Magnet-poles 94 project upwardly on each side of the reverser-contacts, except the end contacts, and blow out the arc when the reverser is opened. Some contacts are made slightly longer than the others, so that the circuits will be opened first and the arcs be localized and extinguished at the shorter contacts. Baffle-plates 95, of insulating material, are interposed between the contacts and magnet-poles.

The speed-varying controller and the reverser constitute together a main controller having two parts, with main contacts in series with each other, each part being independently movable and independently controlled or actuated electrically from the train-line by master-controllers. Each of these two independent parts is used to open the main circuit of the motors, whether automatically or at will, giving a double measure of safety in case of emergency, and each of these parts of the main controller is protected by means for destroying any arc which is formed at the time of breaking the circuit. On the controller this is in part the magnetic blow-out 47, and on the reverser it is in part the blow-outs 41. The reverser is in addition an overload-circuit breaker, operating on the opening of its actuating-circuit when the current in the overload-solenoid 46 exceeds the predetermined limit.

*The pilot mechanism.*—The pilot mechanism and connected parts in a purely-electrical system are shown in Figs. 69 to 72. It consists in the main switch as described and a pilot-motor for driving it. To prevent the stoppage of the switch at any point where a contact would be just on the point of breaking and in danger of arcing, a special construction is necessary. The shaft 96 of the switch-cylinder carries a notched wheel 97. A roller 98 on the end of a spring-pressed pawl 99 engages the notches. These notches are located at the proper points for the safe stoppage of the cylinder. In order to enable the pawl to position the cylinder at these points, it is driven through a yielding coupling, the parts 100 101 of which are separated by compression-springs 102. The part 100 is fastened to the shaft of the cylinder, and the part 101 is fastened to a shaft 103 of the worm-wheel, which is driven by the worm on the shaft of the pilot-motor. The pilot-motor has a movement of continuous character except as it is modified by the operation of the operator's or master switch or the pilot-motor-limit-circuit opener or by the throttle. When either of the switches 50 or 52 is thrown over to cut out the motor with which it is connected, it contacts with the rock-shaft 104, which throws in a latch to prevent the main switch from being turned beyond the full series position. It will thus be seen that in this pilot-controller there is a driving and a driven mechanism, a spring connection with limited movement between the two, means for holding the driven mechanism fast until the driving mechanism has advanced a definite amount, and means for centering and holding the driven mechanism at definite points of its advance.

*Equipped car.*—In Fig. 73 the principal parts of the control system are drawn to a fairly-uniform scale. This figure also shows how they may be arranged on a car and connected. The reverser, relay-board, and main switch can be placed in any part of the car where room can be found—as, for example, in the hoods over the platforms or under the seats or under the car-body—and they need not be placed together. It is, however, desirable to place them near each other in order to shorten connections. The connections are the same as in the diagram Figs. 11 to 15, except that there is a common ground-wire with which all the ground connections are made. The ground-wire is grounded on the motor-frames, and the line-wire is connected to shoes S, which are carried by the trucks and take current from a third rail. For convenience the wires are carried from one part to another in cables.

In addition to the more general features the actual construction shown of couplers, reversers, platform-switches, jumpers, relays, and pilot mechanism are each the work of a great deal of mechanical design and the result of practical experiments and constitute inventions. They are specifically claimed by me in separate applications or in this application.

It is obvious that the train-wires and platform-switches can be used to operate, reverse, and control translating devices other than electric motors and other forms of controllers than those shown whether operated directly or only indirectly controlled electrically, and I therefore do not limit myself in respect to the train-line to the specific uses or devices illustrated in this application. It is obvious, further, that controllers so operated can be made to control other forms of motors than electric motors. For instance, the various valves of air or gas engines could be operated or controlled by electrical devices controlled by the platform-switches and the train-line. Therefore I do not limit myself to the use of electric motors for driving motors or for moving controllers. It will also be obvious that some features of the system are applicable to the operation of devices other than railway-cars, such as elevators and the like. Therefore I do not limit myself to railway-car operation by the mere use of the words "forward" or "back" or other words indicating direction. Many changes can be made without departing from the spirit of my invention.

In the following claims I do not limit myself to returning the controller toward open position by a movement in the opposite direction to that in which it is moved to establish the successive speed positions, and by restoring the controller I include the movement in any direction of the controller or parts thereof to or toward release or off or open-circuit position. The terms "progression" and "retrogression" indicate the operation of controllers without suggestion of limitation as to construction and character of movement in operation.

The practical result of the system developed in the foregoing specification and in the drawings illustrating it when applied in its entirety is that cars properly equipped can be made up interchangeably into a train of any length and can be operated from any one of a number of points and that all an operator has to do in order to effect definite movements of the train as to acceleration, speed, and direction is to make movements of his hand at any one of the operator's switches, which will be similar under the conditions that usually arise in practice. In short, a car is a unit, and a train composed of a number of similarly-equipped cars is also a unit having the same general characteristics that a single unit has, preferably without any conditions being imposed as to the number, order, or end relation of the units comprising the train. This same general statement applies to the operation of a train made up of cars some or all of which are but partially equipped, but which together are provided with an operative train equipment. To effect this fundamental result practically, it has been necessary to provide for properly connecting the cars, preferably independently of sequence, number, and end relation, with couplings of such character that any train-hand can effect the coupling; to provide against cross connections in the circuits on the different cars; to guard against accidents due to failure of circuits or current or otherwise; to secure practical uniformity of operation in the apparatus on the different cars and equality of work in the various motors, and to secure simplicity and flexibility in the relation of the parts under all the various conditions of operation. To accomplish this, a system has been devised which is in part automatic and includes two sets of circuits, by means of which all or parts of the apparatus on the various units or for the various equipments is operated through local means whose action is initiated through a governing-line and master-controllers whatever the nature of the intermediate apparatus or the specific construction of the controlling apparatus. In the numerous claims herein presented it has been attempted to cover as fully and broadly as possible those characteristics of the system which are required to render the fundamental conception possible of accomplishment or which are of advantage in point of commercial economy, efficiency, or safety. It is obvious that partial advantage may be taken of this system without adopting it in its entirety and that the various elements can be greatly modified without losing the advantages gained by the fundamental combinations, systems, and methods of operation. Many changes can be made without departing from the spirit of my invention.

What I claim, and desire to secure by Letters Patent of the United States, is—

1. In an electrical train system, the combination of translating devices and circuits therefor in parallel relation with each other, and a governing train-line independent of the other circuits, substantially as described.

2. In an electrical train system, the combination of translating devices, circuits therefor, and a governing train-line independent of the other circuits provided with sets of controlling-wires, substantially as described.

3. In an electrical train system, the combination of motors, circuits therefor, an independent governing train-line consisting of two sets of train-wires, one set for determining direction and one set for speed regulation, substantially as described.

4. In an electrical train system, the combination of motors, circuits therefor, an independent governing train-line consisting of two sets of train-wires, one set for determining direction and one set for speed regulation, suitable contacts controlled by these wires, and means for holding closed the direction-controlling contacts, and means for opening and closing the contacts for regulation at will, substantially as described.

5. In an electrical train system, the combination of translating devices and circuits therefor in parallel relation with each other, a governing train-line independent of the other circuits, and relays connected with the governing train-line in parallel circuit with each other, substantially as described.

6. In an electrical train system, the combination of motors, circuits therefor, controllers therefor, and an independent governing train-line with relays for operating the controllers, substantially as described.

7. A train with cars each equipped with a motor or motors to drive it, controllers for the motors, a relay-circuit, and one or more operator's switches included therein for actuating the controllers, substantially as described.

8. In an electrical train system, the combination of motor equipments, a controller for each equipment, relays for determining definite positions of the controllers, a train-line, and means at one or more points connected with the train-line for operating like relays simultaneously, substantially as described.

9. A car equipped with a motor to drive it, a controller for the motor, a relay-circuit including a train-line for operating the controller, and one or more operator's switches connected with the train-line, substantially as described.

10. In an electrical train system, the combination of motors, circuits therefor, controllers for the motors, and a governing train-line which is independent of the motor-circuits, relays connected with the governing train-line in parallel with each other for operating the controllers, and means for energizing the governing train-line, substantially as described.

11. In an electrical train system, the combination of translating devices and circuits therefor, a governing train-line consisting of independent sets of train-wires, and means at one or more points for energizing a wire in one set or a wire in each set of the train-wires at will, substantially as described.

12. A car equipped with a translating device, a circuit therefor, an independent governing or relay circuit with branches therefrom which are grounded, one or more operator's switches in the relay-circuits, a source of supply, and connections to the source of supply at each operator's switch, substantially as described.

13. The combination of motors, motor-circuits, an independent governing relay-circuit with grounded branches, one or more operator's switches connected with the governing-circuit, and connection to the source of supply at each operator's switch, substantially as described.

14. In a train system, a plurality of motors, controllers and circuits therefor, a governing train-line, relays on the equipped cars connected to the train-line in multiple, one or more operator's switches connected with the relays by the train-line, a source of supply, connection to the source of supply at each operator's switch, and grounding connections for the relays, substantially as described.

15. A train with a plurality of cars, a governing train-line through the cars, one or more operator's switches connected to the train-line, and motors on one or more of the cars connected with the source of supply through contacts controlled through the train-line, but otherwise independently thereof, substantially as described.

16. A train with a plurality of cars, a governing train-line through the cars, one or more operator's switches connected to the train-line, and motors on one or more of the cars connected with the source of supply through reversing-contacts controlled through the train-line but otherwise independently thereof, substantially as described.

17. A train with a plurality of cars, a governing train-line through the cars, one or more operator's switches connected to the train-line, and motors on one or more of the cars connected with the source of supply through reversing-contacts controlled through the train-line but otherwise independently thereof, and independent means for controlling the speed of the motors, substantially as described.

18. A train with a plurality of cars, a governing train-line through the cars, one or more operator's switches connected to the train-line, and motors on one or more of the cars connected with the source of supply through reversing-contacts controlled through the train-line but otherwise independently thereof, and independent means for connecting the motors in series and multiple, substantially as described.

19. A train with a plurality of cars, a governing train-line through the cars, one or more operator's switches connected to the train-line, and motors on one or more of the cars connected with the source of supply through reversing-contacts controlled through the train-line but otherwise independently thereof, and independent means for connecting the motors in series and multiple and for varying the resistance in circuit therewith, substantially as described.

20. A train with a plurality of equipped cars, a source of supply, a governing train-line, relays on the equipped cars, one or more operator's switches connected with the relays through the train-line, and translating devices on the equipped cars connected with the source of supply through contacts operated by the relays but otherwise independently of the train-line, substantially as described.

21. A car, a driving motor or motors thereon, a circuit therefor, a plurality of separately-actuated contacts for effecting changes in the motor-circuits, means for operating said contacts, and an operator's switch connected therewith independently of the circuit of the motors, substantially as described.

22. A train with cars, driving-motors on a plurality of cars, a plurality of separately-actuated contacts for effecting changes in the circuits of the motors, means for operating the contacts, and operator's switches on the different cars connected with the contact-operating means independently of the motor connections, substantially as described.

23. A train with cars, driving-motors on a plurality of cars, a plurality of separately-actuated contacts for reversing the motors, means for operating the contacts, and operator's switches on equipped cars connected therewith independently of the motor connections, substantially as described.

24. A train with cars, driving-motors on a plurality of cars, a plurality of separately-actuated contacts for reversing the motors, means for operating the contacts and operator's switches on equipped cars connected therewith independently of the motor connections, and independent means for varying the speed of the motors, substantially as described.

25. A train with cars, driving-motors on a plurality of cars, a plurality of separately-actuated contacts for reversing the motors, means for operating the contacts and operator's switches on equipped cars connected therewith, and independent means for connecting the motors in series and multiple, substantially as described.

26. A train with cars, driving-motors on a plurality of cars, a plurality of separately-actuated contacts for reversing the motors, means for operating the contacts and operator's switches on equipped cars connected therewith, and independent means for connecting the motors in series and multiple and for varying the resistance in circuit therewith, substantially as described.

27. In an electrical train system, the combination of two or more motor equipments, relays individual to each equipment through which it is controlled, and means at one or more points for operating one or more of the relays on each equipment simultaneously, substantially as described.

28. In an electrical train system, the combination of two or more motor equipments, speed-determining contacts for each equipment, relays individual to each equipment for determining the position of these contacts, a train-line, and means at one or more points for operating simultaneously like relays of each equipment, substantially as described.

29. In an electrical train system, the combination of motor equipments, speed-determining contacts for each equipment, relays individual to each equipment for determining the position of these contacts, a train-line, and means at one or more points for operating simultaneously like relays of each equipment and also for operating successively various groups of like relays on all of the cars, substantially as described.

30. In an electrical train system, the combination of two or more motor equipments, direction-controlling contacts for each equipment, a rheostat for each equipment for varying the motor speed, relays for effecting variations in the resistance, a train-line connected with these relays, and one or more master-controllers or operator's switches connected with the train-line, substantially as described.

31. In an electrical train system, the combination of motor equipments, direction-controlling contacts for each equipment, a rheostat for effecting speed variations for each equipment, relays for effecting like rheostat conditions for all the motor equipments, a train-line connected with the relays, one or more master-controllers or operator's switches connected with the train-line, and means for operating like relays simultaneously through the train-line and operator's switch, substantially as described.

32. In an electrical train system, the combination of motor equipments, direction-controlling contacts for each equipment, speed-determining contacts for each equipment, and relays for determining definite positions of these speed-contacts, substantially as described.

33. In an electrical train system, the combination of motor equipments, direction-controlling contacts for each equipment, speed-determining contacts for each equipment, relay-magnets for determining definite positions of the speed-contacts, a train-line connected with relays, and one or more master-controllers or operator's switches connected with the train-line, substantially as described.

34. In an electrical train system, the combination of motor equipments, direction-controlling contacts for each equipment, speed-determining contacts for each equipment, relays for operating the direction-controlling contacts, and independent relays for operating the speed-contacts, substantially as described.

35. In an electrical train system, the combination of motor equipments, direction-controlling contacts for each equipment, speed-determining contacts for each equipment, relay-magnets for operating the direction-controlling contacts, independent relays for operating the speed-contacts, a train-line connected with the relays, and one or more master-controllers or operator's switches connected with the train-line, substantially as described.

36. In an electrical train system, the combination of motor equipments, direction-controlling contacts for each equipment, speed-determining contacts for each equipment, relays for operating the speed-determining contacts, a train-line, and means at one or more points connected therewith for operating like relays simultaneously, and means for opening the relays automatically when the train-line circuit is interrupted, substantially as described.

37. In an electrical train system, the combination of two or more cars, one or more of the cars being equipped with a motor or motors, a controller or controllers therefor and means for operating each controller, the car or cars so equipped and one or more additional cars being provided with an independent governing train-line, substantially as described.

38. In an electrical train system, the combination of two or more cars, one or more of the cars being equipped with a motor or motors, a controller or controllers therefor, and means for operating each controller, the car or cars so equipped and one or more additional cars being also provided with an independent governing train-line, and an operator's switch connected with the train-line, substantially as described.

39. In an electrical train system, the combination of two or more cars, one or more of the cars being equipped with a motor or motors, a controller or controllers therefor, means for operating each controller, and an operator's switch or switches, the car or cars so equipped and one or more additional cars being also provided with an independent governing train-line, substantially as described.

40. In an electrical train system, the combination of two or more cars, one or more of which is equipped with a motor or motors, a controller or controllers therefor, and means for operating each controller, the car or cars so equipped and one or more additional cars being also provided with an independent governing train-line and one or more operator's switches, substantially as described.

41. The combination of motors, circuits therefor, an independent train-line, one or more operator's switches or master-controllers connected to the train-line, and separately-actuated contacts operated or controlled from the master-controllers for reversing the motors, substantially as described.

42. The combination of motors, circuits therefor, an independent train-line, one or more operator's switches or master-controllers connected to the train-line, separately-actuated contacts operated or controlled from the master-controllers for reversing the motors, and independent means for controlling the speed of the motors, substantially as described.

43. The combination of motors, circuits therefor, an independent train-line, one or more operator's switches or master-controllers connected to the train-line, separately-actuated contacts operated or controlled from the master-controllers for reversing the motors, and independent means for connecting the motors in series and multiple, substantially as described.

44. The combination of motors, circuits therefor, an independent train-line, one or more operator's switches or master-controllers connected to the train-line, separately-actuated contacts operated or controlled from the master-controllers for reversing the motors, and independent means for connecting the motors in series and multiple and for varying resistance in circuit therewith, substantially as described.

45. The combination of motors, an independent governing train-line, one or more operator's switches or master-controllers connected to the governing train-line, and separately-actuated contacts operated from the master-controllers for reversing the motors and for connecting them in series and parallel, substantially as described.

46. The combination of a source of supply, a train with cars each provided with an operator's switch, a train-line, the operator's switches being connected to the source of supply in multiple and to the train-line in multiple, a relay or relays on each car, the relays being connected to the train-line in multiple and each relay being connected with the operator's switch upon its car, a translating device on each car, and connections for the translating devices to the source of supply in multiple, each connection for a translating device being through a contact controlled by a relay upon its car, and being independent of the train-line, substantially as described.

47. The combination of a source of supply, a train with cars each provided with an operator's switch, a train-line, the operator's switches being connected to the source of supply in multiple and to the train-line in multiple, a relay or relays on each car, the relays being connected to the train-line in multiple and each relay being connected with the operator's switch upon its car, a motor on each car, and connections for the motors to the source of supply in multiple, each connection for a motor being through a contact controlled by a relay upon its car, and being independent of the train-line, substantially as described.

48. A train with a plurality of equipped cars, one or more operator's switches, a train-line, relays connected with the train-line, a source of supply, and motors connected with the source of supply independently of the train-line through contacts controlled by the relays, the contacts being so arranged that the motors can be reversed from each operator's switch by the operation of the relays, substantially as described.

49. The combination of a source of supply, one or more operator's switches, a train-line connected to each of the operator's switches, relays connected in multiple to the train-line, motors and connections therefor to the source of supply independently of the train-line through reversing-contacts controlled by the relays, substantially as described.

50. The combination of a source of supply, a train of cars, an operator's switch, a train-line connected with the operator's switch, relays on each car connected to the train-line in multiple and with the operator's switch, a motor upon each car, and a connection for each motor with the source of supply through reverser-contacts controlled by relays on the same car, the connections of the motors with the source of supply being independent of the train-line, substantially as described.

51. The combination of a plurality of motors or motor equipments, controllers for varying the speed thereof, and means electrically controlled for actuating the controllers from a single point simultaneously but independently of each other, substantially as described.

52. The combination of sets of motors or motor equipments, series-parallel grouping-switches therefor, one or more operator's switches or master-controllers, and means electrically controlled thereby for actuating the grouping-switches from a single point simultaneously but independently of each other, substantially as described.

53. The combination of sets of motors or motor equipments, controllers therefor, one or more operator's switches, means electrically controlled for operating the controllers from a single point simultaneously but independently of each other, and automatic means for securing similar operation of the individual controllers independently of their synchronism, substantially as described.

54. The combination of sets of motors or motor equipments, series-parallel controllers therefor, one or more operator's switches, means electrically controlled for operating the controllers from a single point simultaneously but independently of each other, and automatic means for securing similar operation of the controllers individually independently of their synchronism, substantially as described.

55. The combination of cars with sets of motors or motor equipments, controllers therefor, one or more operator's switches, means electrically controlled thereby for operating the controllers from a single point simultaneously but independently of each other, and automatic means local to the different cars for securing similar operation of the controllers individually independently of their synchronism, substantially as described.

56. The combination of a plurality of motors or motor equipments, controllers therefor, means for operating the controllers, one or more operator's switches, a train-line and connections from the operator's switches to the train-line and with it to the controller-operating means, whereby these may be operated from the operator's switch or switches, substantially as described.

57. The combination of a plurality of motors or motor equipments, controllers therefor, means electrically controlled for operating the controllers, an independent governing train-line, and circuits for the controller-operating means connected with the train-line in parallel with each other, substantially as described.

58. The combination of a plurality of motors or motor equipments, controllers therefor, means electrically controlled for operating the controllers, an independent governing train-line, circuits connected therewith in parallel with each other and with the various controller-operative means, and one or more operator's switches connected with the train-line, substantially as described.

59. The combination of a plurality of motors or motor equipments, controllers therefor, an independent governing train-line, means for operating all of the controllers from a single point, and means for disconnecting or rendering inoperative one or more of the controller-operative means, leaving the others operative, substantially as described.

60. The combination of a plurality of motors or motor equipments, controllers therefor, means electrically controlled for operating the controllers, an independent governing train-line, circuits for the controller-operative means connected with the train-line, and means for disconnecting or rendering inoperative one or more of the controller-operating means, leaving the others operative, substantially as described.

61. In an electrical train system, the combination of motors and circuits therefor, one or more circuit breakers or reversers and one or more current-varying controllers in such circuits, and a governing train-line having two sets of train-wires, on for controlling the circuit breakers or reversers, and the other for controlling the current-varying controllers, substantially as described.

62. The combination of cars, motors on the cars, reversers and current-varying controllers for the motors, circuits which include the motors, reversers and controllers, and an independent train-line for operating the reversers and controllers, substantially as described.

63. The combination of a plurality of cars, a source of supply, one or more operator's switches and a train-line connected therewith, motors, reversers and current-varying controllers for the motors, relays connected with the train-line and with each operator's switch, which relays operate the reversers and controllers, and connections between the motors and the source of supply through the reversers and controllers, substantially as described.

64. The combination of a train with equipped cars, a source of supply, an operator's switch, a train-line connected with the operator's switch, a reverser and current-varying controller on each equipped car operated by relays connected to the train-line in multiple and with the operator's switch, a motor on each car controlled by the reverser and controller on the same car, and connections for the motors with the source of supply, each being connected through its reverser and controller, and independently of the train-line, substantially as described.

65. A car equipped with a motor or motors to drive it, a controller therefor, pilot mechanism for operating the controller, one or more operator's switches, connections between each operator's switch and the pilot mechanism, and a train-line to which the pilot mechanism and each operator's switch are connected, substantially as described.

66. A car equipped with a motor to drive it, a current-varying controller for the motor and a pilot mechanism for operating the controller, one or more operator's switches, relays for operating the pilot mechanism through the operator's switch, and a train-line with which the relays are connected, each operator's switch being connected with the relays and the train-line, substantially as described.

67. A train with cars each equipped with a motor or motors to drive it, controllers for the motors, and a relay-circuit with a train-line for operating the controllers, substantially as described.

68. A train with cars equipped with electric motors to drive them, controllers for the motors, a relay-circuit for operating the controllers, independent circuits for supplying the driving-motors which are connected to them through the controllers, and a train-line for the relay-circuit, substantially as described.

69. In an electrical train system, the combination of motor equipments, controllers for the motor equipments each provided with relays for effecting various motor groupings or rheostat variations, a train-line connected with relays, one or more master-controllers or operator's switches connected with the train-line, and means for operating one or more of the relays of all of the equipments simultaneously, substantially as described.

70. A train with cars each provided with a motor to drive it, a controller therefor, pilot mechanisms for operating the controllers, a train-line for controlling the pilot mechanisms, and one or more operator's switches connected with the train-line, substantially as described.

71. A train with cars, each provided with a motor to drive it, a current-varying controller for the motors individualized with respect to the cars, pilot mechanism for the controllers, one or more operator's switches, relays through which the pilot mechanisms are controlled by an operator's switch, and a train-line for the relays with which each operator's switch is also connected, substantially as described.

72. A system comprising motors or sets of motors, individual current-varying controllers for the motors, pilot mechanisms for the controllers, means for operating the controllers simultaneously, and means for preventing cross connections of the circuits controlling the pilot mechanisms upon the different cars, substantially as described.

73. In a train system, the combination of driving-motors, current-varying controllers for the motors, a pilot mechanism for operating each controller, relays, an operator's switch connected with the relays, and relay-circuits through which the pilot mechanism can be operated, substantially as described.

74. An electrically-equipped car provided with the combination of three circuits, one of which includes one or more driving-motors and a reverser and current-varying controller therefor, another of which includes a pilot mechanism and limit-contacts for the pilot mechanism, and a third of which includes train-wires, an operator's switch, and relays for operating the relay-contacts in the circuit of the pilot mechanism, substantially as described.

75. The combination of motors, a plurality of separately-actuated contacts, means controlled thereby for changing the grouping of the motors from series to parallel and vice versa, and electromagnets for controlling the contacts, substantially as described.

76. The combination of motors, a plurality of separately-actuated contacts, means controlled thereby for reversing the motors and for changing the grouping of the motors from series to parallel and vice versa, and electromagnets for controlling the contacts, substantially as described.

77. A train of cars, driving-motors upon a plurality of cars, separate electrically-controlled contacts for effecting the grouping of the motors in series and parallel, and one or more operator's switches for controlling the contacts, substantially as described.

78. A train of cars, driving-motors upon a plurality of the cars, separate electrically-controlled contacts for effecting the grouping of the motors in series and parallel and for reversing the motors, and one or more operator's switches for controlling the contacts, substantially as described.

79. The combination of motors, a main switch provided with contacts for varying the relation of the motors with each other and for varying the resistance in circuit with the motors, a pilot mechanism for moving the main switch, and contacts moving with the main switch for limiting the movement thereof, substantially as described.

80. The combination of motors, a main switch provided with contacts for changing the relation of the motors from series to multiple, or vice versa, and for varying the resistance, pilot mechanism for moving the main switch, and contacts moving with the main switch for limiting the movement thereof so as to stop the main switch at the open circuit or the series or the multiple relation of the motors, substantially as described.

81. The combination of motors, a main switch provided with contacts for varying the relation of the motors with each other and for varying the resistance, pilot mechanism for moving the main switch, and contacts moving with the main switch for limiting the movement of the pilot mechanism, substantially as described.

82. The combination of motors, a main switch provided with contacts for changing the relation of the motors from series to multiple, or vice versa, and for varying the resistance, pilot mechanism for moving the main switch, and contacts moving with the main switch for limiting the movement of the pilot mechanism so as to stop the main switch at open circuit, or series or multiple relation of the motors, substantially as described.

83. A train with cars each equipped with a motor or motors to drive it, controllers for the motors, a train-line for the controllers, and automatic stops for the controllers, substantially as described.

84. A train with cars, each equipped with a motor or motors to drive it, controllers for the motors, pilot mechanism for the controllers, a train-line for the controllers, and automatic stops for the pilot mechanism, substantially as described.

85. A train with cars, each equipped with a motor or motors to drive it, controllers for the motors, a pilot mechanism for each of the controllers, train connections for the controllers, and automatic stops for each of the pilot mechanisms, substantially as described.

86. The combination of one or more operator's switches each provided with a plurality of contacts, one or more motors and a controller therefor, a plurality of sets of contacts on the controller, and means for bringing the controller to one set of contacts by closing an operator's switch at one of its contacts, substantially as described.

87. The combination of one or more operator's switches each provided with a plurality of contacts, one or more motors and a controller therefor, a plurality of sets of contacts on the controller, and means for bringing the controller to one set of contacts by closing an operator's switch at one of its contacts, and for bringing the controller to another set of contacts by closing an operator's switch at another of its contacts, substantially as described.

88. A train with cars each provided with a driving motor or motors, controllers for the motors, a pilot mechanism for operating the controllers, relays, one or more operator's switches connected with the relays, relay-circuits through which the pilot mechanisms can be operated, and means for automatically stopping each controller at certain definite positions, substantially as described.

89. A train with cars each equipped with a motor, controllers for the motors, a train-line for the controllers, an operator's switch connected with the train-line and the controllers, and automatic stop-switches connected with the operator's switch for controlling the operation of the controllers, substantially as described.

90. A train with cars each equipped with a motor, a controller for each of the motors, a train-line for the controllers, an operator's switch connected with the train-line and the controllers, and an automatic stop-switch for each of the controllers by which in coöperation with the operator's switch the operation of each controller is effected, substantially as described.

91. A train with cars each equipped with a motor, controllers for the motors, pilot mechanisms for the controllers, a train-line for the pilot mechanisms, an operator's switch connected with the train-line and the pilot mechanisms, and automatic stop-switches connected with the operator's switch for controlling the operation of the pilot mechanisms, substantially as described.

92. A train with cars, each equipped with a motor, a controller for each of the motors, a pilot mechanism for each of the controllers, a train-line for the pilot mechanisms, an operator's switch connected with the train-line and the pilot mechanisms, and an automatic stop-switch for each of the pilot mechanisms by which in coöperation with the operator's switch the operation of each pilot mechanism is effected, substantially as described.

93. In a system of electric-motor control, the combination of a current-varying controller, electromagnetic means for actuating the controller in a step-by-step manner, and switches for interrupting the actuating-circuit after the controller has advanced definite amounts, substantially as described.

94. In a system of electric-motor control, the combination of a current-varying controller, a pilot-motor for actuating the controller in a step-by-step manner, and switches for interrupting the circuit of the pilot-motor each time the controller advances a definite amount, substantially as described.

95. The combination of a circuit, two unlike switches therein, one automatically retracted, to a definite position, and the other inert in its circuit-closing position. and means electrically controlled to operate the latter switch, substantially as described.

96. The combination of a circuit, two unlike switches in series therein, one automatically retracted to open the circuit, and the other inert in its circuit-closing position, and means electrically controlled to operate the latter switch to open the circuit, substantially as described.

97. The combination of a circuit, two unlike switches in series therein, one held closed by the current and automatically operated to open the circuit, and the other inert in its circuit-closing position, and means electrically controlled to operate the latter switch, substantially as described.

98. The combination of a circuit, two switches in series therein, one held closed by the current and automatically operated to open the circuit, and means electrically controlled to operate the other to change the circuit connections, substantially as described.

99. The combination of a circuit, two switches in series therein, one held in closed position by the current and automatically retracted to open circuit, the other moved by the current but remaining in position when the current is withdrawn, and a master-controller or operator's switch for operating the two switches, substantially as described.

100. The combination of an electrical circuit, a pair of motors included therein, two switches for effecting the reversal of the motors and their connection in series and multiple, one switch being operated and held in closed position by the current, the other switch being operated by the current but being left in position when the current is withdrawn, and a master-controller for operating the two switches, substantially as described.

101. The combination of a circuit, two switches in series, one a direct-throw device and automatically retracted, the other graded, means electrically controlled for setting both switches, and means electrically controlled for restoring the graded switch to off position, substantially as described.

102. In a system of control for electric motors, the combination of a current-varying controller, electromagnetic means for operating or controlling the same, an operator's switch or master-controller having speed-determining and reversing contacts for operating such electromagnetic means, a plurality of contacts on the operator's switch arranged to produce movement of the controller to limiting and intermediate positions respectively, and means for maintaining the controller in position when the speed-determining contacts of the master-controller are broken, substantially as described.

103. In a system of control for electric motors, the combination of a current-varying controller, electromagnetic means for operating it, an operator's switch or master-controller having reversing and speed-determining contacts for operating the electromagnetic means, a plurality of contacts on the operator's switch arranged to produce progression of the controller to definite positions when the operator's switch is closed at the speed-contacts, substantially as described.

104. In a train system, the combination of a plurality of motor-cars each equipped with a motor or motors, a current-varying controller therefor, and a pilot-motor for driving the current-varying controller, one or more operator's switches or master-controllers situated on the train, and electrical means controlled by each master-controller for interrupting the supply of current to the pilot-motors in such a way that the current-varying controllers shall stop in the off position or on some definite running position, substantially as described.

105. The combination of a controller having resistance and series-parallel contacts, pilot mechanism for operating the controller, means for operating the pilot mechanism, and means for stopping the controller automatically at the open circuit and full multiple contacts of the controller, substantially as described.

106. The combination of a controller having resistance and series-parallel contacts, a pilot-motor for operating the controller, means for operating the pilot-motor, and means for stopping the controller automatically at the open circuit, full series, and full multiple contacts of the controller, substantially as described.

107. In a system of control for electric motors, the combination of a motor-controller, a pilot-motor for driving the motor-controller, a set of contacts for regulating the pilot-motor which are so arranged that the circuit of the armature of the pilot-motor is automatically interrupted only after it has made a predetermined number of revolutions, and a second set of contacts which are in operative relation when the first set is interrupted, substantially as described.

108. A car equipped with a motor to drive it, a driving-circuit therefor, a controller for the motor, electrically-controlled pilot mechanism for the controller, and an independent circuit for controlling the pilot mechanism, substantially as described.

109. A car equipped with a motor to drive it, a driving-circuit therefor, a controller therefor, electrically-controlled pilot mechanism for the controller, an independent circuit for controlling the pilot mechanism, and automatic stops for the pilot mechanism, substantially as described.

110. A train with cars, each equipped with a motor to drive it, controllers for the motors, electrically-controlled pilot mechanisms for operating the controllers, a train-line for controlling the pilot mechanisms, and automatic stops for the pilot mechanisms, substantially as described.

111. The combination of a current-varying controller, a pilot-motor therefor, a switch for starting the controller, means independent of the switch for interrupting the movement of the controller at a definite point, means for starting the controller again in the same direction by operation of the switch, and means independent of the switch for again interrupting the movement of the controller at another definite point, substantially as described.

112. The combination of the source of supply, a current-varying controller, a pilot mechanism therefor, means independent of the current in the controller for moving the controller at will from one limit to another, means for moving the controller to a definite intermediate position and automatically stopping it there, and means for continuing the movement of the controller in the same direction to its limit, substantially as described.

113. The combination of a plurality of motors or motor equipments, current-varying controllers therefor, there being several possible definite positions to which the controllers may be brought, and means for bringing all of the controllers to any one of the definite positions irrespective of any differences in the positions in which the various controllers may be, substantially as described.

114. The combination of a plurality of motors or motor equipments, current-varying controllers therefor, there being several possible definite positions to which the controllers may be brought, one or more operator's switches, a governing train-line, and means connected therewith for bringing all of the controllers to any one of the definite positions irrespective of any differences of the positions in which the controllers may be, substantially as described.

115. A plurality of motors or motor equipments, a controller for each motor or motor equipment, a circuit for operating the controllers, and an independent circuit for each controller for resetting the controllers, substantially as described.

116. A train with cars each provided with one or more motors or motor equipments, a controller for each motor or motor equipment, circuits local to the cars for operating the controllers, a train-line with relays and one or more operator's switches for operating the local circuits, and a local circuit for resetting each controller, substantially as described.

117. The combination of a plurality of motors or motor equipments, current-varying controllers therefor, a circuit independent of the controllers, means electrically controlled thereby for effecting progression of the controllers, and means for effecting interrupted retrogression of the controllers, substantially as described.

118. The combination of a plurality of motors or motor equipments, current-varying controllers therefor, a circuit independent of the controllers, means electrically controlled thereby for effecting progression of the controllers, and means for effecting a continuous retrogression of the controllers toward release or off position and to an intermediate running position, substantially as described.

119. The combination of a plurality of motors or motor equipments, series-parallel switches therefor, a circuit independent of these switches, means electrically controlled thereby for effecting progression of the controllers to parallel position, and means for effecting retrogression of the controllers from the parallel to the series position, substantially as described.

120. The combination of a plurality of motors or motor equipments, independent current-varying controllers therefor, means electrically controlled for effecting interrupted progression of the controllers, and means for effecting continuous retrogression of the controllers, substantially as described.

121. The combination of a main circuit, a current-varying controller therein, means independent of the main circuit for moving the controller at will from one limit to another, means independent of the main circuit for moving the controller to different intermediate positions and stopping it at such intermediate positions, and means independent of the main circuit for continuing the progression of the controller to its limit, substantially as described.

122. The combination of a current-varying controller, means electrically controlled and independent of the current through the controller for producing an interrupted progression thereof, and means for producing a continuous retrogression of the controller, substantially as described.

123. The combination of a current-varying controller, a circuit therethrough, means independent of the circuit through the controller for producing progression thereof, means for stopping the progression automatically at a plurality of definite points, and means for producing a continuous retrogression of the controller, substantially as described.

124. The combination of a current-varying controller, a switch for operating the controller provided with suitable contacts and circuit connections, means for moving the controller, and means independent of the switch for giving to the controller a step-by-step movement, substantially as described.

125. The combination of a motor or motors, an independently-operated reverser or reversers therefor, a current-varying controller or controllers therefor, and means controlled by an independent circuit for effecting step-by-step or periodic or interrupted progression of each controller, substantially as described.

126. The combination of a motor or motors, independently-operated reverser or reversers therefor, a current-varying controller or controllers therefor, and means controlled by an independent circuit for effecting a step-by-step or periodic or interrupted progression of each controller, and means for effecting a continuous retrogression of each controller, substantially as described.

127. A train with cars each provided with a motor or motor equipment, a controller and a circuit therefor, a step-by-step actuating device for each controller, an operator's switch and train-line for controlling all of the actuating devices simultaneously, and means for cutting out each actuator and thereby any controller without affecting the operation of the others, substantially as described.

128. A car equipped with one or more operator's switches and branch lines from these switches; a train-line terminating in couplers; local relay-circuits; and connections between these three systems, substantially as described.

129. A car equipped with one or more operator's switches and branch lines from these switches; a train-line terminating in couplers; local relay-circuits; connections between these three systems, and disconnecting-switches between pairs of systems, substantially as described.

130. A car equipped with an operator's switch at each end thereof, a cable between the operator's switches, a controller system, branches from the cable between the operator's switches to the controller system, a train-line, and branches from the cable between the operator's switches to the train-line, substantially as described.

131. A train equipped with a train-line, operator's switches, a cable between the operator's switches, a controller system, the cable between the operator's switch being connected to the train-line and to the controller system, means for breaking the connection to the train-line, and means for breaking the connection to the controller system, substantially as described.

132. A train with cars equipped with motors to drive them, a train-line, an operator's switch, means for connecting the operator's switch to the train-line, a car system and independent means for connecting the operator's switch to the car system whereby the operator's switch can be connected to the car system, or to the train-line, or to both the train-line and the car system, substantially as described.

133. A train with cars each equipped with a motor to drive it, a controller for each of the motors, a pilot mechanism for each of the controllers, a train-line for controlling the pilot mechanisms, and an operator's switch connected with the train-line and with all of the pilot mechanisms, substantially as described.

134. A car equipped with an operator's switch, a train-line speed-controller circuit, a train-line reverser-circuit, a motor to drive the car, an independent circuit for the motor, and a current-varying controller and reverser in the motor-circuit, substantially as described.

135. A train with cars equipped with an operator's switch, a train-line speed-controller circuit and a train-line reverser-circuit, motors to drive the cars, independent circuits for these motors, and controllers and reversers in the motor-circuits, substantially as described.

136. The combination of an operator's switch, a train-line connected therewith, branches from the train-line forming therewith speed-controller and reverser circuits, a motor, an independent circuit for the motor, and a current-varying controller and reverser in the motor-circuit operated by means of the operator's switch through the speed-controller and reverser circuits, substantially as described.

137. A train with cars equipped with an operator's switch, a train-line connected thereto, branches from the train-line on each of the cars forming therewith speed-controller and reverser circuits, motors to drive the cars, independent circuits for the motors, and current-varying controllers and reversers in the motor-circuits operated by means of the operator's switch through the speed-controller and reverser circuits, substantially as described.

138. The combination of a plurality of cars, driving-motors therefor and circuits for the motors, a relay train-circuit for controlling the motor-circuits, and means for opening the motor-circuits upon the current being cut off from the relay-circuit, substantially as described.

139. The combination of a plurality of cars, driving-motors therefor, and circuits for the motors, a relay train-circuit, reversers for the motors operated through the relay-circuit, and means for opening the motor-circuits at the reversers upon the current being cut off from the relay-circuit, substantially as described.

140. A train with cars each equipped with a motor to drive it, a common control for the motors, and means external to the motors for equalizing their operation, substantially as described.

141. A train with cars each equipped with a motor or motors to drive it, controllers therefor, a common control for the motors, and means external to the motors for automatically delaying or interrupting the progression of the controllers, substantially as described.

142. A train with cars each individually equipped with a driving motor or motors and a current-varying controller therefor, a common control for the controllers, and one or more throttles on the train for automatically delaying or interrupting the progression of the controllers, substantially as described.

143. A train with cars each individually equipped with a driving motor or motors and a current-varying controller therefor, a common control for the controllers, and one or more throttles on the train operated by an abnormal increase of current for automatically delaying or interrupting the progression of the controllers, substantially as described.

144. A train with cars each individually equipped with a driving-motor and a current-varying controller therefor, the motor and controller on each car being connected in multiple with respect to those on the other cars, and means for controlling the movement of the controllers to equalize the consumption of energy by the different motors, substantially as described.

145. A motor-control system comprising a motor, a current-varying controller therefor, and means dependent upon the increase of the motor-current beyond a predetermined limit for reducing or removing the power provided for moving the controller in one direction only, substantially as described.

146. A train with cars individually equipped with motors and controllers therefor, a common control for the controllers, and means on each car for independently regulating the progression of the controllers, substantially as described.

147. A train with cars individually equipped with motors and controllers therefor, a common control for the controllers, and means on each car for independently and automatically regulating the progression of the controllers, substantially as described.

148. A train with cars individually equipped with driving-motors, controllers for the motors, means for moving all of said controllers simultaneously, and means individual to each car for automatically arresting the movement of the controller thereon, substantially as described.

149. A train with cars individually equipped with a driving motor or motors, a controller therefor, a pilot mechanism for the controller, and means for equalizing the consumption of energy by the different motors by control of the movement of the pilot mechanism, substantially as described.

150. In a system of motor control, the combination of motors or motor equipments, controllers therefor, means for operating all of the controllers, and throttles independently actuated by the current in each controller for arresting the progression of such controller when the current through it exceeds a predetermined limit, substantially as described.

151. A train of cars, motors or motor equipments on the cars, a controller for each motor or motor equipment, an operator's switch, means connected therewith for operating the controllers from and toward off position, means for automatically bringing the operator's switch into position to restore the controllers to off position, and means local to each car for restoring the controllers to off position, substantially as described.

152. In a controller, the combination of electrically-controlled reversing-contacts, separate electrically-controlled speed-determining contacts, and means operating on failure of the line-current for restoring one set of contacts to off position without movement of the other set of contacts, substantially as described.

153. The combination of a motor to drive a car, a suitable system of circuits for operating the motor, including a pilot mechanism for controlling the speed of the motor, connections for operating the pilot mechanism to cause increase or decrease in speed of the motor, and a safety automatic reverser which opens the increased-speed connections of the pilot mechanism and closes its decreased-speed connections, substantially as described.

154. The combination of a motor, a controller therefor, an operator's switch, means connected therewith for operating the controller toward or from its initial position, and means independent of the operator's switch for restoring the controller to initial position, substantially as described.

155. A train with cars individually equipped with motors and controllers, an operator's switch for controlling the same, and means for restoring the controller on each car to the initial position independently of the operator's switch, substantially as described.

156. The combination of cars with a motor or motors and a controller therefor with several definite positions, located on each of the cars, one or more operator's switches with a plurality of positions, and a governing train-line for the controllers, the arrangement being such that movement of an operator's switch in either "on" or "off" direction through any number of steps causes corresponding movement of all of the controllers, substantially as described.

157. The combination of a motor or motors, a speed-controller and a reverser therefor, the speed-controller having different speed-contacts, an operator's switch and governing train-lines for the speed-controller and reverser, the operator's switch having an open position, and speed and direction contacts on opposite sides of open position for movement of the motor in both directions, means for moving the speed-controller from initial position to any speed-contact on closure of the operator's switch at the corresponding speed-contact, and means for restoring the controller to initial position if the operator's switch is opened, substantially as described.

158. A train with cars each provided with a motor or motors and a speed-controller and reverser therefor, the speed-controllers having different speed-contacts, one or more operator's switches and a governing train-line for the speed-controller and reverser, the operator's switch having an open position and speed and reverser contacts on opposite sides of the open position for effecting movement of the motors in both directions, and means for moving the speed-controllers from initial position to any speed-contact on closure of the operator's switch at the corresponding speed-contact, and means for restoring the controllers to initial position if the operator's switch is opened, substantially as described.

159. The combination of a motor or motors, a speed-controller and a reverser therefor, the speed-controllers having different speed-contacts, one or more operator's switches and a governing train-line for the reverser and speed-controller, the operator's switch having an open position and speed and reverser contacts on opposite sides of the open position for movement of the motor in both directions, means for moving the speed-controller from initial position to any speed-contact on closure of the operator's switch at the corresponding speed-contact, means for restoring the speed-controller to initial position if the operator's switch is opened, and a throttle for regulating the movement of the speed-controller independently of the operator's switch, substantially as described.

160. A train with cars each provided with a motor or motors and a speed-controller and reverser therefor, the speed-controllers having different speed-contacts, one or more operator's switches and a governing train-line for the controller and reverser, the operator's switch having an open position and speed and reverser contacts on opposite sides of the open position for effecting movement of the motors in both directions, means for moving the speed-controllers from initial position to any speed-contact on closure of the operator's switch at the corresponding speed-contact, means for restoring the speed-controllers to initial position if the operator's switch is opened, and a throttle for each of the speed-controllers for regulating the movement thereof independently of the operator's switch, substantially as described.

161. The combination of a motor and a circuit therefor, a controller in the circuit, an operator's switch and means connected therewith for operating the controller, a throttle which varies the operation of the controller independently of the operator's switch, and means for restoring the controller to initial position independently of the operator's switch, substantially as described.

162. The combination of a motor and a circuit therefor, a controller in the circuit, a pilot mechanism for operating the controller, an operator's switch and means connected therewith for operating the pilot mechanism, a throttle which varies the operation of the pilot mechanism and of the controller independently of the operator's switch, and means for restoring the controller to initial position independently of the operator's switch, substantially as described.

163. The combination of a plurality of motors, a series-parallel controller therefor, means for operating the controller, and a throttle which varies the operation of the controller, the throttle being connected in the branch with one motor only when the motors are in parallel arrangement, substantially as described.

164. A train with two or more cars individually equipped, means on each car for controlling all cars simultaneously, and a reverser and automatic circuit-breaker for restoring the controlling means to a determined position, substantially as described.

165. A controller system consisting of an electrically controlled or operated reversing-switch, an independent series-multiple controller, a pilot mechanism for operating the controller, an operator's switch and means connected therewith for operating the pilot mechanism, and means for independently restoring the controller to open position, substantially as described.

166. The combination of main circuits, a governing train-line, an operator's switch or switches connected with the train-line, means for opening the train-line, and relay mechanisms connected with the train-line operating upon the opening thereof to open the main circuits, substantially as described.

167. The combination of main circuits, controllers therein, a governing train-line, one or more operator's switches connected therewith, means for opening the train-line circuit, relay mechanisms connected therewith for opening the main circuits, and means for automatically restoring the controllers to off position, substantially as described.

168. The combination of a circuit-closer and a speed-controlling device, a governing-circuit for actuating one device, and a contact in the governing-circuit the closure of which is controlled by the position of the other device, substantially as described.

169. The combination of two circuit-controlling devices, a governing-circuit for actuating them, and a contact in the governing circuit the closure of which is controlled by the position of one of the circuit-controlling devices, substantially as described.

170. The combination of a main circuit, a circuit-closer and a speed-controller in series therein, a governing-circuit for actuating the circuit-closer, and a contact in the governing-circuit the closure of which is controlled by the position of the speed-controller, substantially as described.

171. The combination of a reverser and a speed-controller, a governing-circuit for actuating the reverser, and a contact in the governing-circuit the closure of which is controlled by the position of the speed-controller, substantially as described.

172. The combination of a main circuit, a circuit-closer and a controller in series therein, a governing-circuit for the circuit-closer, and a contact in the governing-circuit the closure of which is controlled by the position of the controller, substantially as described.

173. The combination of a main circuit, a reverser and a speed-controller in series therein, a governing-circuit for the reverser, and a contact in the governing-circuit the closure of which is controlled by the position of the speed-controller, substantially as described.

174. The combination of a main circuit, a circuit-closer and a motor-grouping switch in series therein, a governing-circuit for the circuit-closer, and a contact in the governing-circuit the closure of which is controlled by the position of the motor-grouping switch, substantially as described.

175. The combination of a main circuit, a reverser and a motor-grouping switch in series therein, a governing-circuit for the reverser, and a contact in the governing-circuit the closure of which is controlled by the position of the motor-grouping switch, substantially as described.

176. The combination of a main circuit, a circuit-closer and a combined motor-grouping switch and rheostat in series therein, a governing-circuit for the circuit-closer, and a contact in the governing-circuit the closure of which is controlled by the position of the combined motor-grouping switch and rheostat, substantially as described.

177. The combination of a main circuit, a reverser, and combined motor-grouping switch and rheostat in series therein, a governing-circuit for the reverser, and a contact in the governing-circuit the closure of which is controlled by the position of the combined motor grouping switch and rheostat, substantially as described.

178. The combination of two circuit-controlling devices, a governing-circuit for actuating them, a cut-out contact in the governing-circuit the closure of which is controlled by the position of one of the circuit-closing devices, a shunt around the cut-out contact, and means for closing the shunt when the governing-circuit is energized, substantially as described.

179. The combination of a main circuit, a circuit-opener and current-varying controller in series therein, a governing-circuit for actuating them, a cut-out contact in the governing-circuit the closure of which is controlled by the position of the current-varying controller, a shunt around the cut-out contact, and means for closing the shunt when the governing-circuit is energized, substantially as described.

180. The combination of a reverser, and a current-varying controller, a governing-circuit for actuating them, a cut-out contact in the governing-circuit the closure of which is controlled by the position of the current-varying controller, a shunt around the cut-out contact, and means for closing the shunt when the governing-circuit is energized, substantially as described.

181. The combination of a main circuit, a controller and a circuit-closer in series therewith, a governing-circuit for actuating the circuit-closer, means for closing the governing-circuit in a certain position of the controller, and means actuated by the governing-circuit for maintaining the circuit when the controller is moved out of said position, substantially as described.

182. The combination of a main circuit, a circuit-closer and a controller in series therein, a governing-circuit for the circuit-closer having an actuating branch and a maintaining branch, means for closing the maintaining branch when the actuating branch is closed, and means for opening the actuating branch by movement of the controller, substantially as described.

183. The combination of a main circuit, a reverser and a current-varying controller, a governing-circuit for the reverser having an actuating branch and a maintaining branch, means for closing the maintaining branch when the actuating branch is closed, and means for opening the actuating branch by movement of the controller, substantially as described.

184. The combination of a main circuit, a circuit-closer and a controller in series therein, a governing-circuit for the circuit-closer including a contact which is opened by movement of the controller, a shunting-contact around the controller-contact, and electromagnetic means in the governing-circuit for closing the shunting-contact and holding it closed, substantially as described.

185. The combination of a main circuit, a reverser and a controller, a governing-circuit for the reverser including a contact which is opened by movement of the controller, a shunting-contact around the controller-contact, and electromagnetic means in the governing-circuit for closing the shunting-contact and holding it closed, substantially as described.

186. The combination of a main circuit, a circuit-closer and a controller in series therewith, a governing-circuit for actuating the circuit-closer, there being two contacts in parallel in the governing-circuit, one of which is opened by movement of the controller and the other upon failure of the line-current, substantially as described.

187. The combination of a reverser and a controller, a governing-circuit for actuating the reverser, there being two contacts in parallel in the governing-circuit, one of which is opened by movement of the controller and the other on failure of the line-current, substantially as described.

188. In a circuit, the combination of an initial or master circuit-closer, a second circuit-closer normally closed, and a third circuit-closer which can be operated to close only when the other two are both closed, substantially as described.

189. In a circuit, the combination of two circuit-closers in parallel, means for closing one of the said circuit-closers which can be operated only when the other is closed, and an initial or master circuit-closer in series with each of the other two, substantially as described.

190. The combination of a controller, a circuit for operating the controller, a master circuit-closer and two auxiliary circuit-closers therein, the auxiliary circuit-closers being in parallel with each other and each in series with the master circuit-closer, means for closing the circuit through the master circuit-closer and both of the auxiliary circuit-closers in a certain position of the controller, and means for opening one of the auxiliary circuit-closers by moving the controller and for opening the other auxiliary circuit-closer on failure of the line-current, substantially as described.

191. The combination of a circuit, an initial or master circuit-closer, two auxiliary circuit-closers in parallel relation with each other and each in series with the master circuit-closer in the said circuit, a controller, means for closing the circuit through the master circuit-closer and each of the auxiliary circuit-closers in a certain position of the controller, and means for opening one of the auxiliary circuit-closers by moving the controller and for opening the other of the auxiliary circuit-closers on failure of the line-current, substantially as described.

192. The combination of a circuit, an initial or master circuit-closer, two auxiliary circuit-closers in parallel relation with each other and each in series with the master circuit-closer in the said circuit, a reverser and a controller operated through the said circuit, means for closing the circuit through the master circuit-closer and each of the auxiliary circuit-closers in a certain position of the controller, and means for opening one of the auxiliary circuit-closers by movement of the controller and for opening the other of the auxiliary circuit-closers on failure of the line-current, substantially as described.

193. The combination of a controller, means for operating it, a governing-circuit therefor, a circuit-changer operating to bring the controller to definite position, and means for automatically operating the circuit-changer on failure of the line-current, substantially as described.

194. The combination of a controller, means for operating it, a governing-circuit therefor, a circuit-changer operating to restore the controller to initial position, and means for automatically operating the circuit-changer on failure of the line-current, substantially as described.

195. The combination of two circuit-controlling devices, a governing-circuit for actuating them, a cut-out contact in the governing-circuit the closure of which is controlled by the position of one of the circuit-closing devices, a shunt around the cut-out contact, means for closing the shunt when the governing-circuit is energized, a restoring-circuit provided with means for actuating the second-named circuit-controlling device to close the cut-out contact, and means for closing the restoring-circuit when the current fails in the governing-circuit, substantially as described.

196. The combination of a main circuit, a circuit-closer and a current-varying controller in series therein, a governing-circuit for actuating them, a cut-out contact in the governing-circuit the closure of which is controlled by the position of the current-varying controller, a shunt around the cut-out contact, means for closing the shunt when the governing-circuit is energized, a restoring-circuit provided with means for actuating the current-varying controller to close the cut-out contact, and means for closing the restoring-circuit when the current fails in the governing-circuit, substantially as described.

197. The combination of a reverser and a current-varying controller, a governing-circuit for actuating them, a cut-out contact in the governing-circuit the closure of which is controlled by the position of the current-varying controller, a shunt around the cut-out contact, means for closing the shunt when the governing-circuit is energized, a restoring-circuit provided with means for actuating the current-varying controller to close the cut-out contact, and means for closing the restoring-circuit when the current fails in the governing-circuit, substantially as described.

198. The combination of a motor, a controller therefor, a cut-out switch, and a circuit through which the controller is operated, the cut-out switch being included in the circuit in a definite position of the controller, substantially as described.

199. The combination of a plurality of motors, a controller for each motor or set of motors, and a circuit through which the controllers are operated, a cut-out switch for each controller, the cut-out switches being all connected in multiple and each cut-out switch being included in the circuit in a definite position of the appropriate controller, substantially as described.

200. The combination of a main circuit, two circuit-controlling devices, a governing-circuit for actuating one of them, a local circuit controlled by the governing-circuit for actuating the other, means for opening the local circuit when the current in the main circuit becomes too large, and means for opening the governing-circuit when the current fails, substantially as described.

201. The combination of a main circuit, a circuit-closer and a current-varying controller in series therein, a governing-circuit for actuating the circuit-closer, a local circuit controlled by the governing-circuit for actuating the controller, means for opening the local circuit when the current in the main circuit becomes too large, and means for opening the governing-circuit when the current fails, substantially as described.

202. The combination of a main circuit, a reverser and a current-varying controller, a governing-circuit for actuating the reverser, a local circuit controlled by the governing-circuit for actuating the controller, means for opening the local circuit when the current in the main circuit becomes too large, and means for opening the governing-circuit when the current fails, substantially as described.

203. The combination of main circuits, controllers therein, a governing train-line, an operator's switch or switches connected with the train-line, means for opening the train-line, relay mechanism connected with the train-line operating on the opening thereof to open the main circuit, and means for preventing the closure of the main circuits until the controller has been moved toward or to off position, substantially as described.

204. The combination of main circuits, controllers therein, a governing train-line, an operator's switch or switches connected with the train-line, means for opening the train-line, relay mechanisms connected with the train-line operating on the opening thereof to open the main circuit, and means to prevent closure of the main circuits or any progression of the controllers until the controllers have been moved toward or to off position, substantially as described.

205. The combination of main circuits, controllers therein a governing train-line, one or more operator's switches connected therewith, means for opening the train-line, relay mechanisms connected therewith for opening the main circuits, means for automatically restoring the controllers toward or to the off position, and means for preventing the closure of the main circuits after the opening thereof until the controllers are moved toward or to the off position, substantially as described.

206. The combination of main circuits, controllers therein, a governing train-line, one or more operator's switches connected therewith, means for opening the train-line, relay mechanisms connected therewith for opening the main circuits, means for automatically restoring the controllers toward or to the off position, and means for preventing the closure of the main circuits and the further advance of the controllers until the controllers are moved toward or to the off positions, substantially as described.

207. The combination of a motor, a motor-circuit, a current-varying controller for the motor, a master-controller operating the current-varying controller through an independent governing-circuit, means automatically operated for opening the motor-circuit independently of the current-varying controller, and means for moving the current-varying controller toward or to the off position independently of the master-controller, substantially as described.

208. The combination of motors, motor-circuits, current-varying controllers for the motors, one or more operator's switches or master-controllers for operating the current-varying controllers through an independent governing-circuit, means automatically operated for opening the motor-circuits independently of the current-varying controllers, and means for moving the current-varying controllers toward or to the off positions independently of each other and of the master-controllers, substantially as described.

209. The combination of a motor, a motor-circuit, a current-varying controller for the motor, an operator's switch and circuit for operating the controller, means for opening the motor-circuit independently of the controller, means for restoring the controller independently of the operator's switch, and a cut-out switch connected with the controller and closed in certain positions thereof, which when it is closed restores control of the controller to the operator's switch, substantially as described.

210. The combination of a plurality of motors, or motor equipments, speed-controllers therefor, reversers independent of the speed-controllers, one or more operator's switches or master-controllers, means electrically controlled for producing interrupted progression of the controllers, and means for producing continuous retrogression of the controllers, substantially as described.

211. The combination of a plurality of motors or motor equipments, speed-controllers therefor, reversers independent of the speed-controllers, operator's switches or master-controllers, connections between the operator's switches, and means electrically controlled from the operator's switches through such connections for producing interrupted progression of the controllers, substantially as described.

212. The combination of a plurality of motors or motor equipments, speed-controllers therefor, reversers independent of the speed-controllers, master-controllers or operator's switches, connections between such operator's switches, means electrically controlled from the operator's switches through such connections for producing interrupted progression of the speed-controllers, and means for producing a continuous retrogression of the controllers, substantially as described.

213. The combination of a plurality of motors or motor equipments, speed-controllers therefor, reversers independent of the speed-controllers, means electrically controlled for operating the speed-controllers, means for producing interrupted progression of the speed-controllers, means for producing continuous retrogression of the speed-controllers, and a governing train-line through which the means for operating the speed-controllers and reversers are connected, substantially as described.

214. The combination of a car, a source of supply, one or more operator's switches, a train-line connected with the operator's switches, couplings for the train-line at the ends of the cars, a motor or motors, a reverser and current-varying controller therefor operated by relays connected with the train-line and with each operator's switch, and connections for the motor or motors with the source of supply through the reverser and controller, substantially as described.

215. An electrically-equipped car provided with one or more motors, a controller and circuit therefor, an independent governing-circuit, and an operator's switch at each end of the car connected to the governing-circuit, the forward contacts of one operator's switch being connected with the back contacts of the other operator's switch, substantially as described.

216. An electrically-equipped car provided with one or more motors, a controller and circuits therefor, an independent governing-circuit and an operator's switch at each end of the car connected to the governing-circuit, the forward contacts of one operator's switch being connected with the back contacts of the other operator's switch, a train-line connected to the operator's switches, and couplings in the train-line for connecting the cars into a train, substantially as described.

217. A plurality of equipped cars each having an operator's switch at each end, the forward contacts of all the switches at either end of the cars being connected with the back contacts of all the switches at the other end of the cars, a train-line, and couplings properly paired to secure like track movement with like hand movement at any operator's switch, irrespective of the sequence of the cars, substantially as described.

218. A plurality of equipped cars each having an operator's switch at each end, the forward contacts of all the switches at either end of the cars being connected with the back contacts of all the switches at the other end of the cars, a train-line, and couplings properly paired to secure like track movement with like hand movement at any operator's switch, irrespective of the sequence or end relation of the cars, substantially as described.

219. A plurality of equipped cars each having an operator's switch at each end, the switches each being provided with a forward and a back contact, two train-wires, each connecting the forward contact of an operator's switch on any car with the back contact of the other switch on the same car, and connections for the train-wires properly paired to secure alternation of these contacts in each train-wire and an opposite order of alternation of contacts in the two train-wires, irrespective of the sequence of the cars, substantially as described.

220. A plurality of equipped cars each having an operator's switch at each end, the switches each being provided with a forward and a back contact, two train-wires, each connecting the forward contact of an operator's switch on any car with the back contact of the other switch on the same car, and connections for the train-wires properly paired to secure alternation of these contacts in each train-wire, and an opposite order of alternation of contacts in the two train-wires, irrespective of the sequence or end relation of the cars, substantially as described.

221. An electrically-equipped car having one or more driving-motors and a current-varying controller, means for operating the controller, a reverser-switch and means for operating it, an independent governing train-line, two master-switches connected therewith, the forward operative contacts of each master-switch being connected with the back operative contacts of the other master-switch, substantially as described.

222. A car provided with a motor-equipment, a reverser, two similar master-switches provided with reverser-contacts, the forward contact of each switch and the back contact of the other switch being connected similarly to the reverser, whereby like track movement of the car is secured by like hand movement at either switch, substantially as described.

223. A plurality of cars, a motor equipment on one or more of the cars, a master-switch and means of operating the cars therefrom, an independent governing-circuit for electrically connecting the several cars independently of sequence of the cars, and means for securing like track movement of the cars with like hand movement at the switch in all relations of the cars, substantially as described.

224. A plurality of cars, a motor equipment on one or more of the cars, a master-switch and means for operating the cars therefrom, an independent governing-circuit for electrically connecting the several cars independently of sequence or end relation of the cars, and means for securing like track movement of the cars with like hand movement at the switch in all relations of the cars, substantially as described.

225. A plurality of cars, a motor equipment on one or more of the cars, master-switches, means for operating the cars from any one of the several master-switches, an independent governing-circuit for electrically connecting the several cars independently of the sequence of the cars, and means for securing like track movement of the cars with like hand movement at any switch in all relations of the cars, substantially as described.

226. A plurality of cars, a motor equipment on one or more of the cars, master-switches, means for operating the cars from any one of the several switches, an independent governing-circuit for electrically connecting the several cars independently of sequence or end relation of the cars, and means for securing like track movement of the cars with like hand movement at any switch in all relations of the cars, substantially as described.

227. A plurality of cars, a motor or motor equipment on one or more of the cars, master-switches, means for operating the cars from any one of the several switches, a governing-circuit for electrically connecting the several cars independently of sequence of the cars, there being direction-controlling wires and speed-controlling wires in the governing-circuit, and means for securing like track movement and like speed and acceleration of the train with like hand movement at any switch in all relations of the cars, substantially as described.

228. A plurality of cars, a motor equipment on one or more of the cars, master-switches, means for operating the cars from any one of the several switches, a governing-circuit for electrically connecting the several cars independently of sequence or end relations of the cars, there being direction-controlling wires and speed-controlling wires in the governing-circuit, and means for securing like track movement and like speed and acceleration of the train with like hand movement at any switch in all relations of the cars, substantially as described.

229. A car equipped with a motor to drive it, a reverser for the motor, a current-varying controller for the motor, and a reverser-switch for the controller, reversible train connections for the motor-reverser, and non-reversible connections for the said reverser-switch, substantially as described.

230. A train of cars equipped with a governing train-line, a motor or motor equipment and a reverser therefor on one or more of the cars, connections for each reverser to the train-line, and means for exchanging the connection of the reverser on any car with the train-line on the other cars when the car considered is turned end for end in the train, substantially as described.

231. A train of cars equipped with a governing train-line, one or more operator's switches provided with reverser-contacts, and means for exchanging the connection of the reverser-contacts of any operator's switch on any car with the train-line on the other cars when the car considered is turned end for end, substantially as described.

232. A train of cars equipped with a governing train-line, a motor or motor equipment and a reverser therefor on a plurality of the cars, an operator's switch or switches on one or more of the cars equipped with a motor, connections between the reverser and operator's switch or switches on any car equipped with both, the reverser and operator's switch forming a part of the car system, and means for exchanging the reverser connections of such car system with the train-line on the other cars when the car considered is turned end for end, without disturbing the connection of the reverser and operator's switch of the car system, substantially as described.

233. A car provided with driving mechanism and with direction-controlling wires which terminate in similar groups at each end of the car, the terminals of the wires in the group at one end being exchanged as compared with their terminals in the group at the other end, and reversing mechanism for the driving mechanism actuated by the controlling-wires, substantially as described.

234. A car provided with driving mechanism and with an independent governing-line containing direction-controlling wires which terminate in similar groups at each end of the car, the terminals of the wires in the group at one end being exchanged as compared with their terminals in the group at the other end, and reversing mechanism for the driving mechanism actuated by the controlling-wires, substantially as described.

235. A car provided with a motor or motors, a controller therefor, a relay or governing-circuit for said controller having direction-controlling and speed-controlling wires, said wires terminating in similar groups at each end of the car, the terminals of the direction-controlling wires in the group at one end being exchanged as compared with their terminals in the group at the other end, substantially as described.

236. A car provided with speed-controlling wires and direction-controlling wires which terminate in similar groups at each end of the car, the terminals of the direction-controlling wires in the group at one end being exchanged as compared with their terminals in the group at the other end, and the terminals of the speed-controlling wires corresponding at both ends, substantially as described.

237. A train consisting of interchangeable cars each of which is provided with direction-controlling wires which terminate in similar groups at each end of the car, the terminals of the wires in the group at one end being exchanged as compared with the terminals in the group at the other end, and means for pairing like direction-controlling wires at the abutting ends of the cars, substantially as described.

238. In an electrical train system, the combination of two or more motor equipments, reverser-relays for each equipment, speed-controlling relays for each equipment, a train-line having direction-controlling and speed-controlling wires connected with these relays, and couplers for effecting reversal of connection of the direction-controlling wires and like pairing of the speed-controlling wires when a car is turned end for end, substantially as described.

239. A train consisting of interchangeable cars each of which is provided with speed-controlling wires and direction-controlling wires which terminate in similar groups at each end of the car, the terminals of the direction-controlling wires in the group at one end being exchanged as compared with their terminals in the group at the other end, and the terminals of the speed-controlling wires corresponding at both ends, means for pairing like direction-controlling wires and corresponding speed-controlling wires at the abutting ends of the cars, substantially as described.

240. A train consisting of interchangeable cars each provided with direction-controlling wires and speed-controlling wires, the wires being so disposed and grouped that when the cars are reversed in end relations the direction-controlling wires are differently paired and the speed-controlling wires are similarly paired in connection, substantially as described.

241. A car equipped with a motor to drive it, a controller for the motor, an independent governing train-line for controlling or operating the controller, and reversible connections for the train-line, substantially as described.

242. A train-line comprising two or more reversible cables terminating in couplers at each end, provided with means for insuring proper pairing of reversing and speed-controlling circuits, substantially as described.

243. Two or more cars, one or more of the cars having driving mechanism, train-cables on the several cars having direction and speed controlling wires, and reversible jumpers having a like number of wires similarly disposed for securing proper connections between the like sets of wires upon the cars, substantially as described.

244. A train-line having speed and direction controlling wires, and comprising two or more cables, each having like couplings at each end, the couplings of alternate cables being different and complementary, substantially as described.

245. Train-cables having direction and speed controlling wires, reversible jumpers for connecting them, and means for insuring proper connections of the direction and speed controlling wires, substantially as described.

246. A train-controlling line having speed and direction controlling wires, and comprising two or more reversible cables each having like couplings at each end, the couplings of alternate cables being different and complementary, and means for insuring proper connections of the direction and speed controlling wires, substantially as described.

247. A car equipped with a motor or motors, a controller therefor, an independent governing train-line terminating in couplings at the ends of the car, an operator's switch at each end of the car, and branches from the train-line to the operator's switches, substantially as described.

248. A car equipped with a motor or motors, a controller therefor, an independent governing train-line terminating in couplings at the ends of the car, an operator's switch at each end of the car, branches from the train-line to the operator's switch, and means for disconnecting the operator's switches from the train-line, substantially as described.

249. A car equipped with operator's switches and a train-line terminating at each end of the car in two fixed couplings, and branches from the train-line to the operator's switches, substantially as described.

250. On an electrically-equipped car, train connections including two sets of coupler-contacts, one for determining the direction of motion and the other for determining the speed of motion, substantially as described.

251. On an electrically-equipped car, the combination of a motor, a reverser and a current-varying controller therefor, and train connections with two sets of coupler-contacts at each end of each car, one for determining the movement of the reverser, and the other for determining the movement of the controller, substantially as described.

252. In an electrical car system, the combination of a motor equipment, a controller therefor for reversing and grouping the motors and changing the resistance in circuit therewith, a governing-circuit and a master-switch connected therewith for operating the controller, substantially as described.

253. In an electrical car system, the combination of a motor equipment, a controller therefor for reversing and grouping the motors and changing the resistance in circuit therewith, a governing-circuit and a master-switch connected therewith for operating the controller by a single handle, substantially as described.

254. In an electrical car system, the combination of a motor equipment, a controller therefor for reversing the motors, grouping them in series and parallel arrangement and for changing the resistance in circuit with them, a governing-line, and a master-switch connected therewith for operating the controller, substantially as described.

255. In an electrical car system, the combination of a motor equipment, a controller therefor for reversing the motors, grouping them in series and parallel arrangement and for changing the resistance in circuit with them, a governing-line, and a master-switch connected therewith for operating the controller by a single handle, substantially as described.

256. In an electrical train system, the combination of a plurality of motor equipments, controllers therefor for reversing and grouping the motors and changing the resistance in circuit therewith, an independent governing train-line, and a master-switch connected therewith for operating the controllers, substantially as described.

257. In an electrical train system, the combination of a plurality of motor equipments, controllers therefor for reversing and grouping the motors and changing the resistance in circuit therewith, an independent governing train-line, and a master-switch connected therewith for operating the controllers by a single handle, substantially as described.

258. In an electrical train system, the combination of a plurality of motor equipments, controllers therefor for reversing the motors, grouping them in series and parallel arrangement and changing the resistance in circuit with them, an independent governing train-line, and a master-switch connected therewith for operating the controllers, substantially as described.

259. In an electrical train system, the combination of a plurality of motor equipments, controllers therefor for reversing the motors, grouping them in series and parallel arrangement and changing the resistance in circuit with them, an independent governing train-line, and a master-switch connected therewith for operating the controllers by a single handle, substantially as described.

260. An electrically-equipped car provided with one or more motors, a controller therefor, a controlling-circuit for the controller, and an operator's switch having a plurality of speed-controlling contacts on one side and a less number of speed-controlling contacts on the other side, substantially as described.

261. An electrically-equipped car having one or more driving-motors, a controller, a pilot mechanism for operating the controller, and a switch for operating the motors having a plurality of speed-controlling contacts on one side and a less number of speed-controlling contacts on the other side, substantially as described.

262. A controller consisting of a pilot-motor and a cylinder driven thereby provided with current-varying or current-varying and motor-grouping contacts, and limit-contacts for the pilot-motor and a loose connection with limited movement between the pilot-motor and the controller, means for holding the cylinder fast until the pilot-motor has advanced definite amounts, and means for centering and holding the cylinder at definite points of its advance, substantially as described.

263. An electrically-equipped train having independent direction and speed controlling circuits, substantially as described.

Signed by me at Chicago, Illinois, this 26th day of April, 1898.

FRANK J. SPRAGUE.

Witnesses:
E. B. KETTLE.
N. G. SLATTERY.